United States Patent [19]

Casavant et al.

[11] Patent Number: 5,613,136

[45] Date of Patent: Mar. 18, 1997

[54] LOCALITY MANAGER HAVING MEMORY AND INDEPENDENT CODE, BUS INTERFACE LOGIC, AND SYNCHRONIZATION COMPONENTS FOR A PROCESSING ELEMENT FOR INTERCOMMUNICATION IN A LATENCY TOLERANT MULTIPLE PROCESSOR

[75] Inventors: Thomas L. Casavant, Iowa City, Iowa; Samuel A. Fineberg, Sunnyvale, Calif.; Devin L. Bright, Palatine, Ill.; Subbiah Sundaram, Los Angeles, Calif.; Michelle L. Roderick, Fort Collins, Colo.

[73] Assignee: University of Iowa Research Foundation, Iowa City, Iowa

[21] Appl. No.: 143,368

[22] Filed: Oct. 29, 1993

Related U.S. Application Data

[63] Continuation-in-part of Ser. No. 800,530, Dec. 4, 1991, Pat. No. 5,442,797.

[51] Int. Cl.$^6$ .................................................. G06F 15/00
[52] U.S. Cl. ........................... 395/800; 364/DIG. 1; 364/229; 364/232.23; 364/260; 364/260.2; 364/280; 364/281.3; 364/281.7; 364/284
[58] Field of Search ................................ 395/650, 475, 395/800; 364/229, 232.23, 260, 260.2, 280, 281.3, 281.7, 284

[56] References Cited

U.S. PATENT DOCUMENTS

| | | |
|---|---|---|
| 4,079,327 | 3/1978 | Van Uffelen . |
| 4,598,400 | 7/1986 | Hillis . |
| 4,773,038 | 9/1988 | Hillis et al. . |
| 4,791,641 | 12/1988 | Hillis . |
| 4,805,091 | 2/1989 | Thiel et al. . |
| 4,814,973 | 3/1989 | Hillis . |
| 4,827,403 | 5/1989 | Steele, Jr. et al. . |
| 4,830,376 | 5/1989 | Hillis . |
| 4,969,088 | 11/1990 | McAuliff et al. . |
| 4,984,235 | 1/1991 | Hillis et al. . |
| 4,984,400 | 1/1991 | Franaszek . |
| 5,008,815 | 4/1991 | Hillis . |
| 5,047,917 | 9/1991 | Athas et al. . |
| 5,050,069 | 9/1991 | Hillis et al. . |
| 5,083,265 | 1/1992 | Valiant . |
| 5,113,514 | 5/1992 | Albonesi et al. . |
| 5,175,733 | 12/1992 | Nugent . |
| 5,201,040 | 4/1993 | Wada et al. . |
| 5,442,797 | 8/1995 | Casavant et al. ................... 395/80 |

*Primary Examiner*—Alvin E. Oberley
*Assistant Examiner*—Jonathan Hall Backenstose
*Attorney, Agent, or Firm*—Fleshner & Kim

[57] ABSTRACT

A method and an apparatus for reconciling communication and locality by enabling a user/programmer to write programs in an extended procedural language which explicitly manipulate locality. The multiprocessor includes a plurality of processing elements connected to each other each processing element having a unique address and including a central processing unit for executing local CPU code and reading and writing local data and a locality manager for controlling data movement between processing elements which are cooperating on a single task by executing local locality manager code which indicates when shared data can be released and when non-local data is requested.

24 Claims, 40 Drawing Sheets

```
taggable int n;
int p;

foo()
{
    n@0 = p + 3;
    p = 5 + n@1;

lmc{
        tag 0:
            release n;
            break;

tag 1:
            request n;
            break;
    }
}
```

Figure 3

```
taggable int x;

foo()
{
    x@data0 = 10;

lmc{ int lm_x;

tag data0:
            lm_x = *reference;
            break;

```
while (TRUE){
        check_send_queue check_rec_list

```
Routing_Logic_Output_Routine{
        copy information from the send queue
        to the appropriate registers in the RL

Read_FIFO_Routine{ get event from FIFO head determine tag of event determine address of event determine action(s) to be taken by analyzing address, tag, and data table. {application specific}

```
Routing_Logic_Input_Routine{ get message type if ( message type == request ) {

/* message is a request for data */ place request into request list

}
    else{

/* message is previously requested data */ use io event to inform RL to
        proceeed with DMA transfer

Blocking_Logic_Update_Routine} write the address of interest to the BL use an io event to set the blocking bits accordingly

Figure 16

```
             31        25 24  20 19   15 14   10 9          0
           ┌─────────┬──────┬──────┬──────┬──────────────┐
FORMAT1    │ OP CODE │  Rx  │  Rx  │  Ry  │     N/A      │
           └─────────┴──────┴──────┴──────┴──────────────┘
              7         5     5      5          10

31        25 24  20 19   15 14   10 9          0
           ┌─────────┬──────┬──────┬────────────────────┐
FORMAT2    │ OP CODE │  Rx  │  Rx  │     IMMEDIATE      │
           └─────────┴──────┴──────┴────────────────────┘
              7         5     5              15

31        25 24  20 19   15 14   10 9          0
           ┌─────────┬──────┬──────┬────────────────────┐
FORMAT3    │ OP CODE │  CC  │ N/A  │     IMMEDIATE      │
           └─────────┴──────┴──────┴────────────────────┘
              7         5     5              15

31        25 24                              0
           ┌─────────┬──────────────────────────────────┐
FORMAT4    │ OP CODE │              N/A                 │
           └─────────┴──────────────────────────────────┘
              7                     25

31        25 24  20 19                       0
           ┌─────────┬──────┬──────────────────────────┐
           │ OP CODE │  Rx  │           N/A            │
           └─────────┴──────┴──────────────────────────┘
FORMAT5       7         5                20
             31 30 29                                     0
           ┌─────┬────────────────────────────────────┐
           │ N/A │             ADDRESS                │
           └─────┴────────────────────────────────────┘
              2                   30

31        25 24   20 19                      0
           ┌─────────┬──────┬──────────────────────────┐
           │ OP CODE │  CC  │           N/A            │
           └─────────┴──────┴──────────────────────────┘
FORMAT6       7         5                20
             31 30 29                                     0
           ┌─────┬────────────────────────────────────┐
           │ N/A │             ADDRESS                │
           └─────┴────────────────────────────────────┘
              2                   30
```

Figure 17

Bytes

| | |
|---|---|
| 4 bytes | 0 |
| 16 bytes | 262144 |
| 64 bytes | 786432 |
| 256 bytes | 1048576 |
| 1024 bytes | 1572864 |
| 4096 bytes | 1097152 |
| 16384 bytes | 3145728 |
| 65536 bytes | 41934303 |

Figure 19

Address to be checked — 0x010f0 0001

| CAM4 | PART OF ADDR IN CAM | BB | GI | GROUP TAG |
|---|---|---|---|---|
| | 11 0000 0000 | 001 | 0 | 00000 |
| | | | | |
| | | | | |

0 0001 00 0011
TAG  MPI GI

MPI—Memory Partition Indicator
BB—Blocking Bits
CI—Cam Number Indicator
GI—Group Indicator

Figure 21

| CAM4 | PART OF ADDR IN CAM | BB | GI | GROUP TAG |
|---|---|---|---|---|
| | 11 0000 0000 | 001 | 1 | 000010 |
| | 11 0000 0001 | 001 | 1 | 000010 |
| | 11 0000 0002 | 001 | 1 | 000010 |

BB—Blocking Bits

GI—Group Indicator

Figure 22

| LM1 | LM2 | Function |
|-----|-----|-------------|
| 0   | 0   | UNBLOCK     |
| 0   | 1   | BLOCK WRITE |
| 1   | 0   | BLOCK READ  |
| 1   | 1   | UNUSED      |

Figure 23

|  | Store/Request | Load/Request | Store/Release | Load/Release |
|---|---|---|---|---|
| Untagged Synchronous Store | No Action | No Action | No Action | No Action |
| Untagged Synchronous Load | Invalidate | Invalidate | Invalidate | No Action |

Figure 33

```
taggable in A[100];
int i;

main (){
        for(i=0; i<100 ; i++)

A[i]@0 = i*i;
                ... code not using A ...
                a[0]=2;
        lmc{
                int times_referenced = 0;

tag 0: times_referenced++;

if(times_referenced == 100)
                                rel(&A,1);
                        break;
        }
}
```

Figure 34

```
taggable int A[100];
int i, B[100], C[100];

main()
{
        for(i=0; i<99; i++)
                A[i] = B[i] * C[i];

A[99]@0 = B[99] * C[99];

lmc{
                tag 0: rel(&A,1);
                        break;
        }
}
```

Figure 35

```
taggable int i, A[100];
int i, B[100], C[100);

main()
{
        for(i@0=0; i<100; i++)
                A[i]@1 = B[i] * C[i];

lmc{
                tag 0: inhibit(1,&A[99],1);
                        break;

tag 1: rel(&A,1);
                        break;
        }
}
```

Figure 36

```
taggable A[100];
int i, j, k, B[100], C[100];
main()
{
    for(i@0=0; i<10; i++){
        for(j=0; j <9; j++){
            k = i * 10 + j;
            A[k] = B[k] * C[k];
        }
        A[k+1]@1 = B[k+1] * C[k+1];
    }
lmc{
    int i, lm_k;
    tag 0: lm_k=-1;
           break;
    tag 1: lm_k+=10;
           vrel(&A[lm_k-9], lm_k-9, lm_k, 1);
           break;
}
}
```

Figure 37

```
taggable A[100];
int i, B[100], C[100];

main()
{
        for(i=0; i<100; i++; 0; 10)
            A[i]@0 = B[i] * C[i];

lmc{
            tag 0:   rel(&A,1);
                     break;
        }
}
```

Figure 38

LOCALITY MANAGER HAVING MEMORY AND INDEPENDENT CODE, BUS INTERFACE LOGIC, AND SYNCHRONIZATION COMPONENTS FOR A PROCESSING ELEMENT FOR INTERCOMMUNICATION IN A LATENCY TOLERANT MULTIPLE PROCESSOR

RELATED APPLICATIONS

This application is a continuation-in-part of U.S. patent application Ser. No. 07/800,530, filed Dec. 4, 1991, now U.S. Pat. No. 5,442,797, incorporated herein by reference.

BACKGROUND OF THE INVENTION

1. Field of the Invention

This invention relates generally to a method and an apparatus for reconciling communication and locality in a parallel processor system and particularly to a method and apparatus for enabling a user/programmer to write programs in an extended procedural language such as an extended C programming language which explicitly manipulate locality in order to optimize performance of a parallel multiprocessor.

2. Background of the Related Art

A recurrent problem posed by parallel processing architectures is that of communication latency. Communication latency is the time required for a communication operation to complete. This time may include transfer time, overhead, and the time spent waiting for data synchronization. Communication latency exists in any parallel architecture regardless of whether it supports a shared or a non-shared memory paradigm. Latency in and of itself, however, does not have to result in diminished performance. Rather, performance is diminished whenever a central processing unit (CPU) within a parallel system is forced to wait for some communication (or synchronization) operation. Therefore, latency may be addressed by either decreasing time cost of communication or by overlapping it with other tasks, i.e., tolerating latency.

One common method of decreasing the time cost of communication on shared memory systems is through cache memory. With cache memory, hardware is utilized to bring more frequently accessed data into memories that are closer to each CPU. This process is done automatically and utilizes a principle of locality. By bringing these data into local cache memory, the time cost of most loads and stores is reduced, thereby reducing latency. However, programs do not always exhibit such locality, particularly parallel programs accessing shared data. Further, this locality is hidden from a programmer and therefore is difficult to exploit.

Another technique, more common to distributed memory systems, is to increase communication bandwidth. This decreases communication latency by reducing the time required to send and receive data. Unfortunately, on many existing systems, the amount of time associated with software overhead tends to dominate communication time. While this may be improved by using a hardware coprocessor as in J. M. Hsu and P. Banerjee, "A message passing coprocessor for distributed memory multicomputers," *Supercomputing* '90, November 1990, pp. 720–729, this solution is not complete because overheads still exist in controlling a coprocessor. Also, this solution does not aid a programmer in finding and exploiting locality. Finally, if data is not ready to be sent, no reduction of communication cost can eliminate associated data synchronization latency.

An alternative to reducing latency is to simply tolerate it. There are several mechanisms that have been utilized to tolerate latency. These have one common aspect. They change the programming paradigm from a control based model to a data based one. This is because data movement and synchronization are fundamental to the problem of communication latency (Arvind and R. A. Iannuci, *Two Fundamental Issues in Multiprocessing*, Tech. Report MIT/LCS/TM-330, MIT Laboratory for Computer Science, 1987).

One approach to latency tolerance is that used in dataflow machines such as Monsoon (FG. M. Papadopoulos and D. E. Culler, "Monsoon: an explicit token-store architecture," 17*th Annual Symposium on Computer Architecture,* May 1990, pp. 82–91). In such data flow machines, computation follows data movement. When all data for a given computation become ready, a computation takes place. Thus, latency is only reflected in program execution time when there is no data ready to be computed upon. These dataflow machines are most efficient when used with a "dataflow language" such as Id or Sisal.

Another approach to latency tolerance is that used in multithreaded machines such as HEP (B. J. Smith, "Architecture and applications of the HEP multiprocessor system," *SPIE* Vol. 298 Real-Time Signal Processing IV, 1981, pp. 241–248), Horizon (J. T. Kuehn and B. J. Smith, "The Horizon supercomputing system; architecture and software," *Supercomputing* '88, November 1988, pp. 28–34), and Tera (R. Alverson, D. Callahan, D. Cummings, B. Koblenz, A. Porterfield, and B. Smith, "The Tera computer system," 1990 International Conference on Supercomputing, June 1990, pp. 1–6). In these machines, latency is tolerated by keeping a large set of active light-weight processes (threads). Then, when a thread needs to access an operand from shared memory, the thread is put in a wait queue and another thread is activated. Similarly, threads are placed in a queue when they need to wait for some form of data synchronization. Threads then re-enter a pool of active threads as data becomes available. This mechanism is aided by a large set of hardware contexts and a large register file and thus it adds little overhead. Therefore, if enough threads exist and there is ready data, this mechanism allows latency to be hidden to some extent. However, this does not help in the execution time of a single thread. Thus, programs must be broken into many threads to take advantage of this mechanism. Further, the number of threads must grow at a rate that is higher than the growth in the number of processors to maintain latency tolerance.

While both of the above approaches (dataflow machines and multithreaded machines) are capable of tolerating latency, they both require a very high degree of parallelism—one that is much larger than the total machine size. Further, neither of these approaches can utilize off-the-shelf CPUs. Thus, they cannot, for example, take advantage of cost and performance benefits of new generation microprocessors, such as reduced instruction set computers (RISCs). For example, Intel i860 and Inmos T9000 are moderately priced and have peak performance levels in ranges once achieved only by supercomputers (25–100 MFlops). RISCs utilize pipelining to exploit fine-grained parallelism and contain internal caches and floating point support.

While RISCs provide a significant improvement in cost/performance ratio, they accentuate problems associated with communication latency. For example, RISCs have significant memory bottlenecks, because memory speed has not kept up with the higher clock rates in CPUs. Even data accesses to locations within a Processing Element's (PE's)

local memory may be costly, because any off-chip accesses add latency due to time required to drive external pins.

Performance of distributed-memory multiprocessors (DMMPs) are the future backbone for large scale parallel architectures. The programming models for DMMPs generally require explicit data movement among processing elements.

Early generation DMMPs were technologically immature in communication operations. These machines generally had large interconnection networks and very little hardware to assist in the transmission of messages. The transmission of messages was done through a store-and-forward methodology. A characteristic of store-and-forward networks is that when a node receives a message, a CPU interrupt must occur. This requires the CPU to preempt its computation in order to take the entire message off the channel. The message's destination address must be analyzed and, if destined for itself, the message's data will be integrated into the computation. However, if the message was not destined for itself the CPU must send the message down the channel towards its destination node. This method of communication caused every node between the source node and destination node to process the incoming message. The transmission time for store-and-forward communication is the product of the length of the message and the number of hops between the source to destination nodes. Due to storing and forwarding of messages, CPU cycles are lost, thus communication overheads and latencies are incurred. Architectures with this communication methodology were only well-suited for coarse-grained applications.

One of the first major communication-related advancements in DMMPs was in the development of more sophisticated interconnection networks. These new interconnection networks had route-through capabilities which meant that when a message arrived at an intermediate node, the processor no longer had to check the destination address. Special hardware in the network analyzed the message and then automatically routed it to its destination. This hardware routing was performed without disturbing any of the intermediate nodes. The processor, however, was still responsible for initiating the communication and for servicing the interrupts generated when the message arrived at its destination.

The transmission time of route-through networks is the sum of the length of the message and the number of hops between the source and destination nodes. Route-through networks are much more efficient than store-and-forward networks since only the overheads of initiation, termination, and latency of communication occur. Route-through systems are also better suited for finer-grained parallelism as opposed to store-and-forward systems.

Even with advancements in route-through schemes, the overheads of communication are still not eliminated. Distributed systems need to deal with synchronization of messages and the communication protocol for the nodes at both ends of the channel. The delays incurred from the additional synchronization and communication initiation/termination induce communication latency. Several means for resolving communications latency have been proposed in current parallel systems.

In an effort to dedicate the CPU strictly to computation, communications co-processors have recently been introduced to handle the communication initiation/termination overheads. This passing of responsibility from the CPU to the co-processor can potentially provide for even finer-grained applications. In particular, a smooth interface should exist between the CPU and the co-processor, because initiation of communication requires the CPU to notify the co-processor of communication operations.

There are a number of past approaches to tolerating communication latency and synchronization overheads in DMMPs while still providing a high degree of parallelism are many. In fine-grained multicomputers, such as the J-Machine (Da189), there is a large amount of concurrency, but this is achieved at the cost of high communication overheads. SIMD single instruction multiple data machines (e.g., CM-2 in Thinking Machines, "The Connection Machine CM-2 Technical Summary, Thinking Machines Corporation", Cambridge, Mass., Oct. 1990), used massive parallelism and hard-wired synchronization to overcome the problems of slow processors and long network latency, respectively. In the J-Machine, attempts have been made to decrease the communication overheads inherent in fine-grained parallelism to allow such concurrent operations.

Distributed shared memory machines provide the user with the ease of many of the features of shared memory programming (i.e., uniform address space) but allows for the implementation of the machine in such a way that it can scale far beyond typical shared memory machines. In distributed shared-memory machines (e.g., KSR1 Kendall Research, Technical Survey, Kendall Square Research Corporation, 1992, Dash D. Lenoski et al., "The DASH Prototype2: Implementation and Performance," The 19th, International Symposium on Computer Architecture, GC, Australia, May 1992, pp. 92–103, Agarwal, et al., "The MIT Alewife Machine: A Large Scale Distributed Memory Multiprocessor", Tech. Report MIT/LCS TM-54, MIT, 1991), communication is tolerated by exploiting locality of reference. Locality of reference is present in parallel programs to some extent without any conscious effort by the programmer. Programmers can increase locality by optimizing memory-reference patterns or compilers may be used to increase locality automatically.

In machines such as the CM-5 in Thinking Machines, "The Connection Machine CM-5 Technical Summary", Thinking Machines Corporation, Cambridge, Mass., Oct. 1991 and the AP1000 by Fujitsu, the control networks and special network operations take advantage of the type of parallelism inherent in the application in order to tolerate latency. A brief overview of the above machines will demonstrate the way these architectures have handled communication and synchronization overheads.

The J-Machine is able to tolerate communication latency by implementing message-driven processors (MDP) to handle fine-grained tasks. The processors are message-driven in the sense that they begin execution in response to messages, via the dispatch mechanism. No receive is needed, and this eliminates some of the communication software overhead. The MDPs create tasks to handle each arriving message. Messages carrying these tasks advance, or drive, each computation. To support the fine-grain concurrent programming, the tasks are small, typically 20 instructions. The router, and the six two-way network ports integrated into each processing node, couples the three-dimensional network topology to provide efficient transmission of messages. The sending of messages does not consume any processing resources on intermediate nodes and buffer memory is automatically allocated on the receiving nodes. The MDP provides concurrency through fast context-switching and prefetching is also used to improve locality. The MDPs provide synchronization by using message dispatch and presence tags on all States. In response to an arriving message the MPD may set the presence tags so that access to a value may not be preempted.

Kendall Square Research's multiprocessor KSR 1 has what is referred to as an ALLCACHE memory system. There, the behavior of memory is similar to that of familiar caches. The difference is that unlike typical architectures, the source for data is not in main memory, but is in another cache. The task of dynamic storage allocation and cache management is inherent in the ALLCACHE hardware mechanisms. The ALLCACHE hardware manages a distributed directory to determine the location of each reference. The directory is also used to provide synchronization semantics by maintaining the state of the information it has stored (i.e., determining which operations the memory system is allowed to perform on that particular reference copy). The KSR1 replicates read-only data to decrease communication and the directories are responsible for managing the replicated data across the processors by issuing invalidation messages. The direct invalidation of a select number of copies has obvious advantages over the more commonly used broadcast invalidations used in other shared-memory architectures. KSR1 exploits locality of reference by organizing the ALLCACHE memory into a hierarchy and by constructing the node interconnections with a fat-tree topology. With this approach, the aggregate memory bandwidth theoretically increases in direct proportion to the number of processors. This type of architecture can be extended to an arbitrary number of hierarchal levels to allow an increase in the number of processors employed. The KSR1 also incorporates a number of features to assist the programmer in their efforts to optimize locality. These features include an Event Monitor Unit which logs local cache hit/misses and how far in the hierarchy a request had to travel to be satisfied along with the number of cycles involved with such events. Prefetch and post-store instructions are also available and controllable either by the compiler or by the programmer.

The Dash (i.e., Directory architecture for shared memory) and Alewife architectures are similar to the KSR1, in that they both primarily depend on caching to achieve scalability. Some of the differences include the network topology, the node architectures, the memory model, and the means for managing the distributed directories. Dash uses a 2-D meshes and each node in the system architecture corresponds to a cluster of four processors and a two-level cache implementation. The first level write-through data cache, inherent on each processor, is interfaced with a larger second-level write-back data cache. The main purpose of the second-level cache is to convert the write-through policy of the first level to a write-back policy, and to provide extra cache tags for bus snooping. The snooping policy is implemented only within a cluster of processors within a node. The distributed directory-based cache coherence protocol is a function of the memory consistency model adopted by the architecture. The sequential consistency model, inherent in KSR1 and Alewife, essentially represents program execution on a uniprocessor where multi-tasking is available. In Dash, a weaker consistency model called release consistency is used. This approach requires the programmer to specify which memory accesses require sequential consistency, but can hide much of the synchronization overhead of write operations. The distributed directory-based cache coherence protocol is implemented entirely in the hardware. Additional latency-tolerating features include a forwarding control strategy and special purpose operations such as prefetching and update writes.

Alewife also implements a 2-D mesh network and its single processor node employs a modified processor, called SPARCLE, which provides for multi-threading and fast context switching. The rapid context switching is meant to hide communication and synchronization delays and achieve high processor utilization. Alewife uses a directory-based cache coherence protocol, which is implemented as a combination of hardware and software. The hardware only supports a small number of variable copies. For any larger number of copies, system software must be used. The primary architecture difference between Alewife, Dash and KSR1 is that Alewife and Dash have fixed homes for each address. That is, in addition to the caches, Alewife and Dash employ ordinary memory modules. Therefore, in Alewife, along with Dash, a cache miss must be resolved by referencing the home memory module.

The CM-5 is a distributed system that employs both SIMD and multiple instruction multiple data (MIMD) execution models. The CM-5 employs a control and a data network along with a number of control processors to manage partitions. Each partition consists of a control processor, a collection of processing nodes (each implementing a SPARC processor), and dedicated portions of the data and control networks. Each user process executes on a single partition, but may exchange data with processes on other partitions. All partitions utilize UNIX timesharing and security features so that multiple users may have access to the partitions. The CM-5 control network allows for a number of interprocessor communication operations that may be used to reduce communication latency. These include replication, reduction, permutation and parallel prefix. The control network provides mechanisms to allow data-parallel code to be extracted efficiently, as well as supporting MIMD execution for general-purpose applications. The hierarchal nature of a fat tree topology, as used in the KER1, is provided to increase the locality of data which helps to reduce the communication latency.

In the AP1000, three independent networks are employed to route messages. The Torus-network (T-net) is used for point-to-point communication between cells, the Broadcast network (B-net) is used for 1-to-N communication, and the Synchronization network (S-net) is used for barrier synchronization. These different networks are used to optimize the use of barrier synchronization and broadcasts. An automatic routing scheme is used for the T-net, which combines wormhole routing with a structured buffer pool algorithm to reduce communication latency. Each cell incorporates a message controller (MSG) for fast message handling, a SPARC processor and a routing controlling (RTC). The MSG supports buffer receiving, index receiving, stride DMA, list/list vector transferring, and line sending. The RTC provides the automatic routing function for T-net. To provide efficient data distribution and collection of data to and from the host processor, each cell has special hardware for scatter and gather functions. These functions are provided so that the time for data transfer setup and message assembling/disassembling at the host computer does not increase as the number of cells increases.

The Paragon (an Intel machine) a system that employs a communication co-processor to handle communication operations. Each node implements an i860XP processor as an application processor and another i860XP as a communication co-processor. The user processor runs the operating system and application processes while the other processor executes message-passing software. The Network Interface (NIC) connects the node to the network and contains receive and transmit FIFO's which buffer messages between the node and the mesh routing chip (iMRC) on the backplane. The iMRC interfaces a node to the 2-D network through full-duplex communication pathways available in a NEWS grid formation.

U.S. patent application Ser. No. 07/800,530, now U.S. Pat. No. 5,442,797, resolves these issues by providing a multi-processor system made up of a plurality of processing elements. Each of these processing elements includes a locality manager and a central processing unit. The central processing unit in each processing element can be reduced instruction code (RISC) microprocessors, thereby taking advantage of high speed single microprocessor technology.

The user can also specify locality manager code (lmc) statements which are to be executed only by the locality manager. Hence, the multi-processor has a runtime environment which has kernels for both the central processing unit and the locality manager. The multi-processor allows a user to declare certain variables to be of a storage class taggable. In so doing, the user can design code which takes full advantage of parallel processing power. For example, the multi-processor utilizes a "request" operation and a "release" operation which makes it possible to transfer data among a plurality of localities. In addition, the multi-processor allows a user to specify a count field that indicates how many localities must request a data item before the data item may be overwritten.

Therefore, it is desirable have a second processor which can serve as a locality manager for each processing element in a parallel multiprocessor.

It is also desirable to provide bus interface logic to monitor a central processing unit bus in each processing element of a parallel multiprocessor.

It is also desirable to provide synchronization components for each processing element of a parallel multiprocessor unit.

SUMMARY OF THE INVENTION

Therefore, an object of the invention is to provide a parallel multiprocessor architecture and software environment which enables a user to write programs so as to explicitly manipulate locality in order to tolerate latency and thereby optimize processing performance.

Another object of the invention is to provide a parallel multiprocessor and software environment which compiles and executes an extended procedural language such as extended C programming language.

Another object of the invention is to provide a reduced instruction code RISC-based parallel multiprocessor which can be programmed by a user for optimal performance.

Another object of the invention is to provide a second processor which can serve as a locality manager for each processing element in a parallel multiprocessor.

Another object of the invention is to provide bus interface logic to monitor a central processing unit bus in each processing element of a parallel multiprocessor.

Another object of the invention is to provide interface logic for each processing element of a parallel multiprocessor unit.

Another object of the invention is to provide a synchronization unit such as a blocking unit to synchronize processes between a central processing unit and a locality manager.

An advantage of the invention is that it allows a programmer to explicitly manipulate locality in order to optimize performance.

Another advantage of the invention is that it can be implemented by extending any procedural language such as the C programming language.

Another advantage the invention is that it uses off the shelf RISC processors.

Another advantage the invention is that it enables a programmer to move data throughout the parallel multiprocessor.

A feature of the invention is that it uses a locality manager and a central processing unit in each processing element.

Another feature of the invention is that it has a runtime environment which has kernels for both the CPU and the locality manager.

Another feature of the invention is that it uses RISC microprocessor technology.

Another feature of the invention is that it allows a user to declare certain variables to be of a storage class taggable.

Another feature of the invention is that it provides for a "request" operation and a "release" operation which makes it possible for a programmer to write code which transfers data among a plurality of locality while tolerating latency.

Another feature of the invention is that it allows a user to specify locality manager code (lmc) statements which are to be executed only by the locality manager.

The above and other objects, advantages and features are accomplished in accordance with the invention by the provision of a parallel multiprocessor including: a plurality of processing elements connected to each other in an interconnection structure, wherein each of the plurality of processing elements has a unique address within the structure and includes: a processing element main memory for storing local cpu code (which includes data); a central processing unit coupled to the processing element main memory for executing the local cpu code and for reading events from and writing events to the processing element main memory, wherein each of the events has a tag field indicating whether or not the event may be non-local to the central processing unit; a locality manager memory for storing local locality manager code; and a locality manager coupled to the locality manager memory, for controlling data movement between processing elements which are cooperating on a single task by executing local locality manager code in accordance with the local locality manager code in associated with the events.

The above and other objects, advantages and features are further attained by the provision of a parallel multiprocessor including: a plurality of processing elements connected to each other in an interconnection structure, wherein each of a plurality of processing elements has a unique address within a structure and includes: a processing element main memory for storing local cpu code; a central processing unit coupled to a processing element main memory and having a cache memory with an instruction portion and a data portion, for executing the local cpu code and for reading from and writing to the processing element main memory; a locality manager memory for storing local locality manager code and data; a locality manager coupled to the locality manager memory, for controlling data movement between processing elements which are cooperating on a single task by executing local locality manager code which indicates when shared data can be released and when non-local data is requested; main memory updating unit for updating data stored in the processing element main memory in accordance with data in the data portion of the cache memory; and routing logic unit having direct access to the locality manager memory and the processing element main memory and connected to the locality manager, for routing data in accordance with commands received from the locality manager.

The above and other objects, advantages and features are further accomplished in accordance with the invention by providing a parallel multiprocessor including: a plurality of processing elements connected to each other in an interconnection structure, wherein each of the plurality of processing elements has a unique address within the structure and comprises: a processing element main memory for storing local cpu code; a central processing unit coupled to the processing element main memory for executing the local cpu code and for reading events from and writing events to the processing element main memory, wherein each of the events has a tag field indicating whether or not the event may be non-local to the central processing unit; a locality manager memory for storing local locality manager code and data; a locality manager coupled to the locality manager memory, for controlling data movement between processing elements which are cooperating on a single task by executing local locality manager code in accordance with the tag field of the event main memory updating unit for updating data stored in the processing element main memory in accordance with data in the data portion of the cache memory; and routing logic unit having direct access to the locality manager memory and the processing element main memory and connected to the locality manager, for routing data in accordance with commands received from the locality manager.

The above and other objects, advantages and features are further accomplished in accordance with the invention by providing a method for making a parallel multiprocessor including the steps of: arranging a first processor to serve as a central processing unit for executing local cpu code; coupling a second processor to the first processor to serve as a locality manager unit; coupling a routing logic unit to the second processor, whereby the first processor, the second processor and the routing logic unit comprise a processing element; repeating the arranging and coupling steps yielding a plurality of processing elements; and interconnecting the plurality of processing elements by interconnecting the plurality of routing logic units, wherein the second processors control movement of data between processing elements independently of the first processors and the first and second processors are separately programmable.

In accordance with another embodiment of the invention, program flow is controlled by declaring a variable to be a taggable variable; tagging the taggable variable yielding a tagged variable to indicate that data associated with the tagged variable may be moved to or from one or more of the plurality of processing elements; requesting data associated with the tagged variable from the plurality of processing elements whenever the data is required; and releasing data after a predetermined number of the above requesting steps to indicate that the data may be sent to non-local tagged variables.

The above and other objects, effects, features and advantages of the present invention will become more apparent from the following description of embodiments thereof taken in conjunction with the accompanying drawings.

BRIEF DESCRIPTION OF THE DRAWINGS

FIG. 3 shows how a CPU address is generated.

FIG. 4 shows how data events are used with an intrinsic variable reference.

FIG. 12 shows a program having a loop with two major tasks.

FIG. 13 shows a routine for interfacing routing logic.

FIG. 14 shows an interrupt service routine performed by the locality manager.

FIG. 15 shows the functionality of the interrupt service routine of FIG. 14.

FIG. 16 shows a routine in the LM program for modifying the BL blocking bits.

FIG. 17 shows the breakdown of various fields which can be used for instruction decoding at the locality manager.

FIG. 19 shows one embodiment of the blocking logic having 4 MB taggable address space which has been partitioned into 8 regions of 4, 16, 65, 256, 1024, 4096, 16,384 and 65,536 byte variables.

FIG. 21 demonstrates the way in which addresses are mapped to a particular CAM inside the blocking logic.

FIG. 22 shows how the blocking logic uses the bits 18 through 21 for finding the CAM in which an address is to be searched.

FIG. 23 shows how the LM1 and LM2 bits will be set in accordance with an operation to be performed by the locality manager.

FIG. 33 shows eight cases which may require invalidation of cache lines to maintain memory coherency and to guarantee observability.

FIG. 34 shows a code segment illustrating manifestation of high CPU-event rate.

FIG. 35 shows a possible solution to the Example in FIG. 34 that strips out a last iteration of for-loop.

FIG. 36 shows solutions employing the inhibit logic.

FIG. 37 shows code subgrouping an array.

FIG. 38 shows code using an extended for-loop.

DETAILED DESCRIPTION OF THE PREFERRED EMBODIMENTS

Processing Element Architecture

Figure 1A:
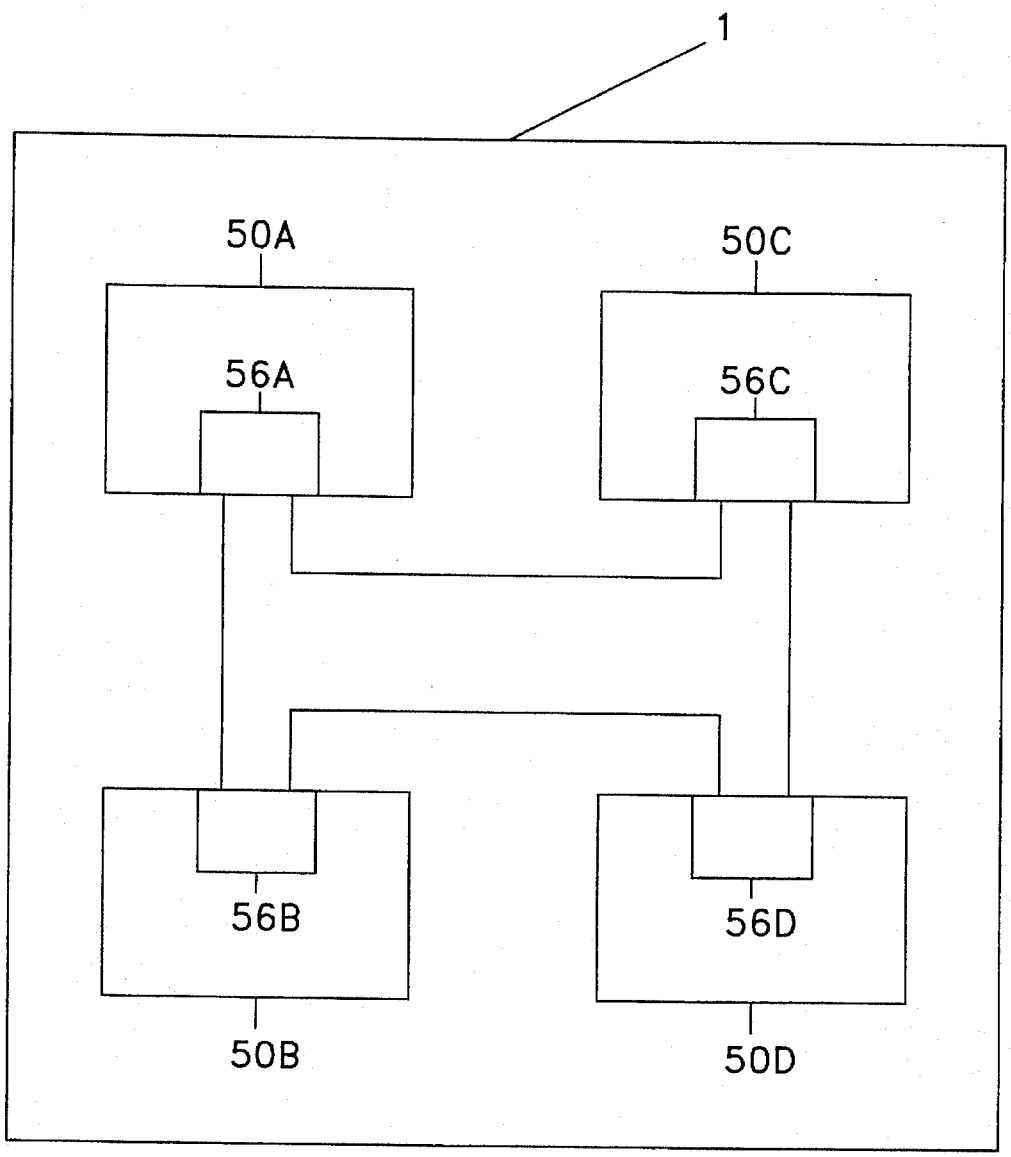
FIG. 1A shows a block diagram of a parallel multiprocessor according to an embodiment of the invention and FIG. 1B shows a block diagram of a processing element in that multiprocessor.
Figure 1B:
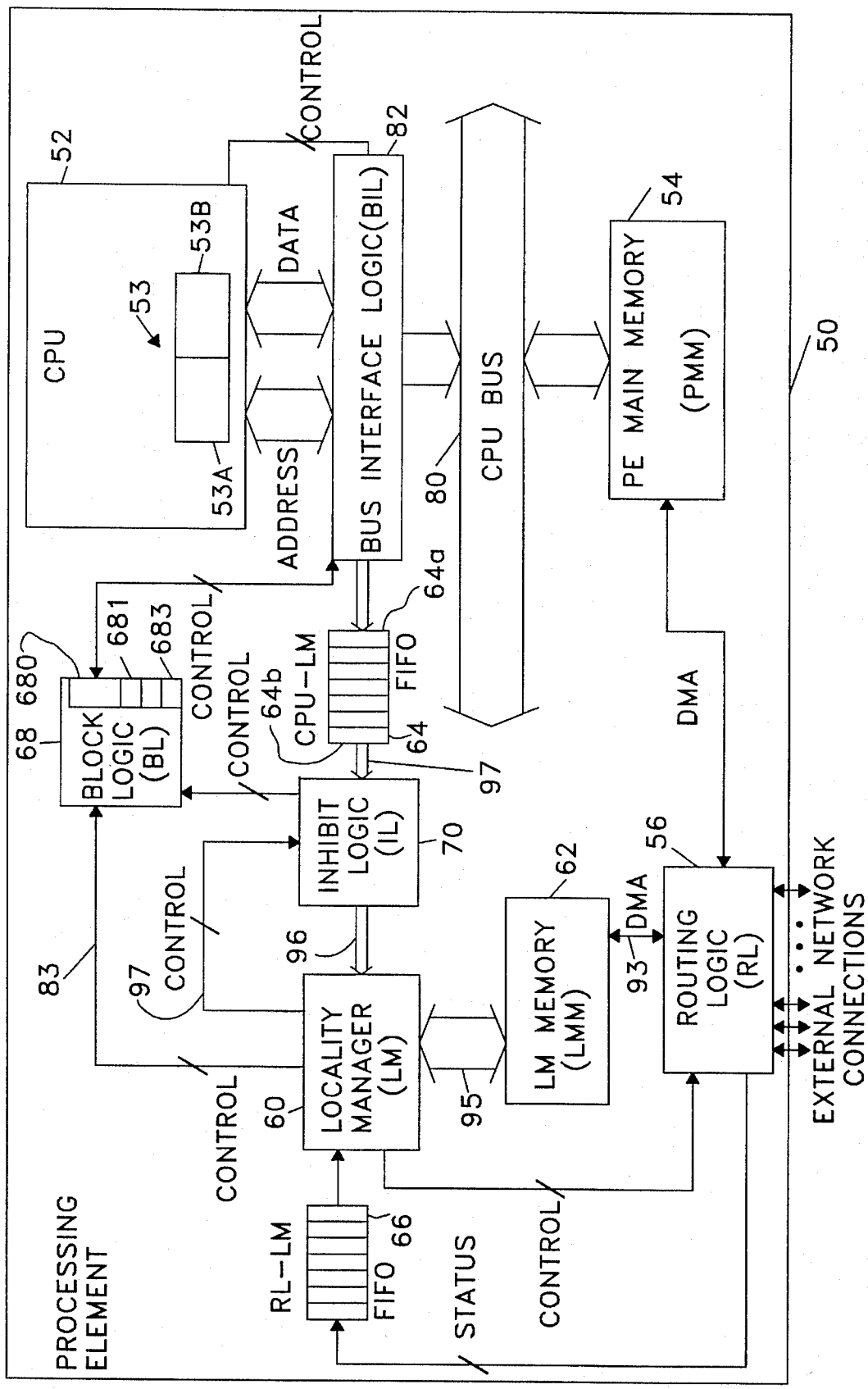

FIG. 1A is an embodiment of latency-tolerant distributed memory processor (DMMP) 1, as described in U.S. patent application Ser. No. 07/800,530, now U.S. Pat. No. 5,442,797, multiprocessor with processing elements 50A–50D with routing logic 56A–56D, respectively. FIG. 1B shows a block diagram of one of those processing elements (PE) 50. Major elements of PE 50 are CPU 52, PE main memory (PMM) 54, routing logic (RL) 56, and locality manager (LM) 60. CPU 52 can be an unmodified, "off-the-shelf," processor such as a high performance RISC processor. It fetches all instructions and data from PMM 54. Further, CPU 52 is assumed to have an internal cache 53 which may be divided into a separate instruction portion 53A and data portion 53B. CPU 52 must also have an ability to externally invalidate cache lines and to externally specify cache lines as write-through or non-cachable and a copy-back default cache policy. At least two CPUs currently support these capabilities; Intel i860XP and Inmos T9000 Transputer. If CPU 52 doesn't have the external cache management capability, then either its internal cache must be disabled or CPU 52 itself must be modified as will be clarified below.

Data movement occurs through RL 56 which can be, for example, Intel Direct Connect Module (DCM) or the Caltech Mesh Routing Chip. RL 56 controls sending and receiving of data from PE 50 and can read data from, or write data to, PMM 54 through a DMA channel 93. RL 56 acts as a router for data that is not directed to the particular PE 50 in which it is contained.

A primary difference between PE 50 and that of an iPSC/2 is that the latter doesn't have LM 60 and its associated hardware which includes: locality manager memory (LMM) 62 coupled to LM 62 via bus(es) 95, a CPU-LM FIFO 64, an RL-LM FIFO 66, block logic (BL) 68 coupled to LM 60 via control line(s) 83, inhibit logic (IL) 70 coupled to LM 60 via bus(es) 96 and control line 97. CPU-LM FIFO 64 is coupled to IL 70 via bus 97. This part of the PE architecture will now be described.

LM 60 is an event-driven device and does not have any external control lines. Rather, it is controlled by events that are contained in one of the two queues that feed it. These two queues are CPU-LM FIFO 64 that holds CPU events and RL-LM FIFO 66 that holds RL events.

A user-specified task to be performed by LM 60 is completely described by an ordered triple (V, T, C). Here V is a variable reference, T is a tag, and C is code to be executed by LM 60 when a reference to V containing a tag has occurred. The notion of a tag permits multiple LM actions to be mapped to a single variable and multiple variables to be mapped to the same LM action.

To specify an LM action or task, the programmer must tag a particular variable reference in source code. This tagged reference will generate a CPU event consisting of ordered pair (V, T) where V is the variable reference and T is the tag. LM 60 is responsible for mapping this event to the proper LM task (C). Variables that may be tagged must be declared to be of storage class taggable. All taggable variables are global (in the block-structured language sense) and must be statically mappable to a single physical address (known at load time).

Events are generated when references to taggable variables are "tagged". Two major classes of variable references exist. These are:
1. Asynchronous References, which represent references to ordinary program variables, and
2. Synchronous References, which are references to those variables declared as taggable.

Further, synchronous references are divided into two subclasses. These subclasses are:
(a) Untagged Synchronous References, which are references that are not tagged; and
(b) Tagged Synchronous References which are those references that are tagged.

Note that a taggable variable may be referenced in untagged as well as tagged fashion. However, both are synchronous references. Synchronous references, therefore, must have different cache management and synchronization constraints than that of the asynchronous references. An untagged-synchronous address, and each of the possible tagged-synchronous addresses, for a taggable variable, appear different to CPU 52, but they in fact represent the same physical address in the PMM 54.

Figure 2:
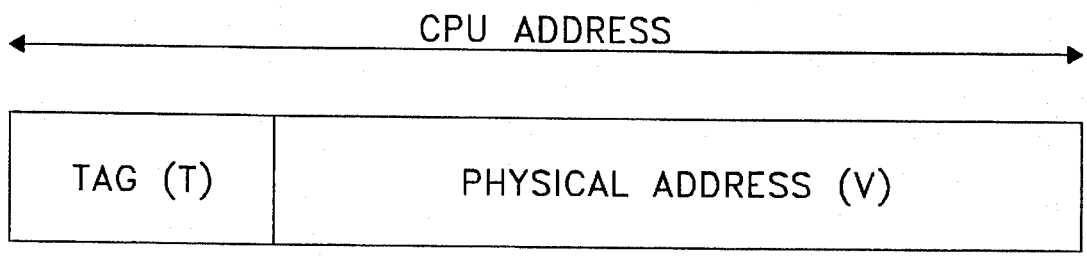
FIG. 2 shows how a CPU address is divided into a tag (T) and a physical address (V).

To identify a reference as tagged-synchronous, untagged-synchronous, or asynchronous, the CPU's address lines are divided logically into two fields, the Physical Address and the Tag, as illustrated in FIG. 2. The Physical Address is the actual address of the variable in PMM 54 and the Tag specifies the class of the variable reference. The tag field can also identify (for LM 60) which event is to be processed and whether or not the event is a data event. (A data event is an event type that not only passes V and T to the LM, but also the data being written to or read from PMM 54.) The number of bits in these two fields are an implementation-dependent parameter.

The Bus Interface Logic (BIL) 82 is a passive device located between CPU 52 and a CPU bus 80. BIL 82 monitors the tag field of the CPU's address lines and performs one of three functions. First, if an asynchronous reference is detected, BIL 82 passes that variable to CPU bus 80 with the tag field cleared. Second, if a tagged-synchronous reference is detected, the address and tag are placed in CPU-LM FIFO 64. If the event is a data event, then the data is also placed in the CPU-LM FIFO 64. Third, BIL 82 communicates with blocking logic 68.

Blocking Logic 68 is a content addressable memory that logically contains synchronization bits for every taggable word in PMM 54. These bits are used to implement the synchronization semantics of references to variables involved in communication. When BIL 82 detects a synchronous reference, it checks BL 68 for the blocking status of that reference. If the reference is not blocked, then CPU 52 may proceed. If the reference is blocked, then CPU 52 has to wait until the blocking is resolved. Note that this hardware blocking is possible only because a single process is permitted on each CPU. BL 68 maintains three blocking bits associated with each taggable variable. These bits are the READ, WRITE, and BIL bit. The BIL bit is set when an event is forwarded, by BIL 82, to the CPU-LM FIFO 64 and reset when the LM 60, or the inhibit logic (IL) 70, finishes processing the event. The other two bits are synchronization bits used to block loads or stores due to pending communication operations.

Inhibit logic (IL) 70 is between CPU-LM FIFO 64 and LM 60. Motivation for this component comes from the perceived need to filter events being sent to the LM 60. IL 70 filters events based on their tag and address fields so LM 60 need not be overburdened with events not actually requiring an action on the part of LM 60. IL 70 can only filter events at the head of the event queue because IL 70 may be set or reset by LM tasks performed in response to events currently in the CPU-LM FIFO 64. After filtering an event, IL 70 clears the BIL bit in BL 68 that was set by BIL 82 when the event enters CPU-LM FIFO 64. The IL's filters are set by the inhibit command in the LM code.

Communication operations are tolerated through the use of the communication co-processor—LM 60 resident in each node of DMMP 1. Data resident in the processor main memory (PMM) 54 is local to that processor, but may be requested by another node or may be released to another node. Each PE 50 and its associated data set is referred to as a locality. Data movement is achieved through the implementation of LM 60. LM 60 is driven by operations provided by the programmer.

In particular, the programmer is able to explicitly indicate when and where data is to be moved. To support the movement of data, extension to the C programming language has been developed, as discussed, for example, in B. W. Kernighan and D. M. Ritchie, "The C Programming Language, Second Edition, Prentice-Hall, Englewood Cliffs, N.J., 1988." A brief description of this C extension, called Seamless-C, is provided in S. A. Fineberg, T. L. Casavant, and B. H. Pease, "A Preliminary Performance Evaluation of the Seamless Parallel Processing System Architecture," The 21st International Conference on Parallel Processing, IL, August 1992, pp. 280–284, which is incorporated herein by reference.

Functionality of LM 60 is contingent upon a run-time environment. This is because LM 60 is programmable and the programmer must provide most of its operations. The programmer is able to define the data movement operations in an LM code (lmc) segment. The lmc code operates much like a C switch statement and is initiated when the user generates a CPU event.

CPU events are events (operations) generated on moveable data. CPU events can be represented by the ordered triple (V, T, C). The referenced variable is depicted by V, the code to be executed by LM 60 is C, and T represents the tag to be used in conjunction with V and C so that LM 60 and its associated hardware can resolve the type of CPU event to be performed. By using tags, multiple LM operations may be mapped to more than one variable and more than one LM operation may be mapped to the same variable.

To initiate an LM operation, the programmer must tag a variable reference. LM 60 is responsible for assigning each event with the proper code (C). Note that only movable data may be tagged. To differentiate movable data from local data, the programmer must declare movable data of the storage class taggable. All taggable variables are global and must be declared in outermost program scope. Generation of a CPU event is illustrated in FIG. 3.

This code segment specifies the events (&n, 0) and (&n, 1). The first event can be read "n tagged with 0 is assigned with the value of p plus 3." In the lmc segment, a taggable variable tagged with 0 will initiate the release of the value of n to some other locality. A taggable variable reference tagged with 1 will initiate a request of the value of n from some other locality.

Essentially, LM 60 is responsible for initiating the request and release operations, but LM 60 may also provide other operations (e.g., the calculations of remote locality numbers). This added functionality allows LM 60 and CPU 52 to minimize their communication with one another and for LM 60 to overlap its operations with CPU computations. The request and release operations will be further discussed later, but first some other important aspects of the lmc code segment must be illustrated.

A number of intrinsically defined variables have been provided to compliment the lmc statements. One of these is loc_num which will represent the locality number in which LM 60 is running. This is defined in both the lmc statement and in the main body. Another intrinsically defined variable is reference. This is available only within the lmc segment. The address of reference will represent the taggable variable that generated a CPU event.

Since LM 60 may require data from the user process, special data events have been defined to pass data to LM 60. These events are just like CPU events, except they pass data along with the V and T identifiers to LM 60. The data value sent to LM 60 is made available in the lmc segment by dereferencing the intrinsic variable reference (i.e. *reference). Data events are tagged in the same manner as CPU events but with an identifier data<N> where <N> is the data event tag label. The code in FIG. 4 illustrates the use of data events and the intrinsic variable reference.

LM 60 provides an additional command, the inhibit operations which was conceived under the presumption that there may be needs to filter events being passed to LM 60. This function will be further described below. To assist in data movement, the request and release operations may be executed within the lmc segment. Note that only taggable variables may be requested and released. Request requires syntax as shown below: req(<local_addr>, <remote_addr>, <remote_locality_num>).

This operation states that the requesting locality will request a variable stored in <remote_addr> from <remote_locality_num> and store the requested variable in <local_addr>. The release operation has syntax as shown below:

rel(<local_addr>, <count>).

Here, the releasing locality will release a variable stored in <local_addr> for a number of <count> times. The <count> value is needed for the release operations so that the locality holding the variable will not overwrite its value before all requesting localities have received that value.

The values of both <local_addr> and <remote_add> must be pointers to taggable data structures. This is needed to ensure synchronization between local and non-local references of the variable being requested or released. In the request operation, the <local_addr> type and the <remote_addr> type must be of the same type. For example, if <remote_addr> is a pointer to a two dimensional array of integers, the entire array will be moved to the requesting locality, not just the first element of the array.

Figure 5:
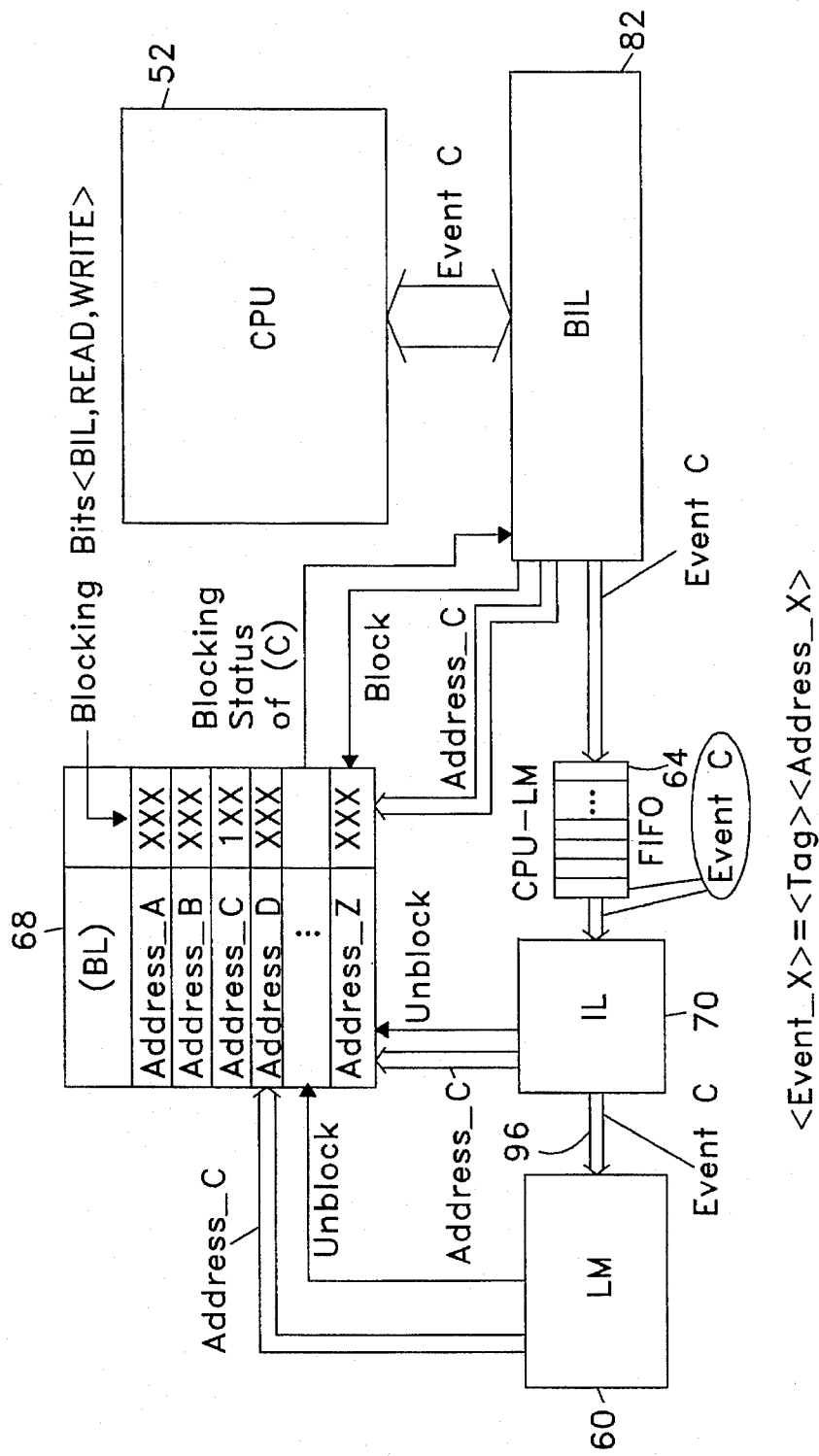
FIG. 5 shows the path of CPU events.

To illustrate the path of CPU events, consider the generation of a tagged synchronous reference by CPU 52, (e.g., Event_C in FIG. 5). BIL 82 passes the physical address of Event_C, (i.e., Address_C), to BL 68 to determine its blocking status. If Address_C is blocked, BIL 82 will suspend the current CPU memory access operation until Address_C is unblocked. After BL 68 indicates to BIL 82 that Address_C is unblocked, Event_C is sent to the CPU-LM FIFO 54 and the BIL bit for Address_C will be asserted in BL 68. Once the event reaches the head of the CPU-LM FIFO 64, it is surveyed by the IL 70. If Event_C is resident in IL 70, then IL 70 will send Address_C, and an unblock signal, to BL 68. If Event_C is not resident in IL 70, the event is removed from CPU-LM FIFO 64 by IL 70, and passed on to LM 60, which then proceeds with the processing of the event. The first action of the LM code segment must set either the Read or Write bit in BL 68 and clear BIL bit. Following the processing of Event_C, LM 60 resets the Read or Write bit in BL 68 and BIL 82 resumes examination of the CPU bus 80.

LM 60 is a communication co-processor for PE 50. As a communication co-processor, LM 60 executes a program which is responsible for initiating communication (i.e., data movement between localities), integrating the results of communication to the computation, and for guaranteeing that CPU 52 maintains proper synchronization with variables involved in communication. LM 60 performs these responsibilities by executing portions of its program invoked by key operations initiated by, and/or coordinated with PEs 50 in multi-processor 1. These key operations, how they arise, the requirements they place on LM 60, and design choices for meeting the requirements, are discussed below.

Locality Manager Responsibilities and Interactions

CPU 52, as the ultimate initiator of all communication, generates tagged synchronous memory references to indicate to LM 60 some information about the state of the computation and the need to perform communication. These tagged synchronous memory references will be referred to as events where an event is an address/tag pair. Events are passively detected on CPU bus 80 by BIL 82. BIL 82 checks/updates the accessibility of a variable by conferring with BL 68, and at the same time passes the event to CPU-LM FIFO 64 for processing by LM 60. CPU-LM FIFO 64 is primarily a queue of events on their way to LM 60 to be processed. IL 70, however, may be configured to filter out events to reduce processing overhead from LM 60.

Events in CPU-LM FIFO 64 indicate to LM 60 some information about the state of the computation and the need to perform communication operations. LM 60 analyzes the address/tag pair, and the current state of the computation (which is determined by the history of events) and determines what action(s) need to be taken. The mapping of the specific action(s) associated with an event is done by the program running on LM 60. Almost exclusively, these events indicate to LM 60 that it should request a variable from another locality, or that a variable may be released to other requesting localities. The details of request/release are embedded within the LM program which an intelligent compiler generates at the same time the CPU program is compiled.

Since LM 60 knows the state of all communication associated with its locality, it is responsible for determining the CPU's ability to reference variables that are involved in communication. For instance, once a variable has been released, CPU 52 can freely LOAD data released, but must be blocked from STORing to the data until it has been transferred to all requesting localities. On the other hand, had the CPU requested a variable, it must be prevented from accessing the data until it has arrived and has been placed into memory.

The CPU's accessibility to data is controlled by stalling the memory reference cycle. This is done by BIL 82 when a reference is found to be illegal by checking the BL 68. LM 60, however, updates the state of the BL blocking bits whenever necessary as the communication of a variable moves through different phases. The BL blocking bits are initially pessimistically set by the BIL 82 to inhibit all accesses to the variable until LM 60 processes the event. As soon as the event is processed, the blocking bits are updated by IL 70 or LM 60 to allow CPU 52 as much access to the variable as possible. This is done to avoid unnecessary stalling of the CPU 52.

When an event is processed by LM 60 and it is time to perform communication, LM 60 interacts with RL 56 to initiate communication. Two forms of locally generated communication may occur. The first is the initiation of a request for a variable from another locality. This form of communication is the result of the processing of an event from CPU-LM FIFO 64. The servicing of a request for a variable after the variable has been released is the second locally generated communication. All outgoing communication is invoked by informing RL 56 to perform the transfer.

The forementioned outgoing communication operations also may be incoming communication operations for a locality. When a request for a variable is received, the message is integrated into and processed by the LM program. When data arrives, the result of a previous request, the data is transferred to memory appropriately. Information from the message is also integrated into and processed by the LM program, resulting in the BL blocking bits being reset.

To minimize the processing requirements of LM 60, IL 70 was introduced into to suppress unnecessary events from reaching LM 60 (i.e., events which do not invoke communication or contain any information which is necessary to monitor the state of the computation). IL 70 suppresses an event by comparing the tag/address of the event with its filters. If a match is found, and the count associated with the filter is not zero, the event is suppressed. If a match is not found, or the count associated with the filter is zero, the event is passed onto LM 60. In order for IL 60 to be used, the filters first must be initiated by LM 60.

An event may indicate a state change in the computation. This state change may indicate to LM 60 that a new set of filters is needed (an old set needs restored). The filters are saved (restored) and replaced with new (old.) filters by LM 60. This saving (restoring) of state is a result of needing more filters than exist, and is much like what would occur with registers during a context switch in a CPU 52.

Locality Manager Design Choice

As discussed, LM 60 is responsible for reading and processing the events from CPU-LM FIFO 64 initiated by CPU 52, updating the state of the BL blocking bits, modifying the state of the IL filters, invoking communication between localities by interacting with RL 56, receiving communication from other localities by processing communication received by RL 56, and maintaining a coherent state between all these operations. This is all coordinated through a program that controls communication for a given application. To support programs, LM 60 needs to have the functionality of a simplified integer CPU. The computational requirements of the communication programs which will run on LM 60 should easily be met by a medium performance integer CPU. Just as important however, LM 60 needs to be able to efficiently interact with many of the other modules in its locality; which include the RL 56, BL 68, and CPU-LM FIFO 64. A key design issue is the nature of the interface between LM 60 and the other modules.

Figure 6:
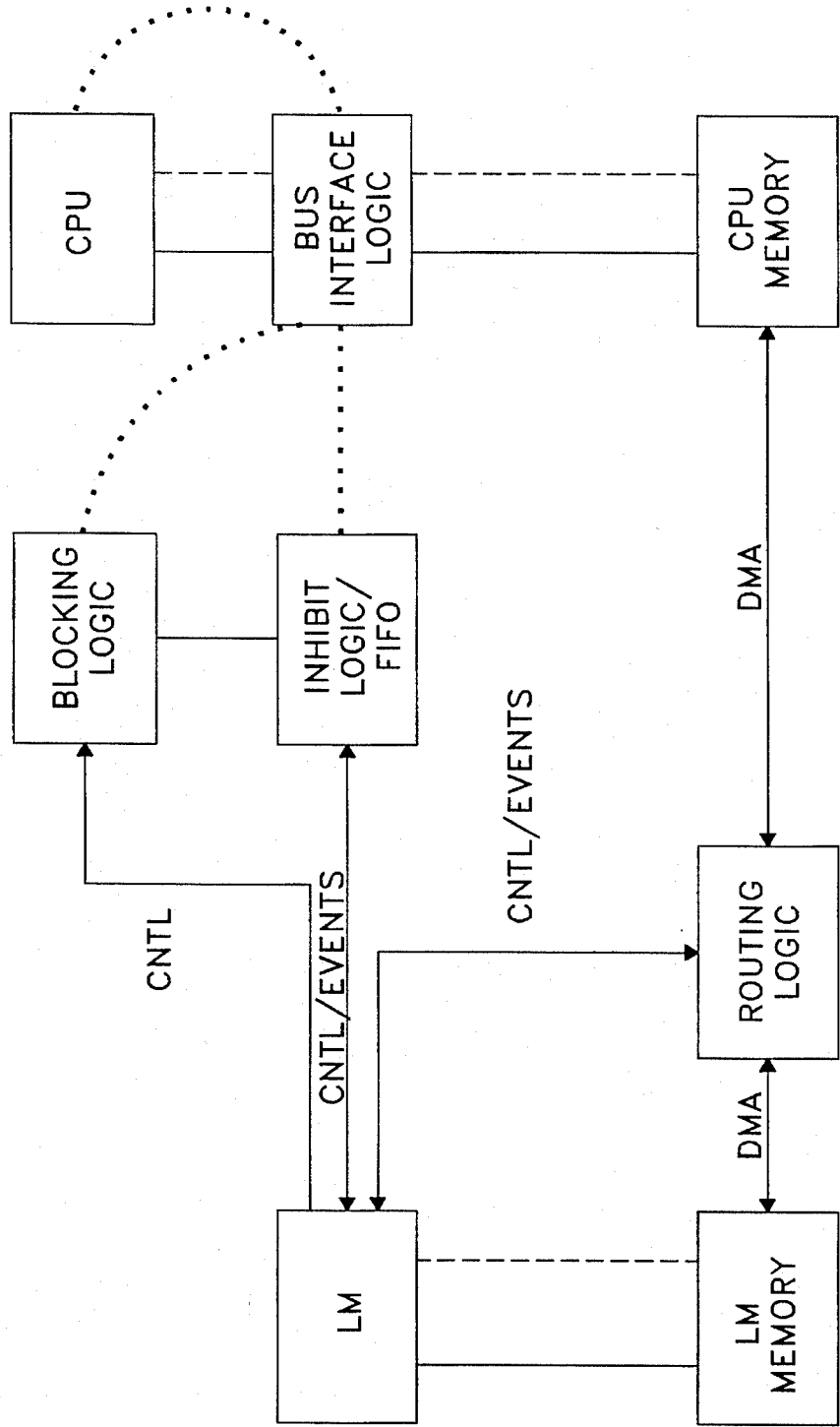
FIG. 6 shows the interaction of dedicated special-purpose input/output ports between all modules that must interact with each other.

The first option considered was to provide dedicated special-purpose input/output ports directly between all the modules that must interact with each other as in FIG. 6. An advantage of this method would be that there is no contention for a communication channel or a bus. This approach has the drawback that the design of all modules (including LM 60) becomes difficult (i.e., long and costly). The ability to modify a component of the architecture and replace it with a new one also becomes more difficult. Furthermore, a large increase in the pin count of the other modules and LM 60 would occur.

Figure 7:
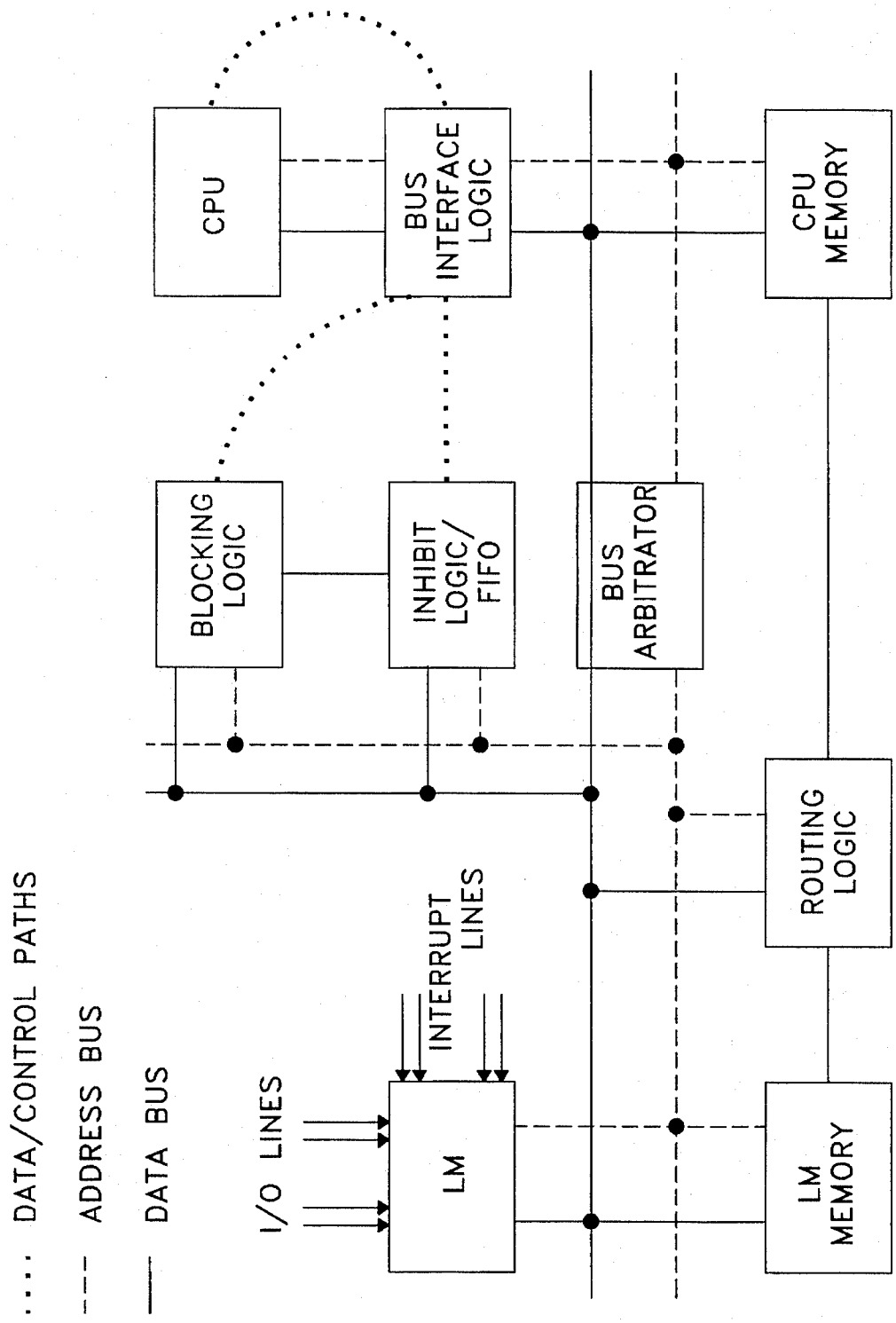
FIG. 7 shows memory mapping into the LM's address space.

The second method to allow LM 60 the necessary access to the other modules is to memory map the devices into the LM's address space as in FIG. 7. This can be done by placing all of the modules on a common bus. A drawback here is the possible contention for the bus between LM 60 and RL 56, the two potential bus masters. However, contention for the bus is not anticipated to be a major bottleneck. This method is simple, elegant, reduces the design complexity of LM 60, and creates a more modular interface between the components, thus allowing modules of the architecture to be more readily modified without affecting the other modules.

Consequently, the method chosen for interfacing the other modules to LM 60 was the second method described above—memory mapping the devices to the LM address space, and the addition of an optimization. The optimization is a special input/output register to aid in interfacing and reducing bus contention. The register is an interface to thirty external pins which may be connected directly to other devices. The other modules produce interrupts and/or use the input/output register to inform LM 60 of information (i.e., state change). Details of the architecture will now be discussed.

DESIGN OF THE LOCALITY MANAGER

Figure 8A:
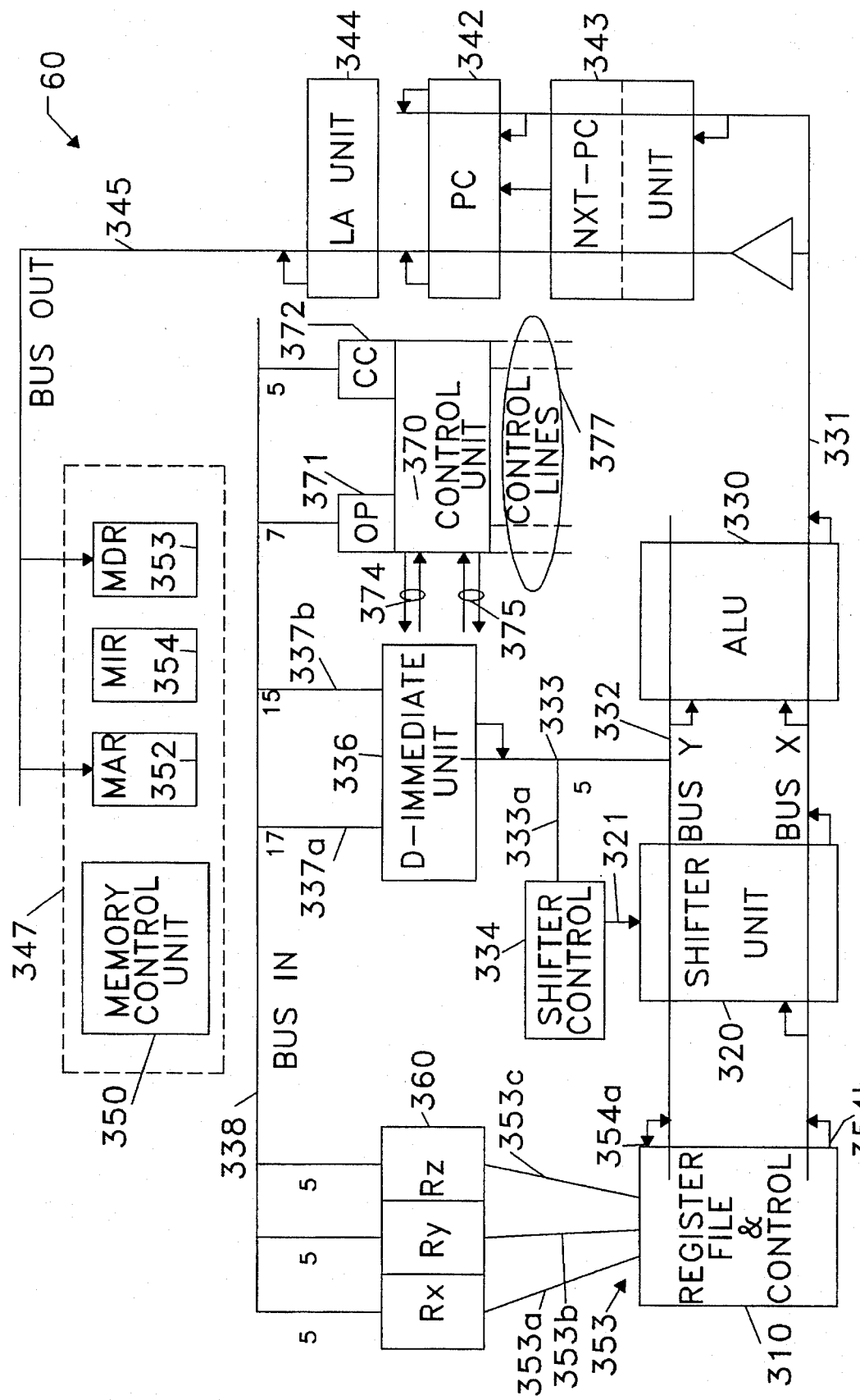
FIG. 8A shows a locality manager architecture and FIG. 8B is a more detailed block diagram of the large register file in FIG. 8A.

As discussed above, the requirements of LM 60 are both the ability to perform computation and to interface with the other modules in a locality to initiate and control communication. A proposed architecture to provide such capabilities is shown in FIG. 8A and is subsequently discussed. First, the architectural features and the instruction set of LM 60 are presented. Then the major features of the non-application specific portions of the program which runs on LM 60 are disgussed.

Architectural Features of the Locality Manager

Many of the features of an integer CPU are provided in the LM architecture to meet its computational requirements. These include a large register file 310, a shifter unit 320 and an integer ALU 330 interconnected by a bus X 331 and a bus Y 332. A shift controller 334 is coupled to a D-immediate unit 336 (a standard register) via bus 333 and line 333*a*. D-immediate unit 336 is also coupled to bus Y 332 via bus 333 and to input bus 338 via lines 337*a* and 337*b*. Input bus 338 corresponds to bus 95 of FIG. 1B.

Bus X 331 is coupled to PC unit 342 (a register/incrementer) and next PC unit 343 (register/incrementer). An output bus 345 couples next PC unit 343, next PC unit 342 and an IA unit 344 (a register) to bus 95. Memory 347 includes a memory control unit 350 controls timing of the signals on bus 95 to enable bus 95 to communicate with LMM 62, and MAR register 352, MDR register 353 and MIR register 354 which interface LM 60 to bus 95 of FIG. 1B. MAR register 352 and MDR 353 are coupled to output bus 345 and MIR register 354 is coupled to input bus 338.

Input bus 338 is coupled to registers 360 which include Rx register 360*a*, Ry register 360*b* and Rz register 360*c* which are coupled to large register file 310 via lines 353 and in particular 353*a*, 353*b* and 353*c*.

Shift controller 334 is connected to shifter unit 320 via line 321 and controls registers in shifter unit 320 in accordance with automatic next PC generation 340. The architecture is a three operand, load store architecture supported by a write-through cache. Control unit 370 serves as a decoder with an (OP) port 371 and a (CC) port 372 coupled to input bus 338, interrupt lines 374 and I/O lines 375 from 83, 93 and 97, respectively, of FIG. 1B. In addition, control unit 370 outputs control signals on control lines 377 to ???.

Figure 8B:
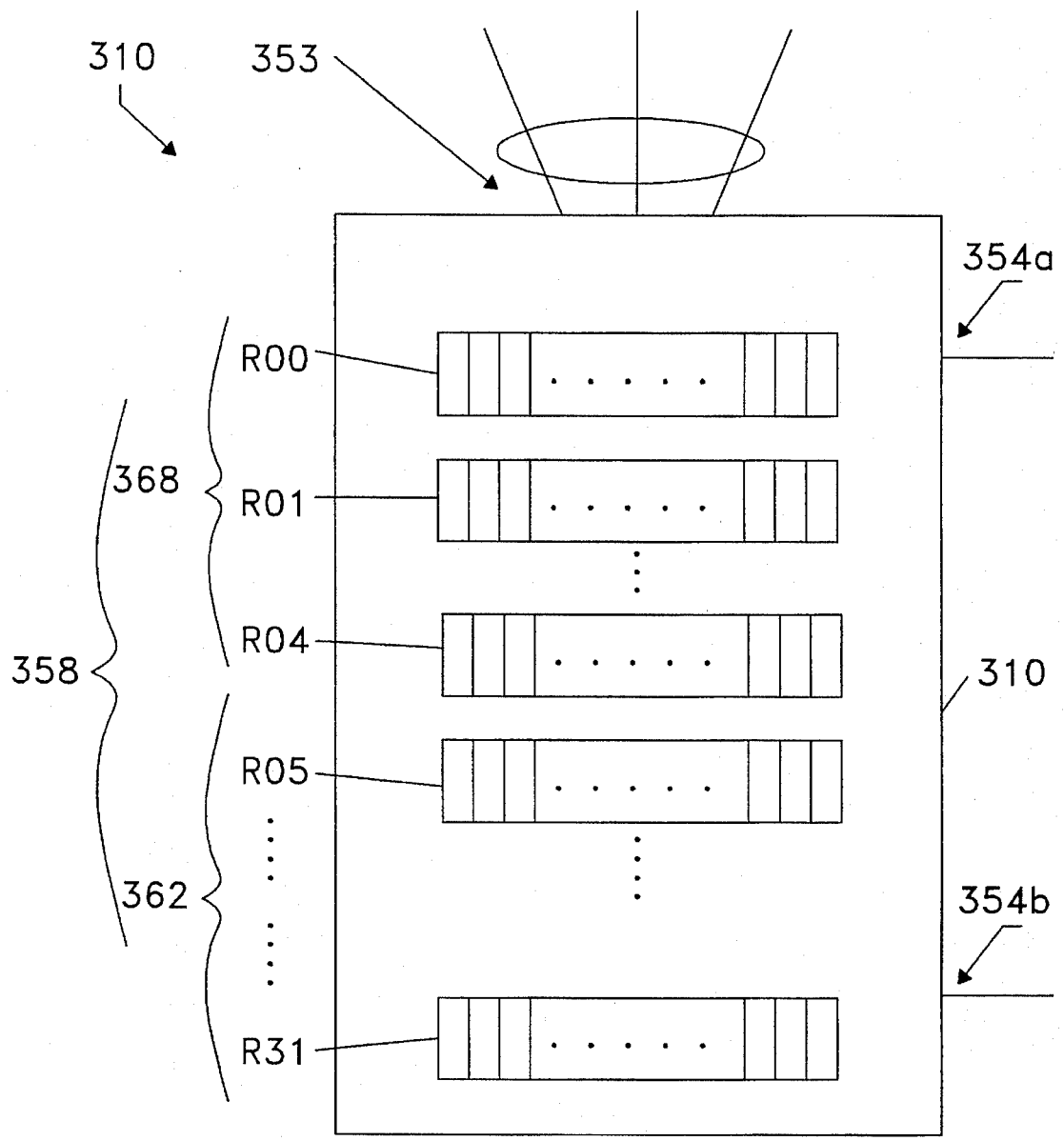

FIG. 8B shows large register file 310 in more detail. In particular, large register file 310 is multi-ported and allows for one input 354*a* and two simultaneous outputs 354*b*. Contained in register file 310 are thirty-two registers 358 (R00 through R31), each thirty-two bits in length. Twenty-nine of the registers 362 (i.e. R05 through R31) are general purpose application registers. The other five registers 368 (R00 through R04) are special purpose registers. R00 is a null register which produces zeros on reading and discards results on writing. R01 is the program status word, which contains the condition codes and the interrupt priority mask. R02 and R03 are the system stack pointer and the user stack pointer respectively. These registers have auto increment/decrement capabilities designed into them to expedite stack calculations when an interrupt, a subroutine call or a return from either occurs. The application must still access and modify these registers to put operands or parameters onto the stacks and to take operands off of the stacks. R04 is an input/output register used to enhance the LM's ability to interface and control other devices in its locality.

Figure 9:
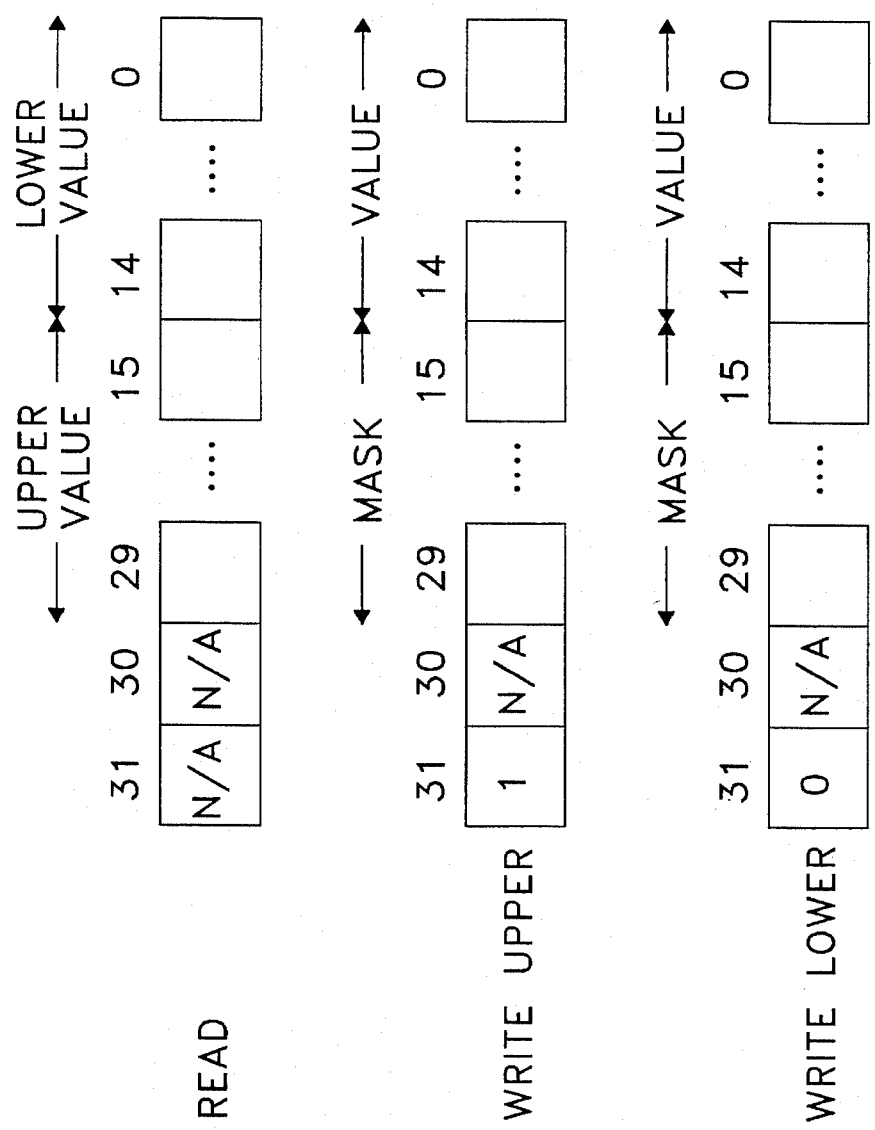
FIG. 9 shows the allocations of bits on input/output lines.

The enhancement of the input/output register allows LM 60 to have up to thirty pins 372 dedicated to status and/or control of external devices. This enhancement reduces contention for the bus to check status and/or perform simple control of external devices. For reading purposes (i.e., when the register is a source operand), the low order thirty bits provide the values on the input/output lines (see FIG. 9). Since it is not possible to set any arbitrary combination of bits to an arbitrary value with any single operation provided in the instruction set, a mask/value pair is used to indicate which bits to modify, and what values the bits are to take on. Therefore, for writing purposes (i.e., when the register is a destination operand), only fifteen of the thirty lines may be accessed at a time. Bit thirty-one is used to determine if the upper or lower fifteen input/output lines are to be accessed, bits twenty-nine through fifteen are the mask and bits fourteen through zero are the value.

To read the input/output register (i.e., R04) and place the result into R05 the following instruction suffices:

OR R0, R4, R5

To write the binary value 101 to input/output lines 2, 3, and 4, the following instruction suffices:

OR R0, R5, R4

The source operand must provide the proper value and mask which is now described. Bit 31 is set to zero to select the first fifteen input/output lines. In the mask portion, bits 19, 18 and 17 are set to one to control the lines to which output will be written, all other bits in the mask are set to zero. In the value, bits 4, 3, and 2 are set to 101 respectively to represent the value to be written to the lines; the other bits in the mask are arbitrary. Therefore, R5 would have had to previously been initialized to $000E0014 before the operation.

ALU 30 supports the following operations: ADD, AND, DIV, EOR, MUL, and OR, which are all completed in fixed time. Also supported is the inversion of the input on the Y bus input. The shifter is capable of n bit, bi-directional shifts in constant time. The shifts may be arithmetic, logical, or rotational. Address calculation is done in hardware and does not interfere with, nor require the operation of, the arithmetic logic unit under the conditions of sequential execution of a program.

The instruction set consists of twenty-five simple instructions. From this simple set of instructions, all other desirable operations can be derived with a sequence of one or more of the instructions provided. This approach simplifies the design and complexity of LM 60 and of the compiler. All instructions are thirty-two bits in length except those instructions requiring address calculation, or specification that cannot fit within thirty-two bits, and therefore use an additional word.

The instructions to interface with the memory hierarchy are LOAD and STORE, their uncacheable versions, LOADU and STOREU (which are ideal for dealing with memory mapped devices), and a cache line invalidation instruction INVAL. Arithmetic operations are provided through the instructions ADD, ADDI, DIV, MUL, SUB, and SUBI. ADDI and SUBI use an immediate operand as the second source. Logical operations are provided through the instructions AND, EOR, and OR. Arithmetic shifts, logical shifts and rotational operations are provided through the instructions ASL, ASR, LSL, LSR, ROL, and ROR respectively. A suite of branch instructions (Bcc), JMP, JSR, and RTS provide program flow control and RTE provides exception control. For more information on the instruction set and detail regarding specific instructions see the section entitled Instruction Set.

External devices are memory mapped to the LM's address space allowing the LM access to all the devices necessary. For LM 60 to read a device, it reads the location(s) in memory (LMM 62) corresponding to the device of interest. Similarly for writing to a device, LM 60 writes to the location(s) in memory corresponding to the device of interest. When an external device needs to inform LM 60 of information (i.e., state change) the device generates an interrupt. An appropriate interrupt service routine in the LM's program then services the device accordingly.

The ability of LM 60 to perform computation and to interface with external devices is provided for in the above approach. Computational capabilities are provided through many of the features of an integer CPU. The ability to interface with external devices is provided through an approach of memory mapping devices, using interrupts to signify when devices need servicing, and using the input/output register (R04 of FIG. 8B) to assist this process.

Locality Manager Program Features

It is the program which executes on LM 60 that allows for the initiation and coordination of communication. The program executes a main loop and coordinates the servicing of the external devices through interrupt service routines when they generate interrupts. Information which is gathered by the interrupt service routines from these devices is integrated into various data structures that contain communication state information. This state information is analyzed in the main loop of the program in order to make decisions about when communication may occur, and other factors relating to the communication of data.

The primary capabilities necessary for the program to function as described above are:
1. ability to interface with CPU-LM FIFO 64,
2. ability to read from RL 56,
3. ability to write to RL 56,
4. ability to update the state of BL 68,
5. manage the queue of messages to be sent, and
6. manage the list of messages received.

Other secondary capabilities of program are:
1. ability to perform grouping in BL 68,
2. ability to save the state of IL 70, and
3. ability to restore the state of IL 70.

These secondary features all involve interfacing with the respective external devices through both memory mapped ports and through the use of the input/output register. Primarily, these tasks perform initialization, save/restore state, or other similar things not important to the program's operation during steady state.

The program has three major data structures. The first data structure, the send queue, is a queue of messages which are ready to be sent out over the interconnection network by RL 56 to other localities (see FIG. 10). New elements are placed at the head of the queue while elements being processed by RL 56 are removed from the tail. Each element contains the six fields which correspond to the six control registers of the RL (i.e. source, source node, destination, destination node, type, and length).

Figure 11:
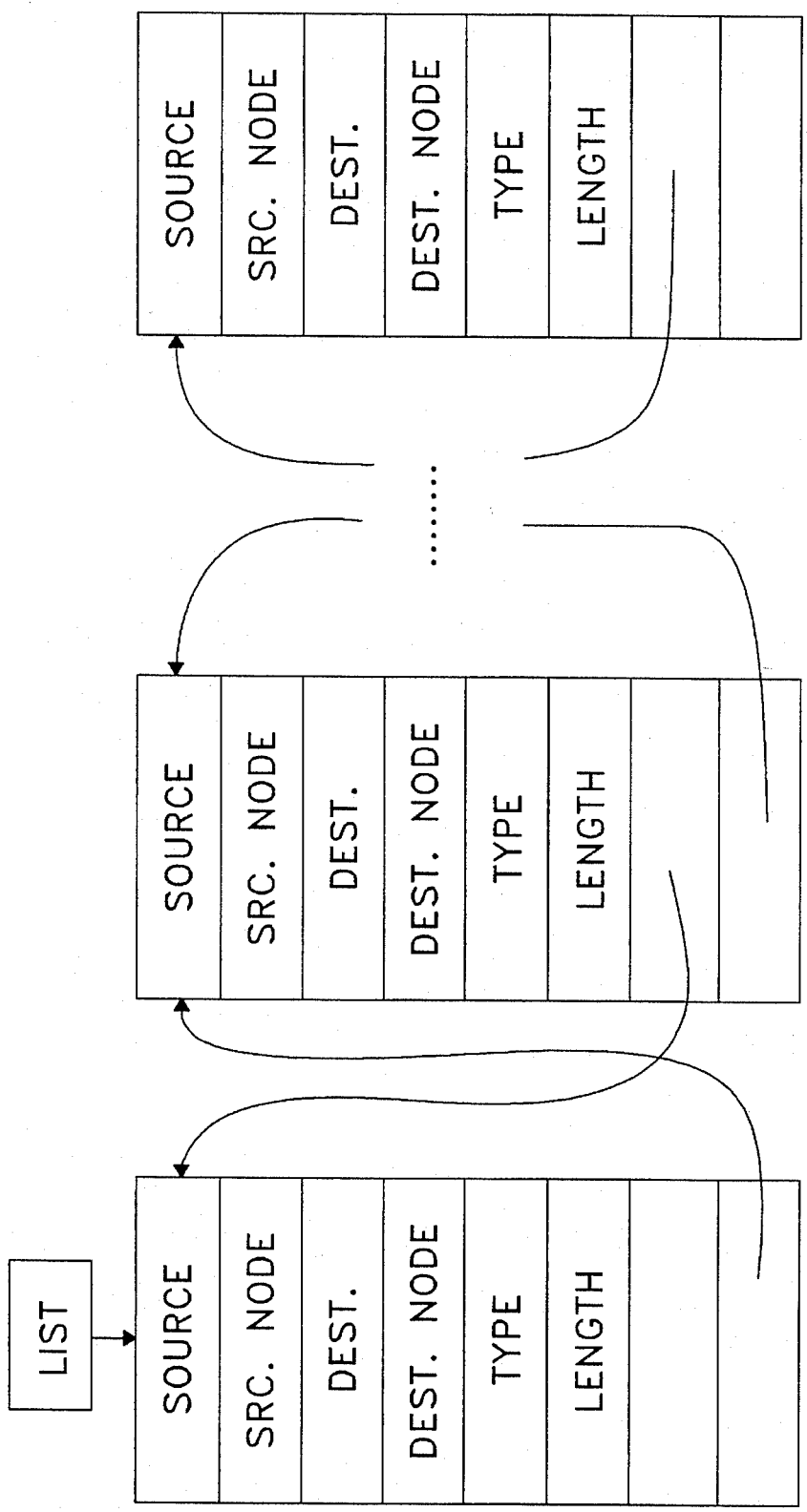
FIG. 11 shows the list of requests data structure.

The second data structure, the list of requests, is a list of requests received through the interconnection network by RL 56 from other localities (see FIG. 11). The list is used as the method for storing and managing pending requests. Each element in the list contains the six fields which correspond to the six control registers of the RL 56. Elements are transferred out of the request list to the send queue as the variables being requested are released. This is done by application specific portions of code and by analyzing the entries in the request list against the entries in a data table, the third data structure.

The data table contains information regarding communication and taggable variables and is indexed through address/tag pairs from events. The table is updated to reflect changes in the communication state of a variable as communication progresses. The data table is application-specific, and coupled closely to portions of code which run on LM 60.

At the center of the program (see FIG. 12) is a loop with two major tasks. The first task, check_send_queue, is responsible for transferring messages from the send queue to RL 56 to be sent to other localities. This occurs only if there are messages in the send queue and RL 56 is free. The primary operation of this task consists of dequeueing the tail element and passing it to RL 56 for transmission.

RL 56 is interfaced through a routine with functionality similar to the one shown in FIG. 13. The parameters for the send are copied from the send queue into the control registers of RL 56. Once the send has completed, after the DMA transfer if data is involved, a level 9 interrupt is generated. The interrupt signifies two things, the first being that RL 56 is free. The second is the point at which the data table and the BL block bits can be updated accordingly. This interrupt service routine is almost entirely application specific.

The second task in the main loop check_rec_list, checks each entry in the request list against the entries in the data table to see if any of the pending requests are now serviceable (i.e., have been released). Those entries which are found serviceable are transferred from the request list to the head of the send queue.

TABLE 1

Interrupt Mapping

| LEVEL | DESCRIPTION |
|---|---|
| 9 | RL is free after a send. |
| 10 | RL has received a message. |
| 11 | RL is free after receiving a message. |
| 12 | an event is at the head of the CPU-LM FIFO |

Outside of the program's main loop are several interrupt service routines to service external devices. These routines supply inputs from the external devices which are processed and cause the states of the three major data structures to be modified. Table 1 presents the interrupt levels used along with a brief statement describing what causes the interrupt service routine to be executed. Some of the major interrupt service routines are subsequently discussed.

LM 60 invokes an interrupt service routine to read an event from the head of CPU-LM FIFO 64, when a level 12 interrupt occurs. The interrupt service routine has a functionality similar to the routine show in FIG. 14. The event, the result of a tagged synchronous memory reference, is first read from FIFO 64 after which the tag and the address of the event are then determined. The address and tag are used to index into the data table to both update it and determine what action(s) should be taken. The specific action(s) to be taken are application specific and thus are difficult to describe. One possible action may be the release of data. A release of data is done simply by modifying the data table. Another possible action may be the request for data. A request for data results in both modifying the data table and in a request being placed at the head of the send queue. These operations received from CPU-LM FIFO 64 generally involve some modification of the BL blocking bits.

LM 60 invokes an interrupt service routine to read a newly arrived message at RL 56, when a level 10 interrupt occurs. The interrupt service routine has a functionality similar to that shown in FIG. 15. The type of the message received is first analyzed to determine if the message is a request for data or the result of a previous request. If the type of message is a request for data, the control registers of RL 56 are copied into the request list so that the request may be processed later. If the type of message is data from a previous request, the input/output register is used to inform RL 56 to proceed with the DMA transfer of the data out of the interconnection network and into memory at which point the routine exits. When the DMA transfer is complete a level 11 interrupt is generated which signifies the point at which the data table and the BL blocking bits can be updated. The interrupt service routine for the level 11 interrupt, like the level 9 interrupt service routine, is almost entirely application specific.

Many routines in the LM program modify the BL blocking bits. This is done through a routine functionality similar to that shown in FIG. 16. First the address of the data element is written to BL 68. The input/output register is then used to set the blocking bits accordingly. The BL blocking bits are updated by the rules described in Table 2. Recall that the BL blocking bits are used to control the CPU's accessibility to synchronous variables. The top row depicts the action which is causing the BL blocking bits to be updated. The initiating actions for blocking are a request event and a release event. The terminating actions for blocking are when the last request for a variable has been serviced and when data has arrived in response to a previous request. It is not always necessary to perform both read blocking and write blocking, which is what is specified in the table.

TABLE 2

BL Blocking Bits Update Rules

|  | REQUEST | RELEASE | LAST REQUEST | DATA ARRIVAL |
|---|---|---|---|---|
| READ BLOCK | Y | N | N | N |
| WRITE BLOCK | Y | Y | N | N |

Together these subroutines, interrupt service routines, and data structures are the non-application specific portions of the LM program responsible for the coordination of communication in a locality. These routines provide the infrastructure necessary for the application specific portions of the program to perform the coordination and control of communication. The application specific portions of code and its data structures are generated by the compiler when the application is compiled and can become arbitrarily complex.

Instruction Set

The Locality Manager instruction set provides for the following instructions. With this set of simple instructions, more powerful operations can be developed through a sequence of these instructions. The instruction set can loosely be broken into the following five categories of instruction types:

* DATA MOVEMENT and MEMORY CONTROL
    INVAL   LOAD   LOADU   STORE   STOREU
* INTEGER ARITHMETIC OPERATIONS
    ADD   ADD1   DIV   MUL   SUB   SUB1
* BITWISE LOGICAL OPERATIONS
    AND   EOR   OR
* SHIFT and ROTATE OPERATIONS
    ASL   ASR   LSL   LSR   ROL   ROR
* PROGRAM and EXCEPTION CONTROL
    Bcc   JMP   JSR   RTE   RTS Other common operations can be derived from this set of instructions. Some of these common derivatives are given in Table 3 where the desired operation is on the left and the LM instruction to perform the operation is on the right.

Instruction formats are generally 32 bits long, with the exception being those instructions which involve a complete address for an operation which involves generating a new value for the PC. The breakdown of how the various fields are used for instruction decoding is provided in FIG. 17.

TABLE 3

Instruction Derivatives

| DESIRED OPERATIONS | SEAMLESS OPERATION |
|---|---|
| clear Rx | AND Rx,R0,Rx |
| invert Rx | EOR Rx,R0,Rx |
| move Rx to Ry | OR Rx,R0,Ry |
| no operation | ADD R0,R0,R0 |

ADD

| | |
|---|---|
| SYNTAX: | add rX,rY,rZ |
| OPERATION: | Rz = Rx + Ry |
| | set cc |

DESCRIPTION

Add performs two's complement addition. The sources Rx and Ry are added and the result is placed into Rz. Status bits are affected as described below.

STATUS BITS AFFECTED

N—set if result is negative, cleared otherwise

Z—set if result is zero, cleared otherwise

V—set if overflow occurred, cleared otherwise

C—set if carry occurred, cleared otherwise

INSTRUCTION FORMAT

Instruction Format: Formar1 opcode=[0000001]

ADDI

| | |
|---|---|
| SYNTAX: | ADDI Rx,#xxx,Rz |
| OPERATION: | Rz = Rx + #xxx |
| | set cc |

DESCRIPTION

Add performs two's complement addition. The sources Rx and #xxx, a 15 bit two's complement number sign extended to 32 bits, are added and the result is placed into Rz. Status bits are affected as described below.

STATUS BITS AFFECTED

N—set if result is negative, cleared otherwise

Z—set if result is zero, cleared otherwise

V—set if overflow occurred, cleared otherwise

C—set if carry occurred, cleared otherwise

INSTRUCTION FORMAT

Instruction Format: Format2 opcode=[000010]

AND

| | |
|---|---|
| SYNTAX: | AND Rx,Ry,Rz |
| OPERATION: | Rz = Rx · Ry |
| | set cc |

DESCRIPTION

And performs a bitwise and operation. The sources Rx and Ry are bitwise and'ed and the result is placed into Rz. Status bits are affected as described below.

STATUS BITS AFFECTED

N—set if MSB of result is set, cleared otherwise

Z—set if result is zero, cleared otherwise

V—always cleared

C—always cleared

INSTRUCTION FORMAT

Instruction Format: Format1 opcode=[0000011]

ASL

| | |
|---|---|
| SYNTAX: | ASL Rx,Ry,Rz |
| OPERATION: | shift Rx left by Ry bits, shift in zeros, place result in Rz |
| | set cc |

DESCRIPTION

Asl performs an arithmetic shift left. The source Rx is arithmetically shifted left by the value in the low order five bits of Ry, the result is then placed into Rz. Status bits are affected as described below.

STATUS BITS AFFECTED

N—set if MSB of the result is set, cleared otherwise

Z—set if result is zero, cleared otherwise

V—set if MSB is changed at any time during the shift, cleared otherwise

C—set according to last bit shifted out, cleared otherwise

INSTRUCTION FORMAT

Instruction Format: Format1 opcode=[0000100]

ASR

| | |
|---|---|
| SYNTAX: | ASR Rx,Ry,Rz |
| OPERATION: | shift Rx right by Ry bits, shift in the sign bit, place result in Rz |
| | set cc |

DESCRIPTION

Asr performs an arithmetic shift right. The source Rx is arithmetically shifted right by the value in the low order five bits of Ry, the result is then placed into Rz. Status bits are affected as described below.

STATUS BITS AFFECTED

N—set if MSB of the result is set, cleared otherwise

Z—set if result is zero, cleared otherwise

V—set if MSB is changed at any time during the shift, cleared otherwise

C—set according to last bit shifted out, cleared otherwise

INSTRUCTION FORMAT

Instruction Format: Formar1 opcode [0000101]

Bcc

SYNTAX: Bcc<label>
OPERATION: Pc = <ea> a     <ea> = $xxxxxx mode b     <ea> = PC + #xxxmode unaffected     the cc are

CC OPTIONS:

| CODE | BCOPERATIONBOOLEAN |
|---|---|
| cc | 0000carry clearc |
| cs | 0001carry setc |
| eq | 0010equalz |
| ge | 0011greater than or |
| equal | $n \cdot v + \overline{n} \cdot \overline{v}$ |
| gt | 0100greater than$\overline{n} \cdot \overline{v} \cdot \overline{z}$ |

-continued

| | |
|---|---|
| _ n · v · z | |
| le | 0101 less than or equal z + |
| n · v _ n · v | |
| lt | 0110 less than n · v + n · v |
| mi | 0111 minus n |
| ne | 1000 not equal z |
| pl | 1001 plus n |
| vc | 1010 overflow clear v |
| vs | 1011 overflow set v |
| ra | 1100 branch always not used |

DESCRIPTION

Bcc performs a conditional branch. If the condition, denoted by the condition code field (CC), is true, program execution begins at the effective address, otherwise program execution continues at the next address. Note that mode B has an offset limited to a 15 bit two's complement number. Condition codes are not affected.

| | |
|---|---|
| INSTRUCTION FORMAT: | |
| mode a | mode b |
| Instruction Format: Format 6 | Instruction Format: Format3 |
| opcode = [0000110] | opcode = [0000111] |

| | |
|---|---|
| | DIV |
| SYNTAX: DIV Rx,Ry,Rz | |
| OPERATION: | |
| Rz = Rx/Ry | Rz = 32 bits (16-quotient/16-remainder) |
| | set cc |

DESCRIPTION

Div performs signed division. The source Rx is divided by the source Ry and the result is placed into Rz. The upper 16-bits of the result are the quotient and the lower 16-bits are the remainder. Status bits are affected as described below. Make a statement about overflow

STATUS BITS AFFECTED

N—set if quotient is negative, cleared otherwise

Z—set if quotient is zero, cleared otherwise

V—set is division overflow occurred (divided by zero)

C—always cleared

INSTRUCTION FORMAT

Instruction Format: Format1 opcode=[0001000]

| EOR | |
|---|---|
| SYNTAX: | EOR Rx,Ry,Rz |
| OPERATION: | Rz = Ry · Rx + Ry · Rx |
| | set cc |

DESCRIPTION

Eor performs a bitwise exclusive or operation. The sources Rx and Ry are bitwise exclusive or'ed and the result is placed into Rz. Status bits are affected as described below.

STATUS BITS AFFECTED

N—set if MSB of result is set, cleared otherwise

Z—set if result is zero, cleared otherwise

V—always cleared

C—always cleared

INSTRUCTION FORMAT

Instruction Format: Format1 opcode=[0001001]

| INVAL | |
|---|---|
| SYNTAX: | INVAL address |
| OPERATION: | invalidate a cache line |
| | cc unaffected |

DESCRIPTION

If the address is a hit in the cache, invalidate the line. Status bits are unaffected.

STATUS BITS AFFECTED: unaffected

INSTRUCTION FORMAT

Instruction Format: Format4 opcode=[0001010]

| JMP | |
|---|---|
| SYNTAX: | JMP<label> |
| OPERATION: | PC = <ea> |
| | <ea> = $xxxxxx |
| | the cc are unaffected |

DESCRIPTION

JMP performs an unconditional jump to the effective address. Condition codes are not affected.

INSTRUCTION FORMAT

Instruction Format: Format6 opcode=[0001011]

| JSR | |
|---|---|
| SYNTAX: | JSR<address> |
| OPERATION: | USP – 4 —> USP |
| | PC —> (USP) |
| | PC = <ea> |
| | <ea> = $xxxxxx mode a |
| | <ea> = PC + #xxx mode b |
| | the cc are unaffected |

DESCRIPTION

Jrs performs a jump to subroutine operation. The PC is placed on the user stack after the USP has been decremented. The PC is assigned the effective address (ea), the point where the program will resume normal execution. Note that mode b has an offset limited to a 15 bit two's complement number. Condition codes are not affected.

INSTRUCTION FORMAT mode a

Instruction Format: Format6 opcode=[0001100]

mode b

Instruction Format: Format3 opcode=[0001101]

| LOAD/LOADU | |
|---|---|
| SYNTAX: | LOAD<ea>,Rz |
| | <ea> = $xxxxxx mode a (mode c uncached) |
| | <ea> = #xxx[Rx] mode b (mode d uncached) |
| OPERATION: | memory location —> register |
| | set cc |

DESCRIPTION

Load moves a 32 bit word of data from the location in memory given by the effective address and places the value into the register designated. Note that mode b has an offset limited to a 15 bit two's complement number. Uncached loads are available for both forms by using modes c and d respectively. Status bits are affected as described below.

STATUS BITS AFFECTED

N—set if result is negative, cleared otherwise
Z—set if result is zero, cleared otherwise
V—always cleared
C—always cleared

| INSTRUCTION FORMAT: | |
|---|---|
| mode a | mode b |
| Instruction Format: Format5 | Instruction Format: Format2 |
| opcode = [0001110] | opcode = [0001111] |
| mode c | mode d |
| Instruction Format: Format5 | Instruction Format: Format2 |
| opcode = [0010000] | opcode = [0010001] |
| mode c | mode d |
| Instruction Format: Format 5 | Instruction Format: Format2 |
| opcode = [0010000] | opcode = [0010001] |

| LSL | |
|---|---|
| SYNTAX: | LSL Rx,Ry,Rz |
| OPERATION: | shift Rx left by Ry bits, shift in zeros, result to Rz |
| | set cc |

DESCRIPTION

Lsl performs a logical shift left. The source Rx is logical shifted left by the value in the low order five bits of Ry, the result is then placed into Rz. Status bits are affected as described below.

STATUS BITS AFFECTED

N—set if result is negative, cleared otherwise
Z—set if result is zero, cleared otherwise
V—always cleared
C—set according to last bit shifted out cleared for a shift count of zero INSTRUCTION FORMAT
Instruction Format: Format1
opcode=[0010010]

| LSR | |
|---|---|
| SYNTAX: | LSR Rx,Ry,Rz |
| OPERATION: | shift Rx right by Ry bits, shift in zeros, result to Rz |
| | set cc |

DESCRIPTION

Lsr performs a logical shift right. The source Rx is logical shifted right by the value in the low order five bits of Ry, the result is then placed into Rz. Status bits are affected as described below.

STATUS BITS AFFECTED

N—set of result is negative, cleared otherwise
Z—set if result is zero, cleared otherwise
V—always cleared
C—set according to last bit shifted out cleared for a shift count of zero INSTRUCTION FORMAT
Instruction Format: Format1
opcode=[0010011]

| MUL | |
|---|---|
| SYNTAX: | MUL Rx,Ry,Rz |
| OPERATION: | Rz = Rx * Ry |
| | set cc |

DESCRIPTION

Mul performs signed multiplication. The source Rx is multiplied by Ry and the result is placed into Rz. Status bits are affected as described below. [make a statement about overflow}

STATUS BITS AFFECTED

N—set if result is negative, cleared otherwise
Z—set if result is zero, cleared otherwise
V—set if overflow occurred, cleared otherwise
C—always cleared INSTRUCTION FORMAT
Instruction Format: Formar1
opcode=[0010100]

| OR | |
|---|---|
| SYNTAX: | OR Rx,Ry,Rz |
| OPERATION: | Rz = Rx + Ry |
| | set cc |

DESCRIPTION

Or performs a bitwise or operation. The sources Rx and Ry are bitwise or'ed and the result is placed into Rz. Status bits are affected as described below.

STATUS BITS AFFECTED

N—set if MSB of result is set, cleared otherwise
Z—set if result is zero, cleared otherwise
V—always cleared
C—always cleared INSTRUCTION FORMAT
Instruction Format: Format1
opcode=[0010101]

| ROL | |
|---|---|
| SYNTAX: | ROL Rx,Ry,Rz |
| OPERATION: | rotate Rx left by Ry bits, result to Rz |
| | set cc |

DESCRIPTION

Rol performs a rotate left. The source Rx is rotated left by the value in the low order five bits of Ry, the result is then placed into Rz. Status bits are affected as described below.

STATUS BITS AFFECTED

N—set if MSB of the result is set, cleared otherwise

Z—set if result is zero, cleared otherwise

V—always cleared

C—set according to last bit rotated out cleared for a rotate count of zero

INSTRUCTION FORMAT

Instruction Format: Format1 opcode=[0010110]

ROR

| SYNTAX: | ROR Rx,Ry,Rz |
| --- | --- |
| OPERATION: | rotate Rx right by Ry bits, result to Rz |
| | set cc |

DESCRIPTION

Ror performs a rotate right. The source Rx is rotated right by the value in the low order five bits of Ry, the result is then placed into Rz. Status bits are affected as described below.

STATUS BITS AFFECTED

N—set if MSB of the result is set, cleared otherwise

Z—set if result is zero, cleared otherwise

V—always cleared

C—set according to last bit rotated out cleared for a rotate count of zero

INSTRUCTION FORMAT

Instruction Format: Format1 opcode=[0010111]

RTE

| SYNTAX: | RTE |
| --- | --- |
| OPERATION: | (SSP) —> PSR |
| | SSP + 4 —> SSP |
| | (SSP) —> PC |
| | SSP + 4 —> SSP |
| | the cc are unaffected |

DESCRIPTION

Rte performs a return from exception. The PSR is located from the top of the stack, the SSP is then decremented. The PC is loaded from the top of the stack, the SSP is then decremented. Condition codes are not affected.

INSTRUCTION FORMAT

Instruction Format: Format4 opcode [0011000]

RTS

| SYNTAX: | RTS |
| --- | --- |
| OPERATION: | (USP) —> PC |
| | USP + 4 —> USP |
| | the cc are unaffected |

DESCRIPTION

Rts performs a return from subroutine. The PC is loaded from the top of the stack, the USP is then decremented. Condition codes are not affected.

INSTRUCTION FORMAT

Instruction Format: Format4 opcode=[0011001]

STORE/STOREU

| SYNTAX: | STORE Rz,<ea> |
| --- | --- |
| | <ea> = $xxxxxx mode a (mode c, uncached) |
| | <ea> = $xxx[Rx] mode b (mode d, uncached) |
| OPERATION: | register —> memory location |
| | set cc |

DESCRIPTION

Store moves a 32 bit word from the given register and places the value in the memory location given by the effective address. Note that mode b has an offset limited to a 15 bit two's complement number. Uncached stores are available for both forms by using modes c and d respectively. Status bits are affected as described below.

STATUS BITS AFFECTED

N—set if result is negative, cleared otherwise

Z—set if result is zero, cleared otherwise

V—always cleared

C—always cleared

INSTRUCTION FORMAT:

| mode a | mode b |
| --- | --- |
| Instruction Format: Format5 Format: Format2 | Instruction |
| opcode = [0011010] | opcode = [0011011] |
| mode c | mode d |
| Instruction Format: Format5 Format: Format2 | Instruction |
| opcode = [0011100] | opcode = [0011101] |

SUB

| SYNTAX: | SUB Rx,Ry,Rz |
| --- | --- |
| OPERATION: | Rz = Rx − Ry |
| | set cc |

DESCRIPTION

Sub performs two's complement subtraction. The source Ry is subtracted from Rx and the result is placed into Rz. Status bits are affected as described below.

STATUS BITS AFFECTED

N—set if result is negative, cleared otherwise

Z—set if result is zero, cleared otherwise

V—set if overflow is generated, cleared otherwise

C—set if borrow is generated occurred, cleared otherwise

INSTRUCTION FORMAT

Instruction Format: Formar1 opcode [0011110]

SUBI

| SYNTAX: | SUBI Rx,#xxx,Rz |
| --- | --- |
| OPERATION: | Rz = Rx − #xxx |
| | set cc |

DESCRIPTION

Sub performs two's complement subtraction. The source #xxx, a 15 bit two's complement number sign extended to 32 bits, is subtracted from Rx and the result is placed into Rz. Status bits are affected as described below.

STATUS BITS AFFECTED

N—set if result is negative, cleared otherwise

Z—set if result is zero, cleared otherwise

V—set if overflow is generated, cleared otherwise

C—set if borrow is generated occurred, cleared otherwise

INSTRUCTION FORMAT

Instruction Format: Format2 opcode=[0011111]

BLOCK LOGIC

Motivation

BIL 82 passively monitors CPU bus 80 to detect synchronous memory references. All communication operations are performed as a result of tagged synchronous reference by LM 60. Data requested from another locality should be received before it is to be used. If the data has not arrived by the time it is to be used by CPU 52, CPU 52 must be blocked from accessing the data until the receive is complete. When a variable is released, CPU 52 can overwrite it only when all the localities which require the data have requested and received it. Thus, some mechanism is required for blocking CPU 52. BL 68 is implemented in the PE 50 to provide this function. The function of BL 68 is to maintain the required data coherence across localities. Described below is a detailed design of BL 68, its association with other modules in locality, and its functional description.

Figure 18:
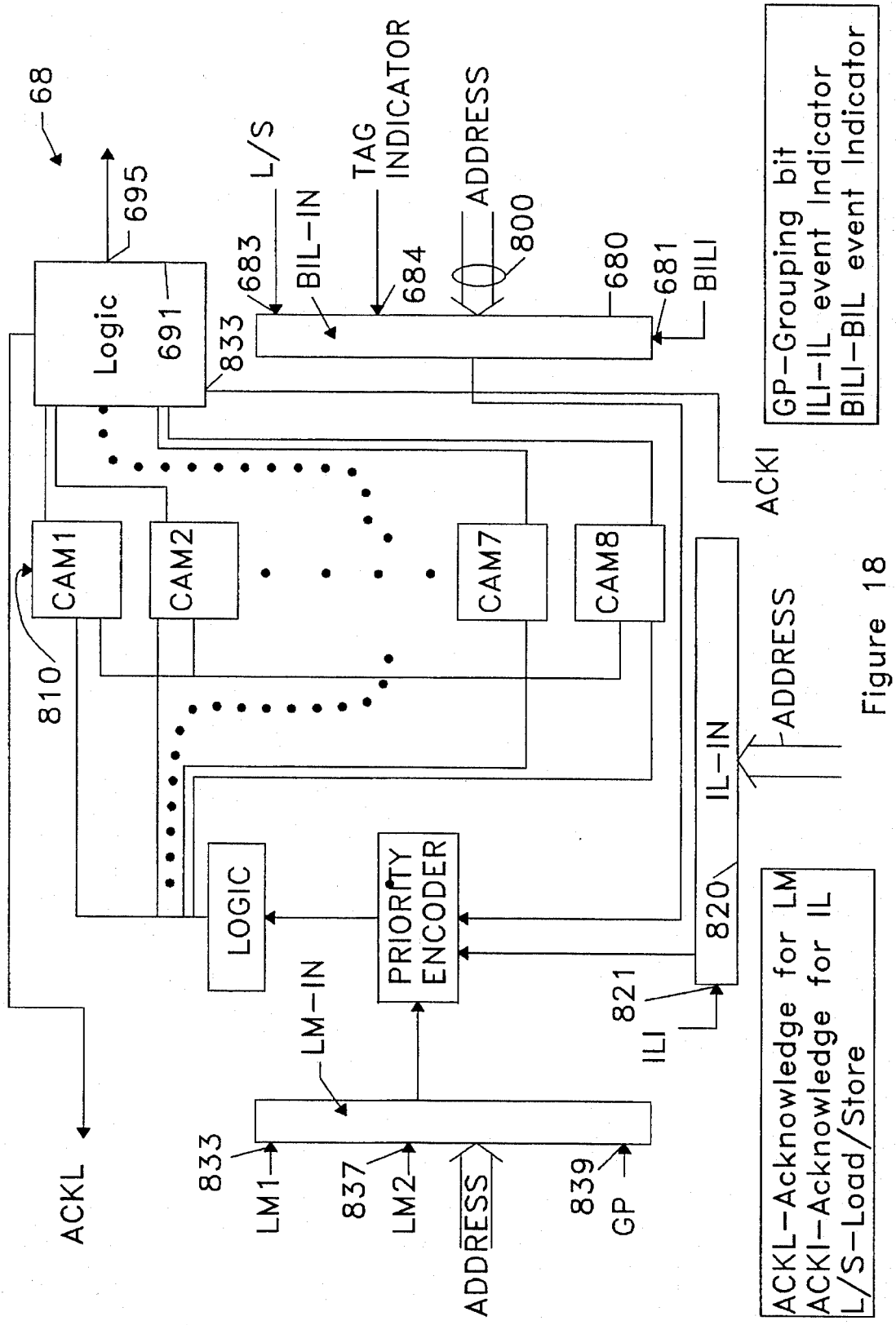
FIG. 18 shows a block diagram of blocking logic.

A portion of PMM 54 is designated as a taggable region. FIG. 18 shows the block diagram of BL 68. BL 68 maintains the synchronization bits (or the blocking bits) for the synchronous variables used in a program. Synchronous variables are those variables that can be moved between different localities. At compile time the synchronous variables are bound to memory locations in PMM 54 designated as taggable memory regions. The high order bits of the address are used as event tags. BIL 82 passively monitors address bus 800 for the taggable variables. When a taggable variable is detected, BIL 82 checks BL 68 to determine whether the reference may proceed for the operation (Load or Store) or must be blocked. If BL 68 finds an address is blocked, it informs BIL 82 that the reference is blocked from proceeding with the current operation. BIL 82 suspends PMM 54 access until the address is unblocked.

BL 68 consists of a small collection of Content Addressable Memorys (CAMs) 810 of varying size. One embodiment of BL 68 design has 8 CAMs. The total address space of a locality according to this embodiment is 16 MB of which 4 MB are for taggable variables. The taggable address space is logically divided into different sized partitions, where each partition represents variables of a particular size. In this embodiment of BL 68, the taggable address space which hold 4 MB has been partitioned into 8 regions of 4, 16, 65, 256, 1024, 4096, 16,384 and 65,536 byte variables as shown in FIG. 19.

Each taggable variable has 3 Blocking Bits (BB) associated with it. One of the blocking bits is called the BIL blocking bit. This bit is set when BIL 82 detects a tagged synchronous reference and checks with BL 68 for blocking information. If the BIL blocking bit is set, then the variable is blocked both for future reads and writes. This bit is reset by Inhibit Logic (IL) 70 or by LM 60 (for reasons mentioned above). The other two blocking bits are called LM Read Block Bit (LRB) and LM Write Block Bit (LWB). These bits are set and reset by LM 60. If the LWB is set, then the variable is blocked for all future writes. Any read on that variable can proceed normally. The LWB is set by LM 60 when it finds a release of the variable. Until the release is completed this bit will be set to prevent CPU 52 from overwriting the old value with a new value. The LRB is set when a variable is blocked from being read. This is done in the case of a request to prevent CPU 52 from reading the value of the requested variable before it is received. Once the value is received this bit is reset. If the LRB is set then the variable is blocked both for writes and reads.

Figure 20:
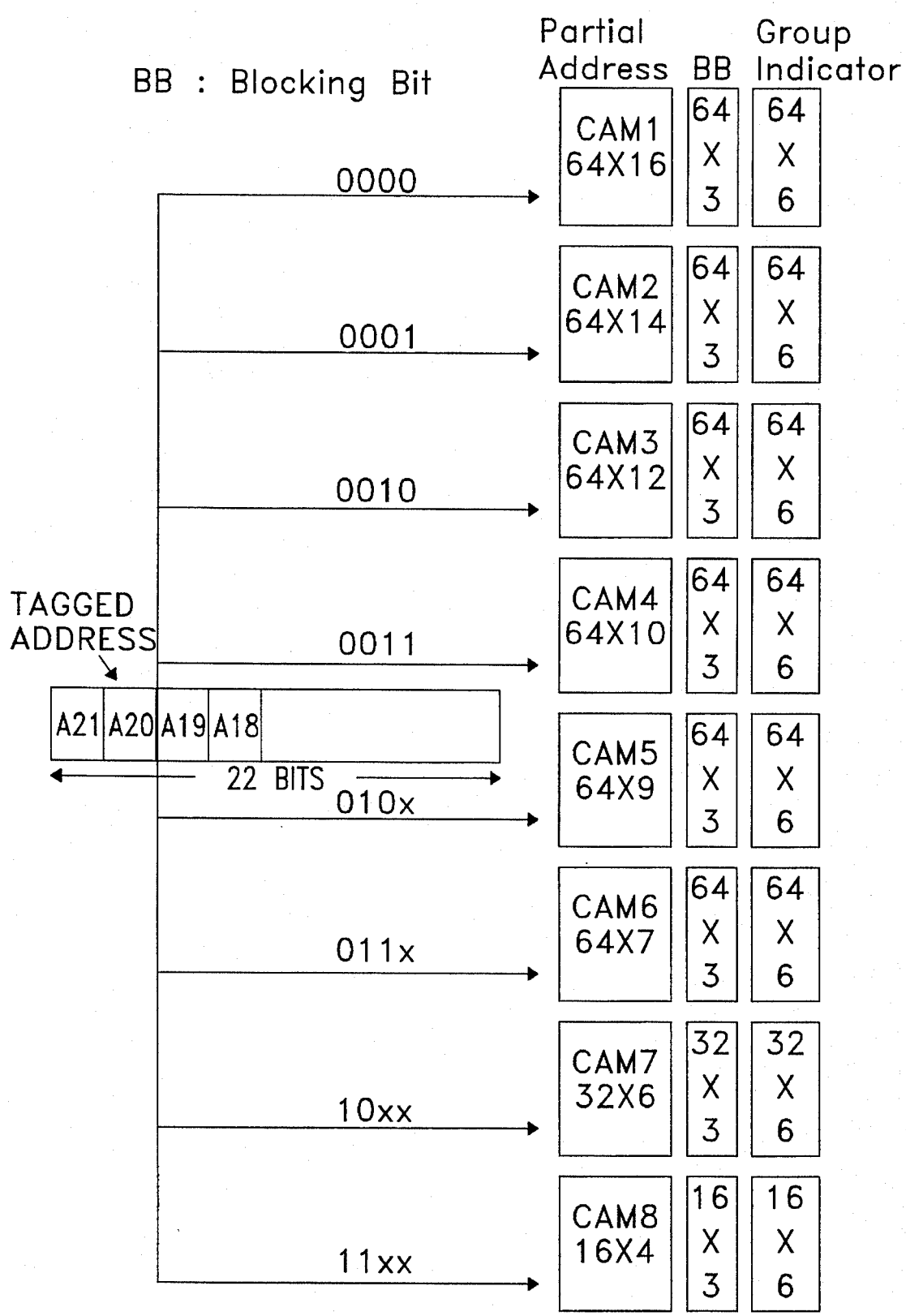
FIG. 20 illustrates the method of determining which CAMs are to be involved with a given reference.

Each row of a CAM 810 has a portion of address, 3 blocking bits, a grouping bit and a grouping indicator tag. FIG. 20 illustrates the method of determining which CAMs 810 are to be involved with a given reference. The size of CAMs 810 and their internal organization are also shown. Since each CAM 810 represents a particular size of variable, the only information required to represent a variable is a part of the starting address. For example, if a variable is 64 bytes long, then the low-order six bits of the address need not be stored since the low-order 6 bits merely indicate which byte is being referenced within the vector of 64 bytes. Blocking can only be done on entire vectors and not individual elements within the vector. If finer granularity is required, then the program must use smaller vector sizes. This constraint has been placed to eliminate the need for large size CAMs which are slow for associative search.

More than one request may occur at any instance of time for BL 68. To determine which one is to be serviced, a priority encoder has been incorporated into the design of BL 68. This priority encoder gives first priority to BIL 82, second priority to IL 70 and third priority to LM 60. BIL 82 is given the first priority to avoid the stalling of CPU 52. The second priority is given to IL 70 to avoid the potential filling up of CPU-LM FIFO 64.

To demonstrate the way in which addresses are mapped to a particular CAM inside BL 68, an example is now provided and is illustrated in FIG. 21. In this embodiment, PMM 54 is 16 MB and the low order 4 MB of PMM 54 is used for synchronous memory space. The 24 low-order bits represent the address space. The five high-order bits are used as tag. Any synchronous variable will have their 22nd and 23rd bits set to zero. In the example, let 0x010F0001 by the address which must be checked by BL 68 for a write blocked. As shown in FIG. 20, BL 68 uses the bits 18th through 21st for finding which CAM 810, in which the address is to be searched. In the example, the value of the 18th through 21st bits are 0011, and it corresponds to the CAM 4 which contains variables of size 256 bytes. The low-order 8 bits of the address can be neglected since the size of the variable is 256 bytes. The value which has to be searched inside CAM 810 is 11 0000 0000. Once the location is feund within CAM 810, the blocking bits in that location have to be inspected and the necessary operations have to be performed. In the example, the address is blocked since the BIL blocking bit is set. This information is conveyed to BIL 82 by setting the Blocked bit high.

All synchronous variables are bound to memory addresses at compile time. Depending on the size of the variable, the compiler allocates memory in the corresponding logical partition of the synchronous region of memory 810. If a variable is not one of the fixed sizes supported, then the compiler allocates memory for that variable in a region which represents the next larger fixed size variable. Each CAM 810 in BL 68 has only a fixed number of rows. It is possible that a CAM 810 may run out of free space. If this happens the compiler tries to use the next largest size to place the data. But if that size is also full, then the variable may have to be sub-divided into smaller segments and placed in that region of taggable memory which represents the smaller sized variables. But to represent them as a single variable rather than many individual variables they also need to be "grouped" inside CAM 810. This grouping of smaller variables to form larger ones is done by LM 60. If a blocking or unblocking is carried out on a variable which has been grouped, the operation is carried out on all sub-variables in the group.

FIG. 22 has been provided to illustrate the way grouped variables are found in CAM 810. Assume that a variable has been divided into 3 sub-variables and they need to be grouped inside CAM 810 to represent that they are all part of the same variable. Let the three addresses be 0x00F00000, 0x00F0100 and 0x00F0200. The grouping of the variables has to be done by LM 60. First LM 60 sends the first variable along with the Grouping (GP) bit set. BL 68 will find the correct CAM 810 and place the address in a free location and will place the location number in a temporary register. The Group Indicator (GI) bit will also be set. The location number is the decimal value of the location of the first element in the group. When the next addresses are sent, they are placed in new locations, their GI bit is set and the value from the temporary register is placed in the group tag location. In the example shown in FIG. 22, all 3 elements of the variable have the same group tag and their grouping bit is set. If a block or an unblock operation is performed on any single element of the variable, the operation will be carried out on all elements with the same group tag inside CAM 810.

BL INTERACTION WITH OTHER MODULES

BIL-BL Interface

Referring to FIG. 18, when BIL 82 checks the blocking status of a synchronous reference, it writes the address to the BL's BIL-IN register 680. The presence of a request is indicated to BL 68 by setting BIL event Indicator (BILI) pin 681 connected to BIL 82 high. BIL 68 sets LOAD/STORE pin 683 depending on whether the check is for a load or a store and also indicates to BL 68 whether the query is for an untagged or tagged synchronous reference via the tag-indicator pin 684. BL 68 then checks address pins 800 in the corresponding CAM 810. If present and blocked, the BLOCKED bit is enabled (by logical unit 691) to inform BIL 82 that it is blocked via line 695. The BIL bits corresponding to the current reference will be set if the query is for a tagged synchronous reference. BILI pin 681 is brought low after servicing the event.

IL-BL Interface

IL 70 can reset the BIL blocking bit via line 695 set by the BIL 82. IL 70 unblocks an address for either of the following two cases:
1. If the address is present in its corresponding tag location and the count is not zero on decrementing, or
2. If the tag location has the valid bit set but the address does not match with the address in the tag location.

IL 70 writes the address into BL register IL-IN 820 and indicates the presence of a request by setting the IL event indicator (ILI) pin 821 high. On unblocking, BL 68 acknowledges the request with a high acknowledge signal (ACKI) on ACKI pin 833 and the ILI pin 821 is brought low.

LM-BL Interface

Continuing to refer to FIG. 18, BL 68 is memory mapped to LM 60. LM 60 can block an address, nnblock an address, or group a set of addresses. Pins LM1 833 and LM2 837 are directly attached to two Input/Output (IO) registers of LM 60. The LM1 and LM2 bits will be set as shown in FIG. 23 corresponding to the operation to be performed by LM 60.

Grouping of variables inside a CAM 810 of BL 68 is done by LM 60. The grouping is done as follows. LM 60 first sets the grouping bit (GP) 839 high, writes the address, and sets LM1 and LM2 pins 833 and 835 correspondingly. BL 68 fixes a location in CAM 810 and copies the location number into a temporary register (not shown). LM 60 then proceeds with the next references. BL 68 finds locations for these addresses and copies the value of the locations stored in the temporary register into the group indicator tag. This goes on until the group is formed. At the end of GP 839 is brought low.

INHIBIT LOGIC

Motivation

Continuing to refer to FIG. 18, CPU 52 may issue tagged synchronous events faster than what LM 60 will be able to process. If all the events were to be handled by LM 60, then it will be busy handling these events which will lead to the delay in servicing events from Routing Logic (RL) 56 and Block Logic (BL) 68 and this might lead to poor performance. All tagged events do not generate communication operations and the ones which do not generate communication can be filtered. Inhibit Logic (IL) 70 has been implemented to act as a filter for these tagged synchronous events which do not generate communication, to free LM 60 from useless processing of the events and to increase the overall performance of the system.

Once a synchronous tagged reference is detected, BIL 82 places a copy of the reference in CPU-LM FIFO 64 after the necessary processing. If there is an event at the head of FIFO 64, IL 70 reads it. The events which BIL 82 enqueues can be of two types:
1. Address Event—In this case the address is enqueued in FIFO 64 and the Address indicator bit (on bus 97 of FIG. 1B) is set, to indicate that the enqueued event is an address.
2. Data Event—In this case the address is enqueued along with the address indicator bit set, and following it will be two 32 bit values to form the 64 bit data. To indicate a data event, the address indicator is not set.

IL 70 acts as a lookup table. The events to be filtered can be determined by the programmer or the compiler. Once the filterable events are determined, IL 70 may be initialized by the inhibit operation. On execution of the inhibit operation, the fields in the IL table are updated. Each inhibit operation corresponds to a particular tag and an address. The inhibit operation also contains a count which specifies the number of times these tagged addresses have to be filtered. IL 70 is memory mapped to LM 60.

Figure 24:
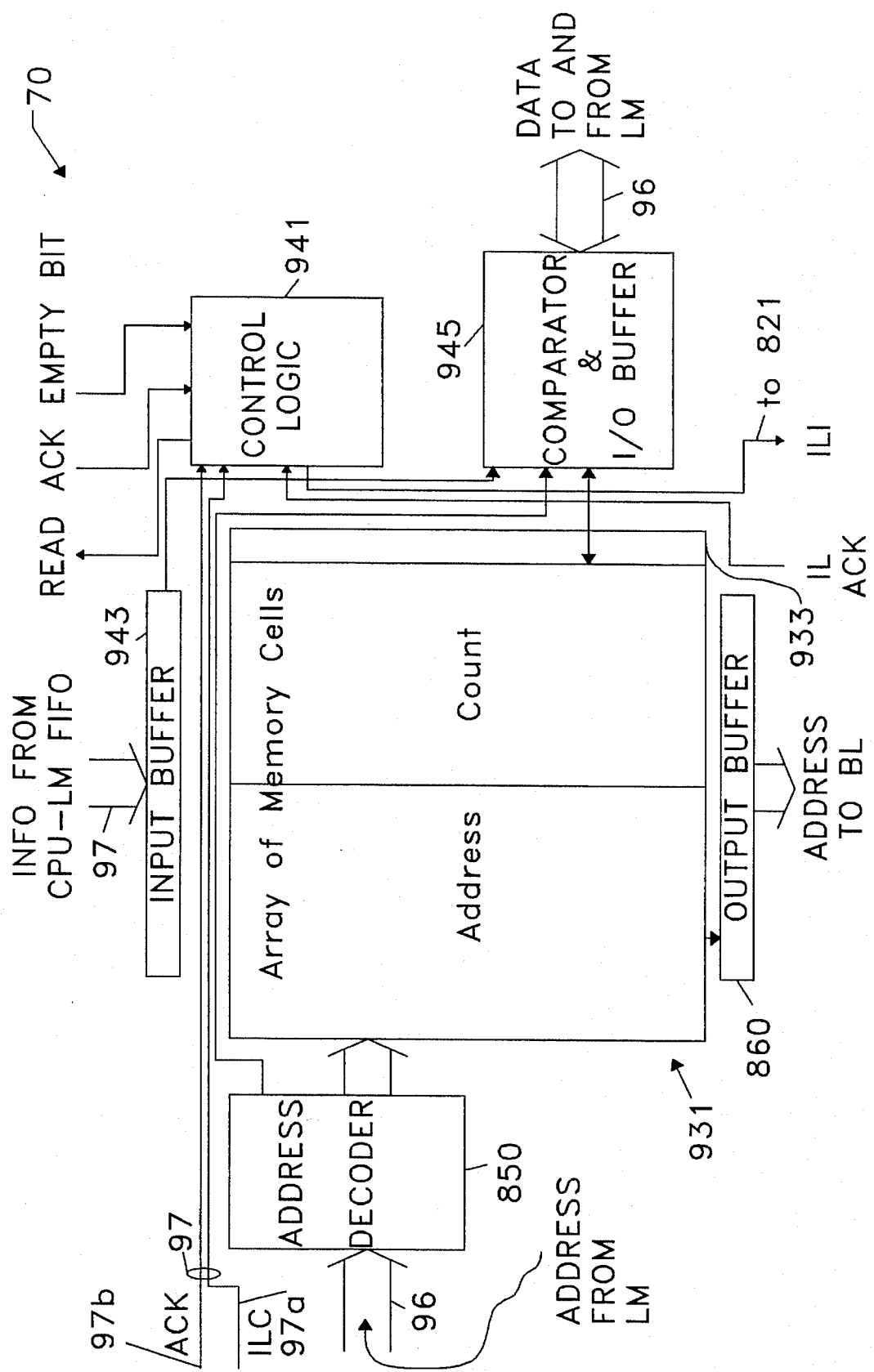
FIG. 24 is a block diagram of the inhibit logic having a table of values.

FIG. 24 provides a block diagram of IL 70, which has a table of values 931. The columns in the table are the tag, address, and count fields and a valid bit. A row in the table is considered valid only when the valid bit (pin 933) is set. The number of rows is equal to the total number of possible tags in this embodiment. This example has 5 tag bits which give 32 possible tags and thus, there are 32 rows in IL 70. The tags themselves need not be saved in IL 70, but the address and count values which have to be placed in IL 70 are placed in the row corresponding to the decimal value of the tag. In this embodiment, IL 70 is mapped to the address 0x20000100 to 0x2000013f of the LM address space. The even numbered addresses will fill the address part of the row and the odd numbered ones will fill the count and valid bit portion of the rows.

Address decoder 850 used in IL 70 can be simple. It takes the last 6 bits of the address it receives and from that finds out the exact location within IL 70. LM 60 may read and write the locations in IL 70. LM 60 writes to IL 70 to initialize the values in the table and reads the value from the table when it has to save the value on a scope change. Before performing a read or write operation on IL 70, LM 60 has to take control of IL 70. For this, it sets the IL Control (ILC) bit. LM 60 gets control of IL 70 when IL 70 returns an acknowledge signal back. Once LM 60 has control of IL 70, it is a normal memory operation to read or write IL 70.

IL 70 reads the head of FIFO 64. IL 70 has a pin 941 which comes directly from FIFO 64 and is called the Empty Bit. This bit gives information to IL 70 regarding the state of FIFO 64, i.e., whether FIFO 64 is empty or not-empty. If the empty bit is set then FIFO 64 is empty, if the bit is not set then FIFO 64 is not empty. IL 60 reads from the head of FIFO 64 and sends an ACK to denote that it has read the value at the head of FIFO 64.

Figure 25:
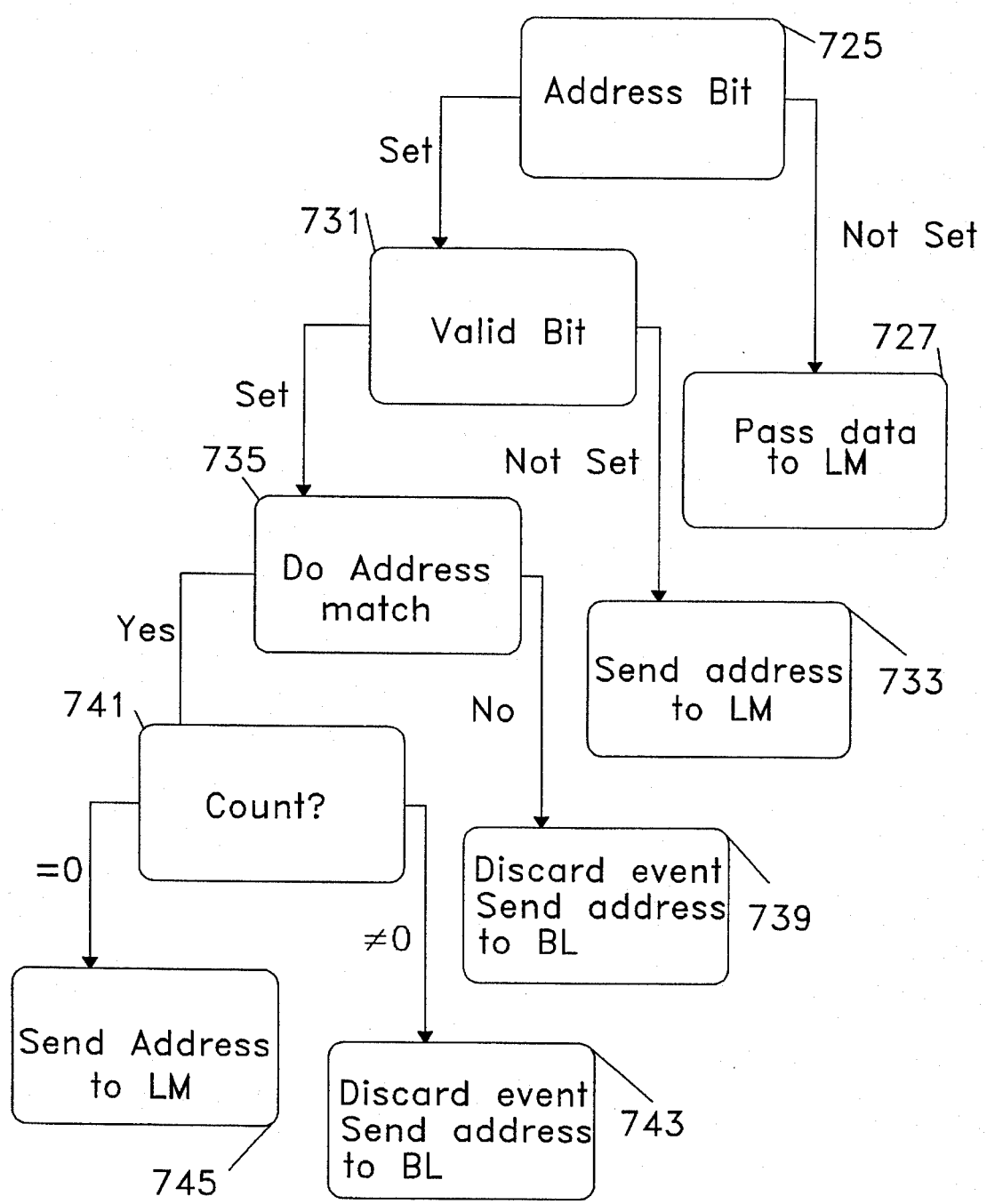
FIG. 25 shows how operations to be carried out on data once an event is read from the head of the CPU-LM FIFO.

Once an event is read from the head of FIFO 64, the operations to be carried out by on that data are as shown in FIG. 25. In particular, the address bit (of bus 97 in FIG. 1B) is checked by IL 70 at step 725. If the address bit is not set, then IL 70 passes the data in input buffer 943 to I/O output buffer 945 at step 727. If, however, the address bit is set, then valid/invalid bit 933 is checked at step 731. If valid/invalid bit 933 is not set, then IL 70 sends the associated address to LM 60 at step 733. If, however, address bit is set, then, IL 70 determines whether there is a match in address table 931 at step 735. If IL 70 determines that there is not a match in address table 931, then IL discards the event associated with that address and sends the address to BL 68 via output buffer 860 at step 739. If, however, IL 70 determines that there is a match, then IL 70 checks the count associated with the matched address in table 931 at step 741. If IL 70 determines that the count associated with the matched address in table 931 is not "0", then IL 70 discards the event associated with that matched addressed to BL 68 at step 743. If, however, IL 70 determines that the count associated with the matched address in table 931 is "0", then IL 70 sends the address to LM 60 at step 745.

CPM-LM FIFO—IL Interface

Figure 26:
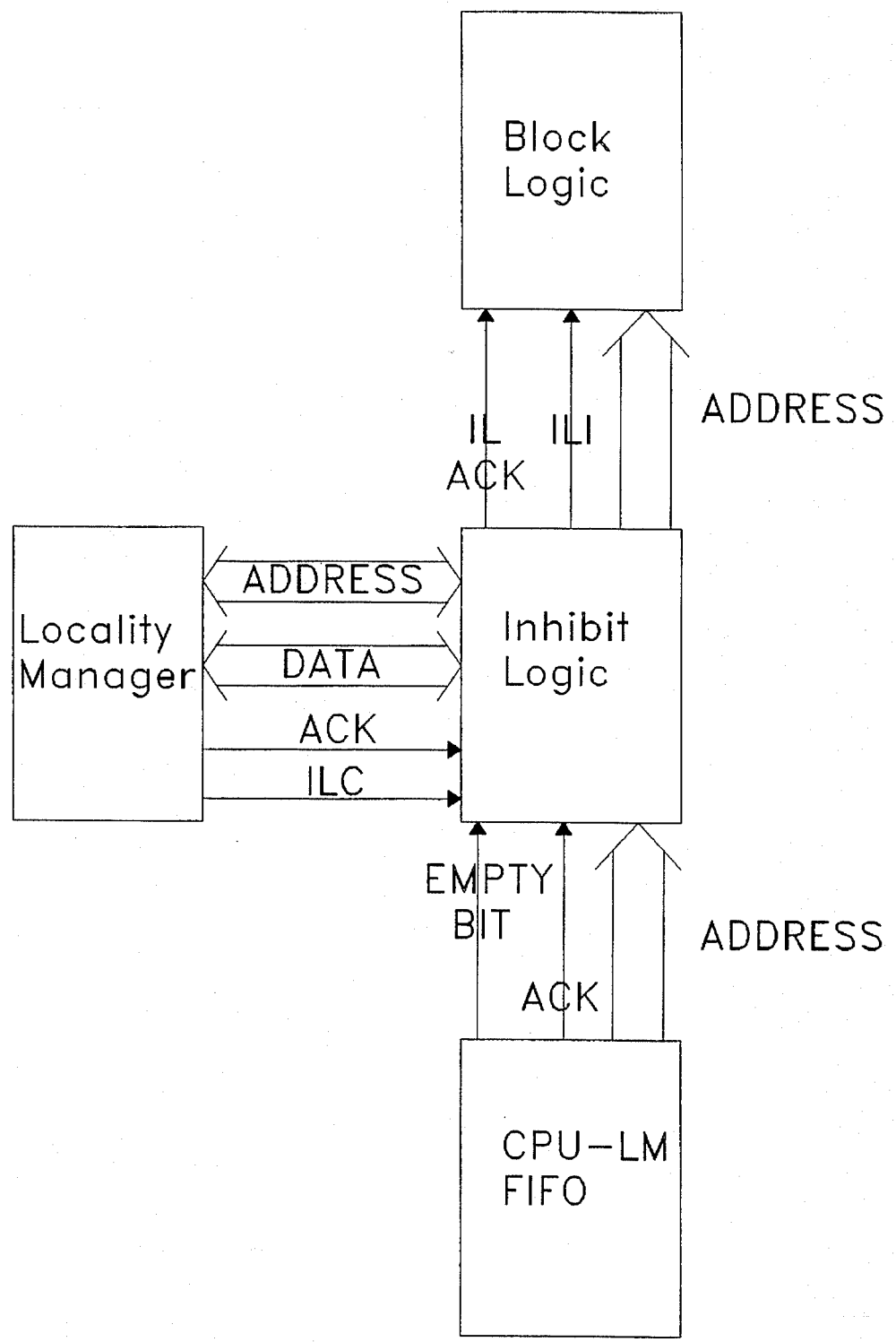
FIG. 26 provides a pictorial view of the interface between the inhibit logic and other modules in the processing element.

FIG. 26 provides a pictorial view of the interface between IL 70 and other modules. When IL 70 needs to read FIFO 64, the empty bit should be low, indicating that FIFO 64 is not empty. IL 70 reads the head of FIFO 64 and then sends an ACK signal to indicate the completion of reading. FIFO 64 then moves all its elements one step forward.

BL-IL Interface

IL 70 resets the BIL blocking bit in two cases:
1. If it has the valid bit set for the tag it received and the address matches the address in the tag location but the count does not go to zero on decrementing, and
2. The tag location has the valid bit set but the address does not match with the address in the tag location.

For unblocking a variable, IL 70 sends the address to BLs register IL-IN 820, and sets the ILI to high. BL 68 sends back an ACK signal once it has done the unblocking, thus signalling completion of the event.

LM-IL Interface

LM 68 can read and write IL 70. LM 60 reads IL 70 in the following two cases: IL 70 has some information to be passed to LM 60, and to update the table within IL 70.

IL 70 generates an interrupt to inform LM 60 of a presence of an event to be read. In response, LM 60 will read IL output buffer 860. In this example, IL output buffer 860 is memory mapped to the address 0x2000 0300 of LM 60, so when LM 60 reads from this address and it gets the value from IL output buffer 860. To set the values in the IL table, LM 60 takes control by setting the ILC pin high. LM 60 is given control of IL 70 when IL 70 replies with an interrupt signal. When LM 60 completes the read or write operation, it releases the control of IL 70 by setting the ILC pin low.

CPU-LM FIFO

As the name indicates, CPU-LM FIFO 64 (from here on called just FIFO) acts as a buffer between the Locality Manager (LM) 60, and CPU 52. CPU 52 is involved only in the computation and all the communication and synchronization operations are performed by LM 60. All events are passively monitored by BIL 82 and are sent to LM 60 for servicing. At the time of detection of an event, it is possible that LM 60 is busy servicing Routine Logic (RL) 56 or the Block Logic (BL) 68 or processing other events. Thus it may take more than a memory event service time for LM 60 to service an event detected by BIL 82. To facilitate such a situation, some buffering is required between LM 60 and CPU 52. This function is done by FIFO 64. Described below are design requirements of FIFO 64, its association with other modules in a PE 50 and its functional description.

The design of FIFO 64 follows closely the design of commercially available FIFOs. This is due to the motivation to use off-the-shelf components. It is proposed to use a FIFO capable of containing sixteen 33-bit words. Once a large number of real world applications are written and simulations performed, then the length of FIFO 64 can be tuned. The length of FIFO 64 will not be a bottleneck, as extremely fast commercial FIFOs of size 2K 36-bit words are available, e.g., DPF 2x3L Dense Pm. The width of FIFO 64 is chosen as 33 bits because the data bits are 64 bits long and they can be moved into FIFO 64 as 2 32 bit elements along with the last bits, i.e., the 33rd bit, set to 0 to specify data. If the element being moved into FIFO 64 is an address, then the 33rd bit is set to 1. In this embodiment, the number of address bits has been chosen to be 29 and the data is 64 bits long.

Input port 64a of FIFO 64, i.e., the BIL end, and output port 64b, i.e., the LM end, can be run with independent clocks. This will prevent the need for synchronous execution of both CPU 52 and LM 60. Before BIL 82 enqueues an event in FIFO 64, it has to make sure that FIFO 64 has free space for the new event. This information is available from the FIFOs full-bit. IF this bit is set, then it indicates that FIFO 64 is full and BIL 82 has to wait until the full bit becomes low, indicating that FIFO 64 has free space. At the dequeuing end, FIFO 64 has the empty-bit. If FIFO 64 becomes empty, it sets the empty bit and IL 70 knows that FIFO 64 is empty. If there are events in FIFO 64, then the empty-bit is not set.

FIFO'S INTERACTION WITH OTHER MODULES

BIL-FIFO Interface

Figure 27:
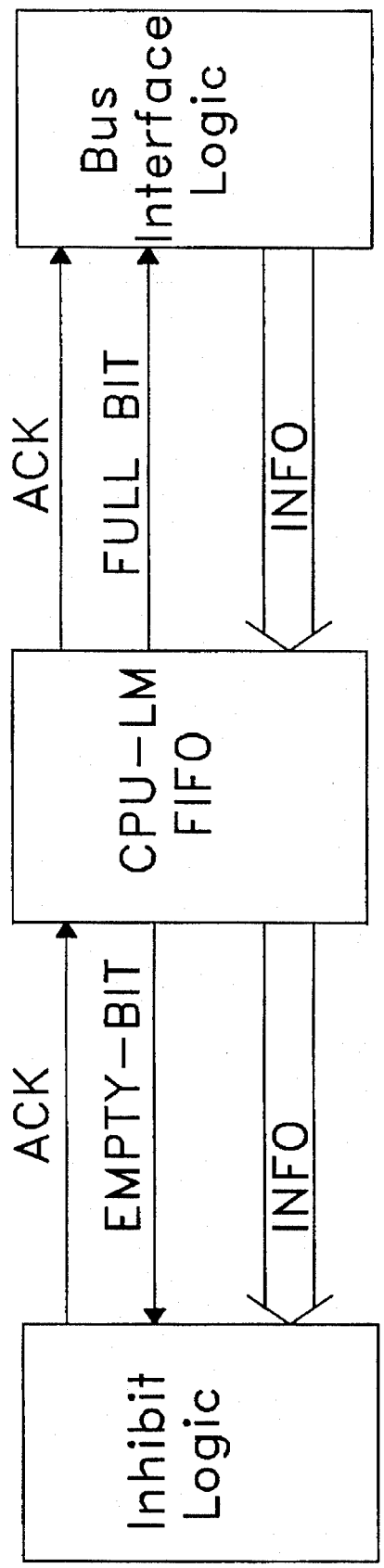
FIG. 27 provides a pictorial view of the interaction of the CPU-LM FIFO and other modules in the processing element.

FIG. 27 provides a pictorial view of the interaction of FIFO 64 with other modules in processing element 50. Whenever BIL 82 detects a tagged event, it enqueues a copy of it into FIFO 64. Before BIL 82 enqueues an event, FIFO 64 should be checked for free space, by checking the full bit. If the full-bit is set, then it indicates that FIFO 64 is full and BIL 82 will wait until FIFO 64 has free space, i.e., when the FIFO-bit goes low. When the FIFO-bit is not set, BIL 82 writes the value into FIFO 64 with the 33rd bit set to I/O depending on whether the event being enqueued is an address or data. FIFO 64 sends an ACK to acknowledge the receipt of the data. This ACK signal is required to prevent the BIL 82 from writing faster than FIFO 64 can receive and also to avoid writing to FIFO 64 when it is full.

IL-FIFO Interface

IL 70 reads from the head of FIFO 64. The presence of information in FIFO 64 is indicated to IL 70 by the empty-bit being low (0). If FIFO 64 is empty, the empty-bit is set to high (1). If the empty-bit is low, IL70 reads from the head of FIFO 64 and sends an ACK high to denote the end of the read cycle. Once this ACK signal is received, FIFO 64 moves all its data one step forward. This acknowledge signal is required in order that FIFO 64 knows that a read has been completed.

THE BUS INTERFACE LOGIC

Motivation for the Bus Interface Logic

Locality manager 60 is used to off-load CPU 52 from the burdens of communication operations. LM 60 is event-driven in the sense that it performs communications operations upon arrival of events from non-local PE's (localities) 50 or from the CPU 52 in which LM 60 resides. In order for LM 60 to handle the events initiated by CPU 52 (i.e. CPU events), an interface between CPU 52 and LM 60 is needed. In an attempt to reduce any additional overheads (e.g., extra CPU instructions) from initiating communication operations in LM 60 Bus Interface Logic (BIL) 82 is used to passively detect CPU events.

Functionality of the Bus Interface Logic

Figure 28:
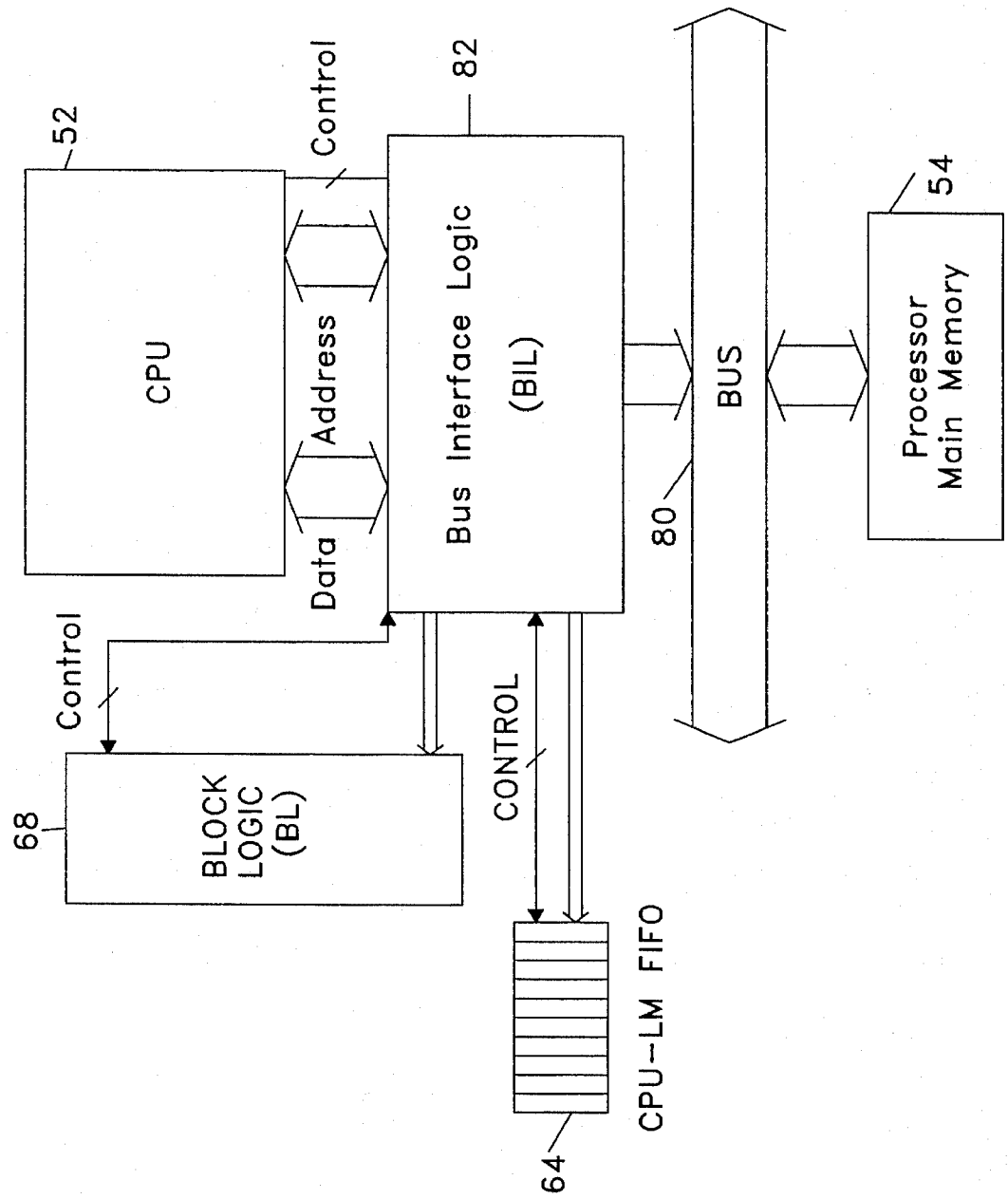
FIG. 28 is a block diagram of the bus interface logic and associated hardware in the processor element.

BIL 82 is a passive monitoring device used to detect CPU events on Bus 80. BIL 82 is essentially the head of a conduit which leads CPU events to the locality manager 60. Bus interface logic 82 is located between CPU 52 and CPU-LM-FIFO 64. A block diagram of BIL 82 and associated hardware is given in FIG. 28. A functional description of BIL 82 follows and then a discussion of the role of BIL 82 under caching constraints will be given.

Recall that non-local variables are labeled as synchronous and can be distinguished from the local asynchronous variables by the notion of a tag. References to synchronous variables represent the CPU events that BIL 82 must identify. The static allocation of memory into "taggable" and "non-taggable" memory regions makes the detection of the synchronous references a simple task for BIL 82. BIL 82 distinguishes synchronous references from asynchronous references by intercepting the memory address being passed from CPU to the PMM.

Figure 29:
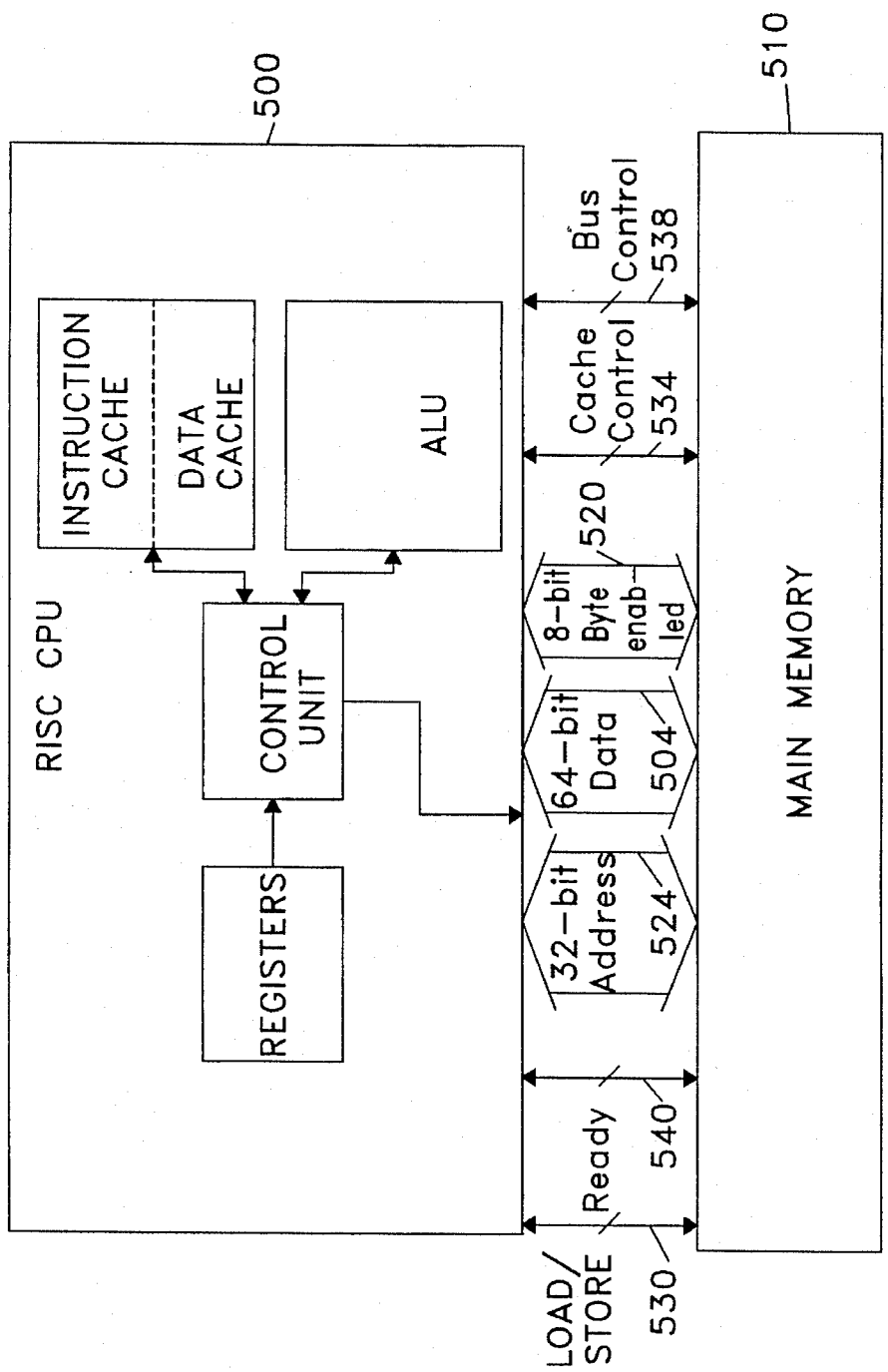
FIG. 29 shows a typical RISC CPU with a 64 bit data line and how it interfaces with the main memory in the processing element.

Today's off-the-shelf RISC CPUs (e.g., i860XP-Intel, i860 XP Microprocessor Data Book, Intel Corporation, Santa Clara, Calif., 1991, SPARC—R. Garner, et al,. "Scaleable Processor Architecture (SPARC)," COMPCON IEEE Mar. 1988, pp 278–283, RS6000—R. R. Oehler and R. D. Groves, "IBM RISC System/6000 Processor Architecture," Third Conference on Hypercube Concurrent Computers and Applications, January 1988, pp. 847) can produce 64-bit data values and 32-bit memory addresses and can allow external cache control. FIG. 29 shows a typical RISC CPU 500 with a 64 bit data line 504 and how it interfaces with the main memory 510. Note 8-bit Byte Enable lines 520 are driven independent from address lines to identify which byte(s) in the 64-bit location are to be accessed. The other control information sent to and from main memory 510 include a LOAD/STORE signal line 530, cache control signal line 534, bus control signal line 538, and a READY signal line 540. This general CPU/main memory configuration is used as a starting point for the CPU-BIL interface.

Figure 30:
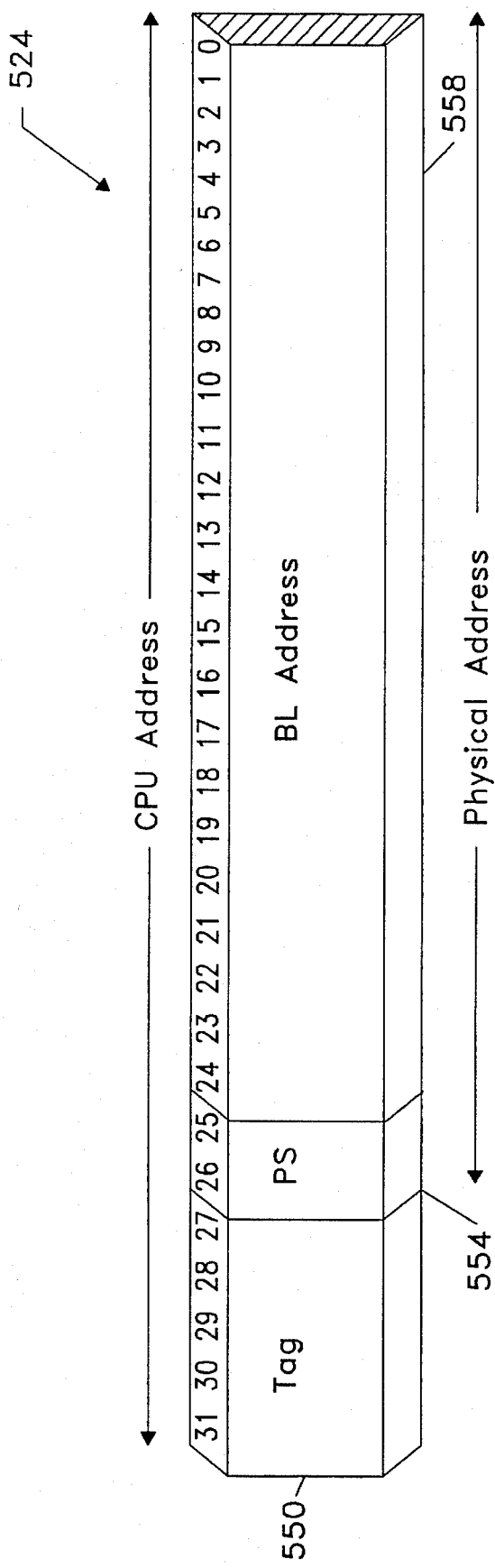
FIG. 30 illustrates the partitioning of the CPU address.

CPU address 524 is partitioned into fields that represent the tag number, the reference type (i.e. asynchronous or synchronous), and the physical CPU address. This partitioning of CPU address 524 needs to be done in a manner that assures sufficient local memory for the synchronous variables. FIG. 30 illustrates the partitioning of CPU address 524. Here, a 5-bit tag field 550 is assumed which allows the programmer to use up to 32 tags in their applications. A 2-bit page-select field (PS) 554 allows PMM 54 to be partitioned into four regions. One quarter of PMM 54 has been reserved for synchronous variables. The remaining address field, the BL address 558 along with the page-selected bits 554, represent the location in PMM 54 where the data value is stored.

Figure 31:
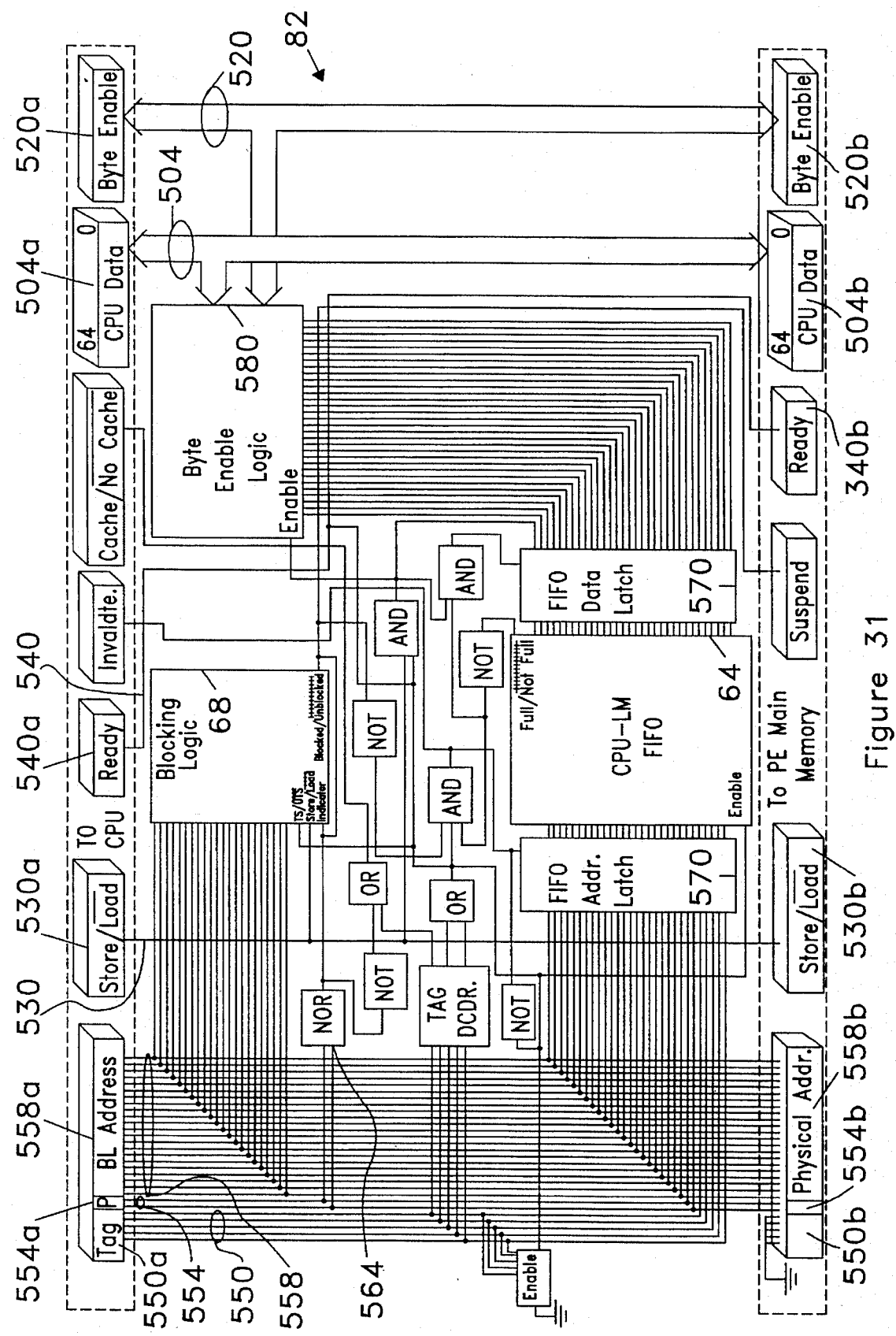
FIG. 31 shows the logical configuration of the bus interface logic with respect to the CPU, the processor main memory, the blocking logic and the CPU-LM FIFO.
Figure 32:
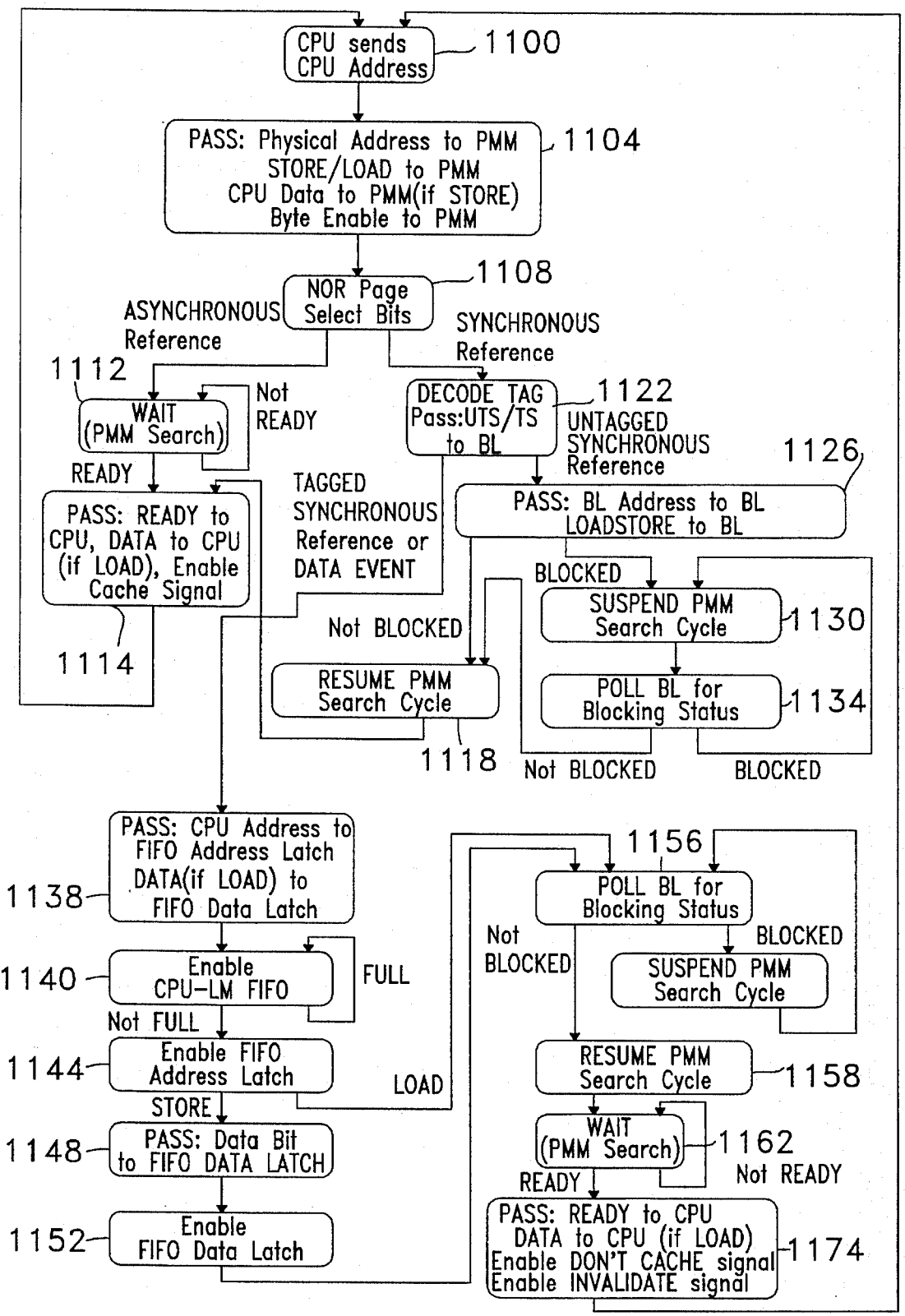
FIG. 32 illustrates the functionality of the bus interface logic with an event-based description.

The logical configuration of BIL 82 with respect to CPU 52, PMM 54, BL 68 and CPU-LM FIFO 64 is shown in FIG. 31. To illustrate the functionality of BIL 68, an event-based description will be given and is exemplified in FIG. 32. The control flow diagram in FIG. 32 takes into account the caching of asynchronous and untagged synchronous references with a write-through caching policy. The tagged synchronous references are not cached and cause invalidations of the untagged synchronous reference to the same variable. The caching constraints with respect to the different reference types is illustrated below.

In FIG. 31, the BIL Address lines (with pins 558a and 558b), CPU data lines 504 (with pins 504a and 504b), Byte Enable signal lines 520 (with pins 520a and 520b), the STORE/LOAD signal line 530 (with pins 530a and 530b), and the READY signal line 540 (with pins 540a and 540b) are directly connected to PMM 54. These direct connections allow BIL 82 to remain a passive observer. Upon the receipt of a CPU address at step 1100, BIL 82 will send the 2-bit page-select address field through a NOR gate 564 at 1100. The result will identify which memory region of PMM 54 will reside in (i.e. in taggable or non-taggable memory). NOR gate 564 allows only one possible combination (i.e., 00) to represent the synchronous memory region of PMM 54 at step 1108. Any other combination represents an asynchronous memory reference.

When BIL 82 detects an asynchronous reference, it passes the physical address to PMM 54 at steps 1112 and 1114. The high-order address (i.e., tag field bits) will be grounded on PMM 54. The data value (if the cycle was a STORE), the byte enable signal, and the LOAD/STORE signal will also be sent directly to PMM 54 at step 1118. This operation requires only the minimal timing overhead of one BIL cycle to test the page-select bits. When PMM 54 has completed the memory access, it will send a READY signal along with any data to BIL 82. BIL 82 will then pass this information to CPU 52. Note that although CPU 52 may support pipelined bus cycles, BIL 82 does not do so here. Thus, from here on it is assumed the bus cycles are not pipelined.

The detection of a synchronous reference by BIL 82 must follow a different protocol. First, all asynchronous references (i.e., the BL address), must be sent to BL 68 to determine if the variable is blocked at step 1122. A blocked variable will cause CPU 52 to stall (provided that the CPU operations are dependent on completion of the current memory reference), and the PMM search to be suspended until the variable becomes unblocked. The unblocking of variables is dependent upon the type of the memory reference cycle (i.e., a LOAD or STORE).

Recall that two communication operations LM 60 can perform are the releasing of local data and the requesting of non-local data. Any local synchronous variable that is to be written over due to an outstanding request, must be blocked from both LOADing and STORing. Any local synchronous variable that is in the process of being released may be LOADed but must be blocked from STORing. These blocking semantics are implemented by blocking logic 68 and comprise the mechanisms which provide synchronization for data dependencies among variables that can be shared across PEs 50 (localities).

Following the sending of the BL address to BL 68, BIL 82 will decode the tag field at step 1122 to determine if the reference is an untagged synchronous reference, a tagged synchronous reference, or a data event which is essentially a tagged synchronous STORE. If the tag field represents an untagged synchronous reference, BIL 82 will process the reference as if it were asynchronous at step 1126. BIL 82 will simultaneously send the BIL address to BIL 68, and the physical address to PMM 54. If BL 68 determines that the variable is blocked, then BIL 82 will send a signal to PMM 54 at step 1134, thereby requesting it to suspend the memory search operation.

There exists a critical timing path when sending the suspend control signal to PMM 54. BL 68 must complete a search of its CAMs (Content Addressable Memory) 810 for the reference at step 1134 and send a block signal before PMM 54 has completed its memory search operation. This ensures the variable reference to be coherent. The PMM cycle time must be chosen so that it does not complete the memory search operation before BL 68 has completed its search. An alternative solution to this critical path is to use address and data latches (not shown) in BIL 82. The latches would be enabled following the receipt of an unblock signal from BL 68. This alternative was not chosen because it is believed that the delays incurred would be higher than if using a PMM with a slower cycle time.

Upon receipt of a block signal from BL 68, BIL 82 must also send a signal to BL 68 to trigger another request of the blocking status of the same variable reference. The time that elapses before BIL 82 can resume the PMM search is dependent on the number of times BIL 82 must poll BL 68 for the blocking status of the variable. This is the instance in which CPU 52 may stall and system performance may degrade due to communication. When BL 68 determines that the untagged synchronous reference is not blocked, BIL 82 will tell PMM 54 to resume the memory access at step 1118. When PMM 54 has completed the memory access, it will send a READY signal, along with any data, to BIL 82. BIL 82 will finally pass this information to CPU 52.

If BIL 82 decodes the tag field into a tagged synchronous reference (or a data event) at step 112 the reference must be sent to the locality manager 60 via the CPU-LM FIFO 64. BIL 82 simultaneously passes the physical address to the FIFO address latch 570 at step 1138, enables CPU-LM FIFO 64 at step 1140, and determines the blocking status of the reference. BIL 82 must then check CPU-LM FIFO 64 to determine if it is full. If FIFO 64 is full, BIL 82 must continue polling it. It is highly unlikely FIFO 64 will ever reach capacity. This is because the number of consecutive references to synchronous variables will probably be nominal and because the depth of present high-speed FIFOs (e.g. SHARP—SHARP Electronics, "Wescon/91 Conference Record", paper 7/4, November 1991, pp. 19–21) are as many as 256 slots. If CPU-LM FIFO 64 is not full and the tagged synchronous reference is not blocked, BIL 82 will enable FIFO address latch 570 at step 1144. The CPU address will then be enqueued in FIFO 64 for LM 60 to dequeue and process. If the reference cycle as a STORE, the byte enable logic 580 will be enabled and the CPU data along with a data bit will be sent to FIFO data latch 570 at step 1148. The data bit is used as a control bit for LM 60 and inhibit logic 70. Provided CPU-LM FIFO 64 is not full, a 32-bit word will be enqueued in FIFO 64 directly following its associated address at step 1152.

Following the passing of a tagged synchronous reference to LM 60, there exists a potential coherence problem. If BL 68 has indicated that the reference is not blocked at step 1156, BIL 82 is able to proceed with the PMM operation underway at step 1158. If LM 60 has not finished processing the tagged synchronous variable reference, BIL 82 could potentially access the wrong PMM value. Another possible coherence problem could be that an untagged synchronous reference may have followed a tagged synchronous reference and, this too, may violate the synchronization constraints. Therefore, BIL 82 must block at step 1162 any reference to the events before they reach LM 60. This is done by BIL 82 sending the result of the tab decoder to BL 68. If the reference was a tagged synchronous reference, BL 68 will block the reference via its BIL blocking bit. LM 60 then becomes responsible for resetting this bit in BL 68. As soon as LM 60 processes the event, PMM 510 will either
1. receive a new data value due to a request;
2. release a data value to another locality; or will
3. play no role, as in the case of a data event.

LM 60 will tell BL 68 when it has completed processing the synchronous reference and thus the reference unblocks. Upon receipt of this unblock signal, BIL 82 will resume the PMM access at step 1158. When PMM 54 has completed the memory access at step 1162, it will send a READY signal along with any data to BIL 82. BIL 82 will then pass this information to CPU 52 at step 1174 and will be ready to receive another bus action request from CPU 52 at step 1100.

Caching of Synchronous Variables

Up until this point, it has been assumed that synchronous variables may not be resident in the CPU data cache 538 and that asynchronous variables conform to the copy-back caching policy. Caching synchronous variables makes BIL 82 functionality only slightly more complex. Recall that an untagged synchronous reference and a tagged synchronous reference to the same physical location have different CPU addresses. If caching of synchronous variables is permitted, two principle problems must be dealt with:
1. observability of all tagged synchronous references by the BIL, and hence the LM; and
2. guaranteeing adequate coherency of the memory hierarchy (i.e., between the CPU cache and the processor main memory).

The first of these two issues, observability of tagged synchronous references, requires that BIL 82 be able to detect all references to tagged synchronous variables. This is necessary so that BIL 82 can inform LM 60 of these references. Depending on the cache architecture and capabilities, the most likely way of dealing with this problem is to specify, via hardware, the region of memory in which the tagged synchronous variable reside as uncacheable. Another possibility is to disable the caching of certain regions of memory (which is available via software in some processors) in which the tagged synchronous variables will reside.

The second issue, memory hierarchy coherency, will precipitate either selected invalidation and/or flushing, depending on both the caching policy and the type of communication operation to be taken (i.e., request or release) as a result of the tagged synchronous reference. A discussion of the effects of caching synchronous variables is in "D. L. Bright, et al,. "The Memory Observability Issue in Seamless," Technical Report TR-ECE-930101, University of Iowa, Iowa, 1993, the contents of which are incorporated herein by reference. It was concluded that the effort to cache synchronous variables is beneficial and that the write through caching policy for these variables required less overhead than a copy-back policy. Thus only invalidations of the synchronous variables would be required.

The protocols necessary to maintain coherency need to be examined to determine the cases for invalidation. For this analysis, it is assumed that only one synchronous variable may reside on a cache line. The action required on any cache line containing a portion of the tagged synchronous variable may be determined by three factors. These factors are:
1. the memory reference type associated with the synchronous variable (i.e., LOAD or STORE);

2. the LM operation to take place as a result of the synchronous reference (i.e., request or release); and
3. The subsequent untagged synchronous references (if any) which may occur to the variable.

This implies that there are eight cases which may require invalidation of cache lines to maintain memory coherency and to guarantee observability. Of the eight cases, there are only two sequences of operations which may cause inconsistency in the memory hierarchy. The first is a tagged synchronous STORE preceding an untagged synchronous LOAD. The other is a request operation preceding an untagged synchronous LOAD. These eight cases are summarized in FIG. 33 and are discussed below.

If the operation to be taken as a result of the synchronous reference is a release, there exists only one case where an extra action is needed to maintain coherency. This is when the synchronous reference is a STORE and is followed, at some point, by an untagged synchronous LOAD of the same location. The problem is that if the LOAD of the untagged synchronous variable location is a high, the stale value is loaded. This is because the tagged synchronous STORE is mapped to a different portion of cache 53 than the untagged synchronous LOAD. This can be corrected by invalidating the cache line containing the stale value. Another possible, more practical, solution is to pair the tagged synchronous STORE with an untagged synchronous STORE to the same location. The untagged synchronous STORE averts the problem of the stale location by explicitly writing the new result in both the cache and the PMM location.

If the operation to be taken as a result of the synchronous reference is a request, then to force the requested data in PMM 54 to propagate to the cache 53, the variable must be removed from cache 53. Moreover, all cache lines incurring a LOAD reference to any location of the variable as the subsequent reference to the tagged synchronous request-inducing reference, must be invalidated. For those lines which have either no references or only STOREs as the subsequent reference to all locations on a line, no action is required.

Invalidation of the untagged synchronous references in CPU data cache 53B may be done either by compiler inserted invalidations instructions or by BIL 82. Compiler inserted instructions have two adverse affects. The first is an increase in the instruction count and the other is that the increased instruction count may have a negative affect on the hit ratio of the instruction cache. Also, the compiler cannot guarantee the determination of subsequent references or the cache status of the variable. Therefore, the compiler may have to assume the worse case. BIL 82 must also assume worse case sequences of operations, but can avoid the adverse affects of compiler inserted invalidation instructions.

Referring back to the functionality of BIL 82 following the PMM access, BIL 82 needs to send additional information to CPU 52 pending the type of variable reference. If the reference was determined to be an asynchronous or untagged synchronous reference, BIL 82 must send a CACHE signal to CPU 52 so that CPU 52 will know to cache the variable. If the reference was a tagged synchronous reference, BIL 82 must first send an INVALIDATE signal along with the untagged synchronous reference address to CPU 52. The untagged synchronous reference address can be derived from the tagged synchronous reference since the only difference is the tag field. BIL 82 must then send the tagged synchronous reference to CPU 52 along with a NO CACHE signal so that CPU 52 does not cache the tagged reference. The only additional overhead in maintaining memory coherency and observability through BIL 82 is an additional register (not shown) to hold the value of the untagged synchronous variable address when a tagged synchronous reference is encountered.

Hardware Critical Path Analysis

The potential advantages of multiprocessor 1 have been demonstrated, but as in all architectures, it is not without a critical path. In this section, a hardware critical path unique to multiprocessor will be discussed. Then, an expression describing how this path affects program execution time will be derived.

Hardware Bottleneck Discussion

Recall that in order to generate the movement of data among localities, events (i.e., unblocked tagged synchronous references) are sent from BIL 82 to LM 60 via CPU-LM FIFO 64. Should an event or memory reference ever be blocked (i.e., a blocking bit in BL 68 associated with the variable is set), it will simply be delayed until the variable becomes unblocked and then proceed normally. Furthermore, recall that a single event (i.e., a tagged synchronous reference) causes the BIL blocking bit associated with the variable in BL 68 to be set. This is done to guarantee that a subsequent reference to the variable will not access the variable before it is "safe." The variable is deemed "safe to reference" only after the event has been processed by IL 70 or by LM 60. If the event is filtered by IL 70, the BIL blocking bit is cleared upon filtering. If the event is processed by LM 60, the BIL blocking bit is cleared upon completion of the LM code segment associated with the event. Note, though, that the LM code segment may set other blocking bits (i.e., read and write) associated with the variable.

Critical Path

Given the above functionality, the potential exists for references to taggable memory to block simply because LM 60 and IL are unable to service events at a sufficient rate to clear the BIL blocking bits of variables before subsequent references to them occur.

Effectively, the event path to LM 60 may become saturated. IF this phenomena occurs, the time lost is an extra penalty added to the total program execution time above any delays due to blocking that would have occurred due to synchronous references to variables awaiting the results of communication operations. This critical path has the potential to seriously degrade performance. To better appreciate how performance is impacted by this phenomena, an estimate for the amount of time lost due to a single blocking event is now developed. The estimate is based on the assumption that the process of the IL filtering an event requires negligible time. This is valid as long as the time required to filter an event is less than or equal to the time required for a memory cycle to the taggable region of memory.

Given this assumption, the additional time required for a reference to taggable memory will be the time required for LM 60 to process all unfiltered events. The time to process a single event can be approximated by $T_{im}$ (the cycle time of LM 60) multiplied by $N_i$ (the instruction count for the event). To simplify the analysis, $N_i$ will be assumed to be the average instruction count of all LM code segments. Given the time to process a single event, the time before the blocking event can be processed is the summation of the time required to process all the $N_u$ (unfiltered) events. Unfiltered events are those events in CPU-LM FIFO 64 that will not be filtered by IL 70 that preceded the event which is causing the blockage. Furthermore, the blocking event needs to be processed before the BIL bit is cleared. With this information $T_{rb}$, the penalty due to blocking in the critical path defined earlier, can be estimated as follows:

$$T_{rb} = T_{im} N_i (N_u + 1),$$

where $T_{rb}$=approximate length of time the reference is blocked
$T_{im}$=LM cycle time
$N_i$=average number of instructions executed/event on LM 60
$N_u$=number of unfiltered events preceding blocked event Hence, $T_{rb}$ is sensitive to $N_u$, and thus it is necessary to compare this overhead to that of a comparable system.

If efficient code for multiprocessor 1 is expected to generate approximately one event for every communication operation, then every one of the $N_u$ tagged references (i.e., events) will be necessary for communication (i.e., $N_u$ is near minimal for the given algorithm). Because each event generates communication, subsequent references may not always block because of saturation, but because of communication (i.e., READ and WRITE blocking). This cause of blocking is a function of the granularity of the computation, and may be tolerated through careful coding of the application. $N_i$ depends on how efficiently code can be generated for LM 60, and is thus partially controllable. $T_{im}$ is a design parameter and thus controllable. The above imply that $T_{rb}$ is largely controllable.

Further, $T_{rb}$ loosely corresponds to the operating system setup overhead for a synchronous communication operation (i.e., send) on a typical distributed memory multi-processor, such as the iPSC/860. Regardless of granularity, the operating system setup overhead for communication on the iPSC/860 is at least 33.9 micro-seconds S. A. Fineberg, T. L. Casavant, and B. H. Pease, "A Preliminary Performance Evaluation of the Seamless Parallel Processing System Architecture," The 21st International Conference on Parallel Processing, IL., August, 1992, pp. 280–284, incorporated herein by reference. Based on this, and that $T_{rb}$ is controllable, penalties incurred in multiprocessor 1 can be less than the corresponding overheads on a typical distributed memory multi-processor.

Cumulative Penalty Effect $T_{rb}$ does not capture the full effect of this penalty. Of more interest here is the aggregate time lost due to blockage across all processors. $T_b$, this aggregate lost time, can be estimated by the summation of $T_{rb}[i]$ across time and processors, where $T_{rb}[i]$ is an estimate of the amount of time lost due to the blockage. Thus, $T_b$ can be estimated as follows:

$$T_b = \sum_{i=0}^{N} T_{rb}[i] = T_{im} N_i \left( N + \sum_{i=0}^{N} N_u[i] \right), \text{ where }$$

$T_b$=total time blocked,
$T_{rb}[i]$=approximate length of time BIL blocking reference i blocked,
N=number of references which block because of conflicts, This equation for $T_b$ is only valid as long as it is assumed that the blockage caused by the event path saturation never delays any data movement long enough that blockage (or increased blockage) due to delayed communication occurs. If blockage due to delayed communication were to occur, $T_b$ would need to include this time and all the manifestation of blocking that are a result of it being delayed.

Hardware Deficiency

In order to achieve the principle of observability in the design, taggable data, data which comprises the locality, is required to be maintained off chip (i.e., internal data cache disabled for the taggable region of memory) or the caching of variables needs to be explicitly managed. This is necessary to allow the Bus Interface Logic (BIL 82) to observe memory references to the taggable region of memory. If the taggable data is not maintained in an on chip cache, every reference to a taggable address needs to go to memory. In terms of timing characteristics, this is equivalent to a cache miss.

If a design does not take advantage of caching data from the taggable region of memory, the potential for a serious time penalty exists.

For a single reference, the time penalty paid for not caching can be described as the memory cycle time minus the CPU cycle time.

$T_d$=delay due to no caching
$T_{cpu}$=cpu cycle time
$T_{mem}$=memory cycle time $$T_d = T_{mem} - T_{cpu}$$

Given the penalty for a single reference to memory, an upper bound can be derived for the total time penalty incurred as a result of all memory references required to access taggable memory rather than potentially cache. This is an upper bound because it is based upon the assumption that all references to one of these variables would be a hit, but there is potential for at least one miss to occur and potentially overwriting.

$T_{up}$=uncached penalty
$T_d$=delay
$N_r$=number of references to taggable memory $$T_{up} = N_r T_d$$

Language Extensions to Facilitate Data Movement

The key to being able to overlap communication with computation is the ability to schedule communication far enough in advance so that computation can proceed while data is being transmitted across the network. The most effective method to do this is to let the programmer (or a smart compiler similar to Fortran-D), specify the data that needs to be communicated, when communication should take place and where the data should moved. While this does not simplify the job of the programmer, it does allow for maximum performance.

As discussed above, the basic functionality of communication can be provided via three mechanisms. These mechanisms let the programmer specify what, when and where of how communication takes place.

1. Synchronous Variables—A new class of storage identifying the portion of the locality that is transient.
2. Triggering Events—A new operator that identifies locations in a program in which a movement of a synchronous variable is to initiated.
3. LM Actions—A mechanism for specifying the functions needed to accomplish the necessary data movement.

Synchronous variables are needed to ensure that data consistency is maintained. For example, if CPU 52 attempts to use the data that is waiting to be received through the network then CPU 52 must be stalled until the data arrives. A triggering event is needed to initiate communication and to specify where, relative to the CPU's context, the communication needs to occur. Finally, LM actions allow for the control of communication which can be used to send or receive data.

Also as discussed above, synchronous variables must be declared to have a storage glass of taggable. All taggable variables are global and must be declared at the outer-most scope. This storage class specification is needed so that the compiler can correctly handle the use of these variables.

The tag operator, @, is used to trigger events. When a variable is ready to be involved in communication it is "tagged." There exist a fixed number of tags which are numbered starting at zero. This tag number is used to identify which LM action is to be initiated.

How the communication will occur is specified by an lmc code segment. Within this segment, there is an entry for each tag number. The code that appears within each entry will be executed by LM 60 when a CPU event with the corresponding tag occurs. Note that the execution of LM code segments occurs concurrently with the computation of CPU 52.

The communication primitives in the lmc code are the request and release operations. The request specifies the remote locality, the remote address of the variable, and the local address of the variable. For example, req(&Var_local, &Var_remote, locality) specifies that the variable Var_remote from locality should be moved into Var_local.

The release command specifies the address of the variable to be released and a count field that specifies how many other localities can request the variable. For example, rel(&Var, 1) specifies that Var can be requested from one locality.

To allow the programmer to utilize IL 70, the inhibit command is provided. This operation specifies the tag number to inhibit, the address for which IL 70 will allow the event through to LM 60, and a count indicating how many of these tag-address pairs must occur before the tag is uninhibited. For example, inhibit(1, &A[99], 3) initializes LM 60 to inhibit all events with tag number 1 until the third reference to &A[99] is deleted.

Program Behaviors Sensitive to Critical Path

To help make programs which execute efficiently, it is necessary to generate target code that is cognizant of the critical paths in the architecture. Here, an attempt is made to identify those control-flow and data-flow characteristics that aggravate the hardware bottlenecks in multiprocessor 1. The developments made above are used here to identify the critical path in the architecture that will have to be handled carefully while writing programs or to allow a compiler to generate efficiency code.

A synchronous reference to a taggable variable, subsequent to a tagged reference to the same variable should be done as far in the future as possible. I.e., the request for or release of, a variable should be done as early as possible before the synchronous access to that variable occurs in the future.

Again, variables which are moved from one locality (PE 50) to another are in the taggable memory region. In the ideal case, each element in the taggable memory space would be uniquely tagged. This would allow the program to operate on individual variables and move them as early as possible, thus maximizing potential communication and computation overlap when they are available. If this can be implemented without any penalty, then the CPUs will not be stalled as the required data will always be available.

However, there are several issues that must be considered when tagging individual elements. First, if each element of the taggable memory space were required to be tagged individually, BL 68 would need to maintain a separate entry for each element. This leads to an increase in the size of BL 68 which will increase the time taken by BL 68 to perform an associative lookup to check for blocking. The second issue is that the amount of time taken by the BIL 82, BL 68, FIFO 64, IL, LM 60 and RL 56 to process each tagged element will potentially force CPU 52 to suffer memory wait cycles. The third issue comes from the fixed overhead associated with the setup time for communication between two PEs 50. The setup time is largely independent of the amount of data moved. Therefore, when individual elements are tagged, the number of times the setup has to be performed increases considerably.

The obvious alternative is to tag large structured variables as a single group (e.g., a large array has only one tag associated with the entire array). This solution also has some disadvantages. Assume a problem which requires a locality to initialize a segment of an array, and upon initialization to release the array segment so that another locality may use it. Further, after initialization, the program requires the locality to perform some computation which does not involve the variable, and then after some time, performs an assignment to the variable. The code segment shown in FIG. 34 is an implementation of a program targeted for multiprocessor with the previously described language extensions.

In the example shown in FIG. 34 there are 100 references to A in the for loop. For every reference to A, BIL 82 checks BL 68 to determine whether or not A is blocked for writing. If it is unblocked, BIL 82 sets its bit in BL 68 for A and then sends the reference to CPU-LM FIFO 64 to be processed by the LM 60. The first reference to A in the for loop will execute without any delay. But all subsequent references to A will be delayed by an amount dependent on the speed of LM 60 and BL 68. This requires CPU 52 to be idle until the unblocking is done by LM 60.

Figure 10:
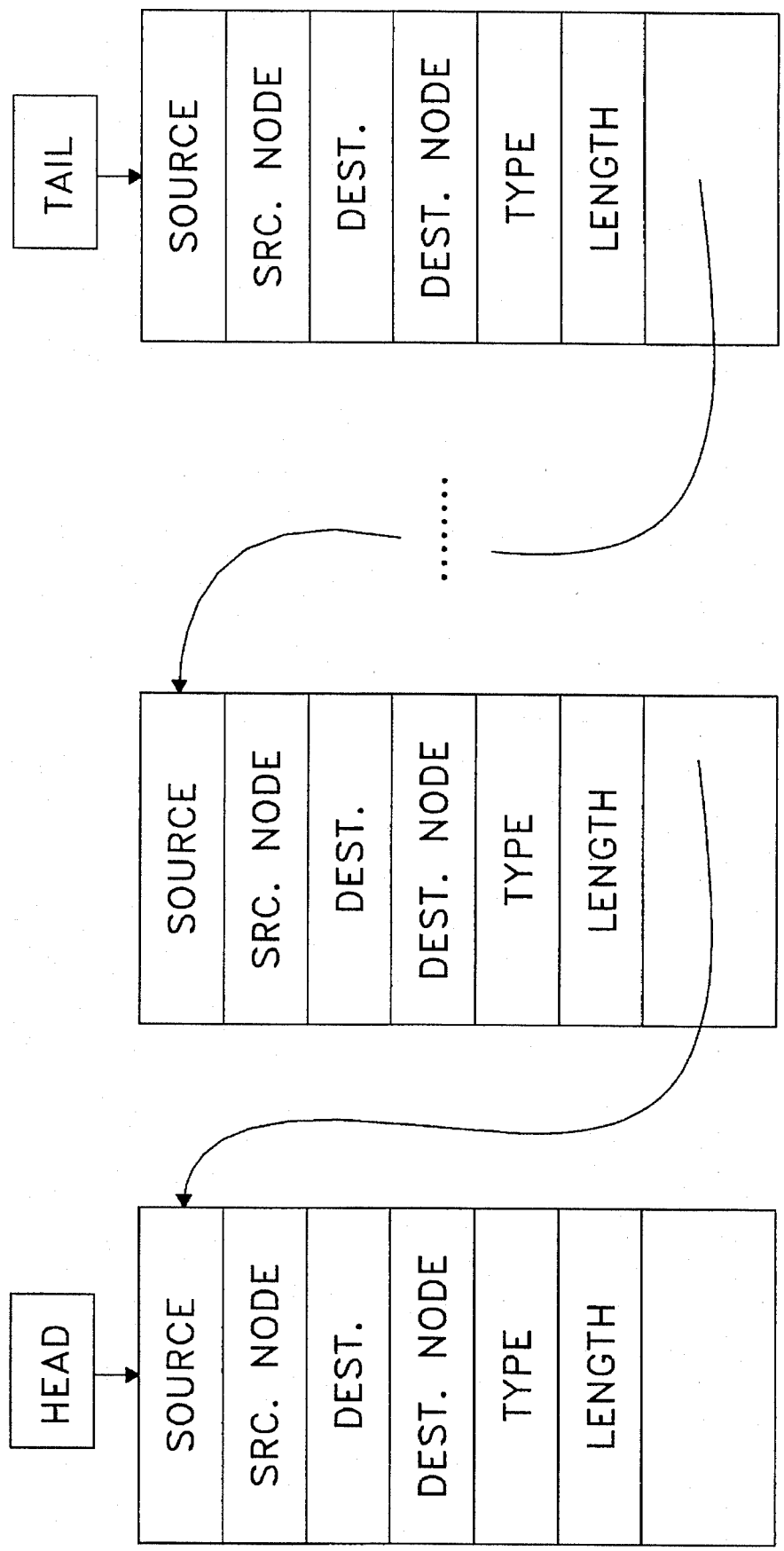
FIG. 10 shows the send queue data structure.

In the example shown in FIG. 10, CPU 52 is forced to be idle when it reaches the 100th tagged reference to A. Assume that the lmc code segment for tag 0, that is executing in response to the tagged access to A in the 99th iteration, has not finished. Once the lmc code segment invoked by the 99th iteration has completed, the 100th reference to A will proceed. This reference will again cause BIL 82 to set the BIL blocking bit in BL 68, then send the event (A, 0) to CPU-LM FIFO 64. LM 60 then performs the release of A, which causes A to be blocked via the write bit in BL 68 for A. When there is a request for A from another locality, LM 60 will send a command to RL 56 directing it to transfer A from PMM 54 to the requesting locality. Finally, once the data has been transferred, LM 60 completes the semantics of the release from the lmc code segment by clearing the write bit in BL 68 for A. Note, there is a portion of code which is being executed between the last reference to A in the for loop and the next reference to A (i.e., A[0]=2). The actual work done by the code is of little concern here. The main concern is the amount of time required to execute the code. If the reference to A takes place locally before A has been requested by another locality then CPU 52 must wait until BL 68 write bit for A has been cleared as described above.

The problem with this method of operation is that when one element in a given data structure is blocked, the entire data structure is blocked due to the implementation of BL 68. When only part of the data structure is being used, this method of blocking can cause poor performance because some data may be unnecessarily blocked. A feasible solution to the problem of tagging would be to break up large data structures into subgroups and unroll the for-loop into several nested loops.

Efficient Code Generation Strategies

Grouping of data appears to be a feasible solution to solving the critical path blockage problem illustrated in Section 4. However, grouping variables to incur minimal Critical Path blockage, and maximizing the overlap of computation and communication, could be a challenging coding problem. It has been shown that large data structures should be broken into smaller data structures to gain performance. Finding the correct data subgroup size is important for efficient execution of a program. The size of the groups should be such that there is a good compromise between communication overhead and CPU-idle time. Should the programmer be responsible to recognize the critical paths or should the compiler be clever enough to handle these problems? The approaches to improving the performance of the system can be classified into three categories:

1. Programmer Only (hand-coding of Seamless-C)
2. Programmer/Compiler Cooperation
3. Compiler Only These classes and their solutions will be discussed here.

Programmer Only Grouping

Refer again to the code segment in FIG. 34, in which there is a problem with the blocking of the variable A. Each element of A was simply tagged for each iteration of the for-loop. This simple coding is detrimental to the performance of multiprocessor 1 and be easily solved by the programmer by stripping out the last for-loop iteration, as shown in FIG. 35.

The advantage of this new configuration is that A does not have to be tagged on each iteration of the for-loop. Only the last element of A need be tagged after the for-loop has completed its operation. This ensures that A will not be blocked for the first 99 iterations of the for-loop. This also has obvious benefits for reducing cache-flushing effects.

Another way this could be implemented is by the use of IL 70. As shown in FIG. 36, by tagging the index i of the for-loop entry into the loop will activate a hardware filter that will keep the first 99 occurrences of tag 1 from triggering LM 60. I.e., when i@0=0 is executed, the lmc segment for tag 0 will execute, thus causing IL 70 to be configured to eliminate all references from CPU-LM FIFO 64 associated with tag 1, unless the address portion is equal to &A[99]. The first 99 references to A will be filtered by IL 70 and on the last reference, i.e. A[99], A will be passed on to LM 60.

These means of grouping variables will be successful only if used with relatively small subgroups. As pointed out in Section 6, all unnecessary blocking should be removed and significant amounts of computation should come between a tagged reference to a variable and a subsequent synchronous access to that same variable. The programmer must then choose an appropriate subgroup size to achieve this higher level of performance. An example is presented in FIG. 37 to illustrate the use of subgrouping by the programmer.

This code segment is similar to FIG. 35 except the array is being partitioned into subgroups of ten elements. The last element of each subgroup is tagged at this causes the release of the subgroup. Using this configuration allows only one subgroup of A to blocked at a time, while the rest of the subgroups are being computed. Ideally, the blocking of one subgroup will be relinquished before the next subgroup is finished processing and is ready to be tagged.

Programmer/Compiler Cooperation

An alternative to forcing the programmer to recognize and correct the pit-falls of the code segment in FIG. 34 is to allow the programmer and compiler to cooperate. An illustration of how programmers can give "hints" to the compiler is shown in FIG. 38, in which an extension to the extended-C is proposed for new for-loop semantics. The first three arguments of the for-loop entry are the same as a normal for-loop, but two additional (optional) arguments are provided. The first is a tag number, and the second is a subgroup size.

Here, the programmer uses the extension to the for-loop to convey to the compiler that in this group, tag 0 is associated with a variable that should be partitioned into subgroups of size 10 for the operation in the lmc segment for this tag. The compiler will optimally prevent the first 9 elements of the subgroup from triggering LM actions, while the 10th element will be tagged. It is left to the compiler as to how to implement the loop. The mechanism of either FIG. 35 or 36, or some other mechanism could be used, and the programmer would not need to be bothered with the coding details. This configuration both ensures improved performance the reduced effort on the programmer's part. However, these solutions all still require the programmer to deal with writing lmc code.

Compiler Only

Ideally, the programmer would like to be rescued from recognizing and correcting code which causes hardware bottlenecks. A solution to this problem would be to employ an optimizing compiler that would eliminate the burdening task of scheduling communication altogether. The compiler would be expected to recognize dependencies among transient data and to reschedule the computations so as to provide higher performance. With such a compiler, the programmer would be relieved of classifying taggable variables and writing any lmc segments.

The notion of sub-grouping an array is similar to message vectorizing in the Fortran D compiler S. Hiranandani, et al., "Compiler Optimizations for Fortran D on MIMD Distributed-Memory Machines", International Conference on Supercomputing, November 1991, pp. 86–100. The Fortran D compiler determines the decomposition of a problem and then redistributes data, e.g., an array, to the decomposition that would provide the best execution of the program. Fortran D allows the compiler to determine which variable references cause non-local data access, including loop-carried messages. The compiler is then able to provide a well-structured program that not only achieves a proper load balance among processors, but also provides a degree of communication that allows an overlap of computation with communication.

Future language support for multiprocessor 1 could incorporate an operation similar to the DISTRIBUTE operation of the Fortran D compiler that would allow the compiler to recognize the fact that a transient array needs to be subgrouped before it is sent to LM 60. If the D compiler utilizes such functions then the programmer will not be responsible for recognizing hardware bottlenecks.

Obviously, numerous and additional modifications and variations of the present invention are possible in light of the above teachings. It is therefore to be understood that within the scope of the appended claims, the invention may be practiced otherwise than as specifically claimed.

What is claimed is:

1. A parallel multiprocessor comprising:

a plurality of processing elements connected to each other in an interconnection structure, wherein each of said plurality of processing elements has a unique address within said structure and comprises:

a processing element main memory for storing local cpu code;

a central processing unit coupled to said processing element main memory for executing the local cpu code and for reading events from and writing events to said processing element main memory, wherein each of said events has a tag field indicating whether or not said event may be non-local to said central processing unit;

a locality manager memory for storing local locality manager code; and a locality manager processor coupled to said locality manager memory, for controlling data movement between processing elements which are cooperating on a single task by executing local locality manager code in association with said events.

2. The parallel multiprocessor claimed in claim 1, further comprising a bus interface logic unit connected to said central processing unit for detecting cpu events by monitoring said tag fields and passing accesses to said processing element main memory to said locality manager processor based on said tag fields.

3. The parallel multiprocessor claimed in claim 2, further comprising a cpu-lm fifo connected to said bus interface logic unit, said bus interface logic unit placing address bits and tag bits into said cpu-lm fifo based on said tag fields.

4. The parallel multiprocessor claimed in claim 3, further comprising a block logic unit connected to said bus interface logic for storing synchronization bits for data stored in said processing element main memory, the synchronization bits indicating whether data may be written over or read, said bus interface logic unit checking said block logic unit whenever a reference is taggable.

5. The parallel multiprocessor claimed in claim 2, further comprising block logic unit connected to said bus interface logic unit for controlling synchronization of taggable data that has been requested or released.

6. The parallel multiprocessor claimed in claim 5, wherein said block logic unit for controlling comprises means for preventing a reading of a taggable variable that has been requested until after data associated with the taggable variable has been received.

7. The parallel multiprocessor claimed in claim 5, wherein said block logic unit for controlling comprises means for preventing over-writing of taggable variables that have been released until after data associated with the taggable variable has been sent a predetermined number of times.

8. The parallel multiprocessor claimed in claim 5, wherein said block logic unit for controlling comprises means for preventing reading from and preventing writing to taggable variables after data associated with the taggable variable has been requested and released, respectively.

9. The parallel multiprocessor claimed in claim 2, further comprising:

a CPU bus;

a bus interface logic unit coupled to said central processing unit and said CPU bus, for detecting cpu events having a tag field and an address field by monitoring said tag field and passing memory accesses to said processing element bus based on said tag field;

an inhibit logic unit which filters said events being sent to said locality manager processor based on said tag and address fields;

a cpu-lm fifo coupled to said inhibit logic unit and said bus interface unit; and block logic unit connected to said bus interface logic unit for controlling synchronization of taggable data that has been requested or released.

10. The parallel multiprocessor claimed in claim 9, wherein said block logic unit comprises a first register coupled to said locality manager processor, a second register coupled to said inhibit logic and a third register coupled to said bus interface logic unit.

11. The parallel multiprocessor claimed in claim 9, further comprising routing logic means having direct access to said locality manager memory and said processing element main memory and connected to said locality manager processor, for routing data in accordance with commands received from said locality manager processor.

12. The parallel multiprocessor claimed in claim 9, wherein said central processing unit has cpu address lines partitioned into tag lines for transmitting said tag field and physical address lines of said central processing unit.

13. The parallel multiprocessor claimed in claim 1, wherein said central processing unit comprises having a cache memory with an instruction portion and a data portion, said multiprocessor further comprising main memory updating means for updating data stored in said processing element main memory in accordance with data in said data portion of the cache memory.

14. The parallel multiprocessor claimed in claim 13, wherein said central processing unit has cpu address lines partitioned into tag lines for transmitting said tag field, page select lines corresponding to regions of said processing element main memory and blocking logic lines.

15. A parallel multiprocessor, comprising:

a plurality of processing elements connected to each other in an interconnection structure, wherein each of said plurality of processing elements has a unique address within said structure and comprises:

a processing element main memory for storing local cpu code;

a central processing unit coupled to said processing element main memory for executing the local cpu code and for reading events from and writing events to said processing element main memory, wherein each of said events has a tag field indicating whether or not said event may be non-local to said central processing unit;

a locality manager memory for storing local locality manager code;

a locality manager processor, comprising an integer central processing unit, coupled to said locality manager memory, for controlling data movement between processing elements which are cooperating on a single task by executing local locality manager code in association with said events.

16. A parallel multiprocessor, comprising:

a plurality of processing elements connected to each other in an interconnection structure, wherein each of said plurality of processing elements has a unique address within said structure and comprises:

a processing element main memory for storing local cpu code;

a central processing unit coupled to said processing element main memory for executing the local cpu code and for reading events from and writing events to said processing element main memory, wherein each of said events has a tag field indicating whether or not said event may be non-local to said central processing unit;

a locality manager memory for storing local locality manager code;

a locality manager processor, comprising a register file, a shifter unit and an arithmetic logic unit, coupled to said locality manager memory, for controlling data movement between processing elements which are cooperating on a single task by executing local locality manager code in association with said events.

17. The parallel multiprocessor claimed in claim 16, wherein said register file comprises 32 registers.

18. The parallel multiprocessor claimed in claim 17, wherein each of said 32 registers is thirty-two bits in length.

19. The parallel multiprocessor claimed in claim 16, wherein said register file comprises a user stack pointer and a system stack point.

20. The parallel multiprocessor claimed in claim 16, wherein said register file comprises a null stack pointer.

21. The parallel multiprocessor claimed in claim 16, wherein said register file comprises an input/output register.

22. A parallel multiprocessor, comprising:

a plurality of processing elements connected to each other in an interconnection structure, wherein each of said plurality of processing elements has a unique address within said structure and comprises:

a processing element main memory for storing local cpu code;

a central processing unit coupled to said processing element main memory for executing the local cpu code and for reading events from and writing events to said processing element main memory, wherein each of said events has a tag field indicating whether or not said event may be non-local to said central processing unit;

a locality manager memory for storing local locality manager code;

a locality manager processor coupled to said locality manager memory, for controlling data movement between processing elements which are cooperating on a single task by executing local locality manager code in association with said events;

a bus interface logic unit connected to said central processing unit for detecting cpu events by monitoring said tag fields and passing accesses to said processing element main memory to said locality manager processor based on said tag fields;

a cpu-lm fifo connected to said bus interface logic unit, said bus interface logic unit placing address bits and tag bits into said cpu-lm fifo based on said tag fields; and a block logic unit, comprising a plurality of content addressable memories of various sizes, connected to said bus interface logic for storing synchronization bits for data stored in said processing element main memory, the synchronization bits indicating whether data may be written over or read, said bus interface logic unit checking said block logic unit whenever a reference is taggable.

23. The parallel multiprocessor claimed in claim 22, wherein each of said plurality of content addressable memorys has a plurality of rows, each of said rows comprising an address portion, blocking bits, a grouping bit and a group indicator tag.

24. A parallel multiprocessor comprising:

a plurality of processing elements connected to each other in an interconnection structure, wherein each of said plurality of processing elements has a unique address within said structure and comprises:

a processing element main memory for storing local cpu code;

a central processing unit coupled to said processing element main memory for executing the local cpu code and for reading events from and writing events to said processing element main memory, wherein each of said events has a tag field indicating whether or not said event may be non-local to said central processing unit;

a locality manager memory for storing local locality manager code and data;

a locality manager processor coupled to said locality manager memory, for controlling data movement between processing elements which are cooperating on a single task by executing local locality manager code in accordance with the tag field of said event;

main memory updating means for updating data stored in said processing element main memory in accordance with data in said data portion of the cache memory; and routing logic means having direct access to said locality manager memory and said processing element main memory and connected to said locality manager processor, for routing data in accordance with commands received from said locality manager processor.

* * * * *